US009062263B2

(12) United States Patent
Sevastyanov

(10) Patent No.: US 9,062,263 B2
(45) Date of Patent: Jun. 23, 2015

(54) METHOD FOR THE PSEUDO-DETONATED GASIFICATION OF COAL SLURRY IN A COMBINED CYCLE

(75) Inventor: Vladimir Petrovich Sevastyanov, Novosibirsk (RU)

(73) Assignee: ASTRA INTERECOTECH PTY LTD, North Adelaide (AU)

( * ) Notice: Subject to any disclaimer, the term of this patent is extended or adjusted under 35 U.S.C. 154(b) by 400 days.

(21) Appl. No.: 13/696,340

(22) PCT Filed: Apr. 29, 2011

(86) PCT No.: PCT/RU2011/000290
§ 371 (c)(1),
(2), (4) Date: Mar. 18, 2013

(87) PCT Pub. No.: WO2011/139181
PCT Pub. Date: Nov. 10, 2011

(65) Prior Publication Data
US 2013/0167441 A1 Jul. 4, 2013

(30) Foreign Application Priority Data

May 7, 2010 (RU) .................................. 2010118640

(51) Int. Cl.
*C01B 3/36* (2006.01)
*C10J 3/46* (2006.01)
(Continued)

(52) U.S. Cl.
CPC .. *C10J 3/46* (2013.01); *C10L 1/326* (2013.01); *F01K 23/067* (2013.01); *Y02E 20/18* (2013.01);
(Continued)

(58) Field of Classification Search
CPC .................. C10J 3/84; C10J 2300/093; C10J 2300/0946; C10G 1/006
See application file for complete search history.

(56) References Cited

U.S. PATENT DOCUMENTS 1,952,281 A 3/1934 Ranque
3,211,971 A 10/1965 Barson et al.
(Continued)

FOREIGN PATENT DOCUMENTS

CN 201442929 U 4/2010
RU 2036955 C1 6/1995
(Continued)

OTHER PUBLICATIONS

Gorlov, "Composite Water-Containing Fuels From Coals and Petroleum Products," Solid Fuel Chemistry, vol. 38, No. 6, 2004, pp. 40-50.
(Continued)

*Primary Examiner* — Imran Akram
(74) *Attorney, Agent, or Firm* — RatnerPrestia

(57) ABSTRACT

The invention relates to the field of power engineering and, more specifically, to systems for generating electricity based on the use of solid fuel, primarily brown and black coal. In the coal gasification method, a gasifier is fed with a uniform activated coal water fuel, the droplets of which are of equal size and the coal particles in said droplets having a similar granulometric composition. The fuel droplets are introduced intermittently in separate doses of fuel with a certain amount of motion being imparted thereto. The milling of the coal for the activated coal water fuel preparation method is adjusted adaptively according to the criterion of the actual amount of volatile substances given off by the coal, and the coal is thoroughly classified according to its granulometric composition. The invention provides for more extensive recovery of thermal energy from coal and more efficient electricity generation.

8 Claims, 12 Drawing Sheets

(51) Int. Cl.
*C10L 1/32* (2006.01)
*F01K 23/06* (2006.01)
*C10J 3/48* (2006.01)
*C10J 3/50* (2006.01)
*C10J 3/84* (2006.01)

(52) U.S. Cl.
CPC *C10J 3/487* (2013.01); *C10J 3/506* (2013.01); *C10J 3/84* (2013.01); *C10J 2300/0906* (2013.01); *C10J 2300/093* (2013.01); *C10J 2300/1246* (2013.01); *C10J 2300/0973* (2013.01); *C10J 2200/152* (2013.01)

(56) References Cited

U.S. PATENT DOCUMENTS

| | | | |
|---|---|---|---|
| 3,971,211 A | 7/1976 | Wethe et al. | |
| 4,007,019 A | 2/1977 | Slater et al. | |
| 4,054,424 A | 10/1977 | Staudinger et al. | |
| 4,070,268 A * | 1/1978 | Davis et al. | 208/415 |
| 4,189,372 A * | 2/1980 | Baldwin et al. | 208/418 |
| 4,285,140 A * | 8/1981 | van Raam et al. | 34/403 |
| 4,313,819 A * | 2/1982 | Rado | 208/177 |
| 4,372,838 A * | 2/1983 | Kulik et al. | 208/416 |
| 4,421,632 A * | 12/1983 | Wurfel | 208/430 |
| 4,872,971 A * | 10/1989 | Zandona | 208/419 |
| 5,071,540 A * | 12/1991 | Culross et al. | 208/414 |
| 5,151,173 A * | 9/1992 | Vaughn et al. | 208/430 |
| H1325 H | 7/1994 | Doering et al. | |
| 7,060,233 B1 | 6/2006 | Srinivas et al. | |
| 2004/0123601 A1 | 7/2004 | Fan | |
| 2006/0048515 A1 | 3/2006 | Zimron et al. | |
| 2008/0056971 A1 | 3/2008 | Hughes | |

FOREIGN PATENT DOCUMENTS

| | | |
|---|---|---|
| RU | 2054455 C1 | 2/1996 |
| RU | 2078253 C1 | 4/1997 |
| RU | 2185244 C2 | 7/2002 |
| RU | 2236890 C1 | 9/2004 |
| RU | 2242502 C1 | 12/2004 |
| SU | 371269 A1 | 2/1973 |
| SU | 1247070 A1 | 7/1986 |

OTHER PUBLICATIONS

Frolov, "Combustion Science and Problems of Contemporary Power Engineering," Russian Journal of General Chemistry, 2009, vol. 79, No. 11, pp. 2556-2561.
Allardice et al., "Utilisation of Low Rank Coals."
Khodakov et al., "Coal-Slurry Fuel," Solid Fuel Chemistry, vol. 39, No. 6, 2005, pp. 12-27.
International Search Report for PCT/RU2011/000290 mailed Sep. 1, 2011.

* cited by examiner

View from above of layout of gasifier elements in fuel pylon, final fuel preparation and radiant thermal activation of fuel zones Fuel pylon of gasifier and its FPF and RTA zones

METHOD FOR THE PSEUDO-DETONATED GASIFICATION OF COAL SLURRY IN A COMBINED CYCLE

CROSS REFERENCE TO RELATED APPLICATIONS

This application is the U.S. National Phase Application of PCT/RU2011/000290, filed Apr. 29, 2011 which claims priority to Russian Application No. 2010118640, filed May 7, 2010, the contents of such applications being incorporated by reference herein.

FIELD OF THE INVENTION

The invention now filed relates to the field of thermal electric power generation, in particular to the gasification of fuel for electrical power generating systems based on various coals, and provides moderate capital expenditure and production cost in the production of hydrogen-enriched gas. Use of the invention in an integrated manner as part of a combined cycle process for electrical power generation ensures fuller utilization of the thermal energy of coals with an increase in electrical power generating efficiency up to 80-85% and with a reduction in emissions of greenhouse gases—to 0.38-0.40 t/MWh for carbon dioxide.

BACKGROUND OF THE INVENTION

The requirement for the ecological safety of mankind on the planet determines not only the dynamics, but also the structure, of the power industry. In the basic scenario of the International Energy Agency (IEA), the emission of greenhouse gases by the power industry will increase from 28 billion tonnes of carbon dioxide in 2005 to 62 billion tonnes by 2050 (which will raise the temperature of the earth by 6 degrees Celsius from today's level), and 65 trillion dollars will be required for development of the world-wide power industry. Over the 150 years of statistical observations, 33% of the economically attainable part of the explored reserves of oil, 14%; of gas and 9% of uranium, but only 4% of coals have been extracted. The attainability of the cost-effective reserves of hydrocarbons will, in fact, determine the development of the anthropogenic power industry in the coming decades [Makarov A. A. Director of the Institute of Power Research of the Russian Academy of Sciences, Academician of the Russian Academy of Sciences, Professor, Doctor of Economic Sciences. (Based on a paper read at the Scientific Session of the Russian Academy of Sciences General Assembly "Scientific and technological forecasting—a most important element in the development strategy of Russia", 16-17 Dec. 2008)].

Discharges of greenhouse gases, including carbon dioxide, have increased to a significant extent due to the burning of powdered coal fuel at power stations, which generate the electrical power essential for life. Coal is the main fuel used for electrical power generation, accounting for about 40%. It is anticipated that the global demand for coal will rise by 73% in the period between 2005 and 2030, as the use thereof will increase in many industrial countries, including the rapidly-expanding major countries such as China and India, which account for 74% of this growth. Coal is the main power generation resource of China, but the extended use thereof in the future is hampered due to the increase in the "ecological component" of its price. Significant efforts are therefore being made in relation to the ecological aspect [Energy Technology Perspectives. Scenarios & Strategies to 2050. International Energy Agency, Paris, 2008].

Brown coals provide about 4% of world-wide power generation (13% of power generation in Europe), but some countries, such as Greece (76%), Yugoslavia (67%) and the Czech Republic (51%) are excessively dependent on the use of brown coal for electrical power generation. The largest consumer of brown coals is Germany, where 28% of electrical power is generated using brown coal.—In Australia, the extraction of low grades of coal predominates in the state of Victoria, and it is consumed at power stations located close to the extraction site, which produce 97% of the electrical power of the state, or 25% of the total electrical power produced in Australia [Utilisation of Low Rank Coals. David J. Allardice and Brian C. Young*, Allardice Consulting, 10 Arcady Grove, Vt., Vic 3133, Australia].

The high capital costs of brown coal thermal power stations, together with their high carbon dioxide emission level, the need to burn more coal in order to evaporate off the moisture, and concerns about global warming are concentrating the attention of specialists throughout the world on the development of improved technologies which make it possible to reduce the level of carbon dioxide emissions and to increase the efficiency of combustion for various coals, as part of the solution of the problem of climate change. Various proposals have been made for securing the highest efficiency from the use of fuel such as coal as an energy source. The main solutions which have been developed in order to achieve these objectives are based on the gasification of coals—Integrated Gasification Combined Cycle (IGCC) and the use of advanced, more efficient, turbines with super-critical steam cycles, also other supplementary improvements which raise thermal efficiency to 38-41%, depending on the moisture content. This is a significant improvement, compared to the 29% efficiency achieved by existing power stations burning brown coals [Utilisation of Low Rank Coals. David J. Allardice and Brian C. Young*, Allardice Consulting, 10 Arcady Grove, Vt., Vic 3133, Australia].

PRIOR ART

In relation to the coal gasification technology employed in the invention now proposed, there is a known solution "Method for the production of producer gas and a device for the performance thereof" [Bayev V. S., Sevast'yanov V. P. RF Patent, RU 2242502. Dec. 20, 2004. METHOD FOR PRODUCTION OF PRODUCER GAS AND A DEVICE FOR THE IMPLEMENTATION THEREOF].

Here, conversion efficiency is based on the use as fuel of a coal-water slurry (CWS) without the use of a steam and oxygen blast, with complete decomposition of the slurry water, arbitrarily represented as in two parts, where a first part of the water is decomposed thermally, while the second part thereof is decomposed by means of electrolysis, thus enriching the fuel with oxygen and hydrogen.

Features in this method which are in common with the invention now proposed are that the reaction components are advanced under gravity in a vertical gasifier, gasification is performed continuously in a cocurrent stream, the gasifier feed fuel is used in the form of a CWS, the reaction components are introduced tangentially into a gasification chamber, the conventionally employed steam-oxygen blast is lacking, slag is discharged from the lower part of the gasifier, and the syngas is subjected to cyclone cleaning to remove fly ash.

The reasons which prevent the technical result which is provided by the invention now proposed being achieved by the invention described in Bayev V. S., Sevast'yanov V. P. RF Patent, RU 2242502. Dec. 20, 2004. METHOD FOR PRODUCTION OF PRODUCER GAS AND A DEVICE FOR THE IMPLEMENTATION THEREOF are:

feeding air to the gasification chamber requires the use of a compressor;

the lack of optimal conditions in the gasifier chamber for high-efficiency reaction mass-transfer and mass-exchange of the coal conversion reaction components, which in the invention now proposed provide high conversion productivity;

the lack of process measures to protect the internal surfaces of the gasification chamber against coking requires frequent process shut-downs in order to clean the chamber;

the presence of a unit for electrolytic decomposition of the water component of the fuel requires relatively large additional expenditure on electrical power and on operation of this unit, from the point of view of the possible need for periodic cleaning of the electrodes;

the inefficient utilization of the volatiles contained in the initial coal with partial loss of the thermal energy value thereof.

In a known invention "One stage gasification process" [US Statutory Invention Registration. Appl. No. 960345, July 1994 ONE STAGE COAL GASIFICATION PROCESS], the gasification of coal is performed in a cocurrent stream, with introduction of dry coal dust into a vertical gasifier in one channel with a steam-oxygen blast. After cooling the syngas discharged from the gas generator, the gas is separated from the fly ash, part of which is introduced into the gasifier as cold "crystallization" centers, on which the liquid slag starts to deposit, and is then converted into fly slag due to the introduction of quenched syngas into the gasifier so that it is converted into particles which do not adhere to the walls of the gasifier.

Features in common with the invention now proposed are gasification in a cocurrent stream with a gasifier of vertical design and the introduction of quenched syngas into the gasifier in order to harden the slag particles, with the object of preventing coking of the internal surfaces of the gasifier walls, and also in order to ensure discharge of the slag, thanks to this being in solid form.

The reasons which prevent the technical result in respect of gasification at the level which constitutes the invention now proposed being achieved by the invention described in US Statutory Invention Registration. Appl. No. 960345, July 1994 ONE STAGE COAL GASIFICATION PROCESS are:

the use of a steam-oxygen blast encumbers the gasification process with the need for an oxygen unit and the necessary increase in steam power plant equipment;

the lack of optimal conditions in the gasifier reaction chamber for high-efficiency reaction mass-transfer and mass-exchange of the coal conversion reaction components;

The absence of strict dimensional homogeneity of the fuel being gasified, as a process category for the determinacy of the course of change in fuel conversion parameters, such as accurate metering, delivery of heat, reaction mass-transfer and mass-exchange, and also the travel and velocity parameters of movement of the reacting components through the gasifier zones, optimally ensuring the freeing of zoned reaction spaces in the gasifier for newly introduced reaction components.

An invention "Method for the gasification of fine-grain coal" is known [G. P. Sechenov, G. N. Delyagin, L. I. Larin, L. D. Leonova METHOD FOR GASIFICATION OF FINE-GRAIN COAL. Inventor's Certificate SU 371269, 1973]. In this invention, the process of gasification in a fluidized-bed gasifier is intensified by the possibility of a relative increase in the thickness of the fluidized bed, thanks to the use in this bed of fuel with a more homogeneous fractional composition, from the point of view of blast capability. This is accomplished due to the fact that the coal is graded into classes and a CWS is prepared from the coal of the fine fractions, this being completely combusted at a level lower than the gasification chamber, and the reaction bed blast is carried out with the combustion products of said slurry. In this invention, combustion of the CWS allows a water utilization coefficient of the order of 100% to be obtained with the amount thereof strictly predetermined.

Features in common with the invention now proposed are the use of movement of the reaction components under gravity in a vertical-type gasifier, the use of a CWS and utilization of the effect of the fractional homogeneity of the fuel to intensify the conversion process, and also the lack of the conventionally employed steam-oxygen blast and the close to 100% utilization of the water.

The reasons which prevent the technical result in respect of gasification at the level which constitutes the invention now proposed being achieved by the invention described in G. P. Sechenov, G. N. Delyagin, L. I. Larin, L. D. Leonova METHOD FOR GASIFICATION OF FINE-GRAIN COAL. Inventor's Certificate SU 371269, 1973 are:

the cyclic nature of the process, resulting from the methods for charging the main fuel and discharging the slag;

The air feed to the gasification chamber requires the use of a compressor;

the lack of optimal conditions in the gasifier chamber for high-efficiency reaction mass-transfer and mass-exchange of the coal conversion reaction components, which in the invention now proposed provide high conversion efficiency;

the lack of technological measures to protect the internal surfaces of the gasification chamber against coking requires frequent process shut-downs in order to clean the chamber;

the inefficient utilization of volatiles contained in the initial coal with partial loss of the thermal energy value thereof.

Also known is an inventive solution concerning coal gasification technology "Process for quenching product gas of slagging coal gasifier" [U.S. Pat. No. 4,054,424. Oct. 18, 1977. PROCESS FOR QUENCHING PRODUCT GAS OF SLAGGING COAL GASIFIER]. This invention has been selected, as the most similar in relation to the general essential features, as the analog (prototype) in relation to gasification in the invention now proposed.

For the fluidized bed gasifier in invention U.S. Pat. No. 4,054,424. Oct. 18, 1977. PROCESS FOR QUENCHING PRODUCT GAS OF SLAGGING COAL GASIFIER, spent syngas in the quenched form is fed into the gasifier with the object of creating a protective layer along the internal walls of the gasifier so that slag is not deposited on the walls, and also in order to solidify liquid slag which on cooling is converted into fly ash. Together with the feed of quenched protective gas, the gasifier is also supplied with oxygen, in which process a part of the combustible components of the protective gas is oxidized.

The prototype and the invention now proposed have the following features in common:

the use of movement of the reaction components under gravity in a vertical-type gasifier;

utilization of a protective gas with the object of creating a boundary protective layer to block coking of the gasifier walls;

utilization of a quenched protective gas in order to harden liquid slag;

feeding said protective gas into the gasifier in rotatory motion through apertures located in the gasifier walls.

When compared with the prototype described in U.S. Pat. No. 4,054,424. Oct. 18, 1977. PROCESS FOR QUENCHING PRODUCT GAS OF SLAGGING COAL GASIFIER, the following are reasons which prevent the technical result in respect of gasification being secured:

- feeding oxygen into the gasifier requires the presence of an oxygen unit;
- the lack of optimal conditions in the gasifier chamber for high-efficiency reaction mass-transfer and mass-exchange of the coal conversion reaction components, which in the invention now proposed provide high conversion efficiency, including the condition of high local-pulsing energy intensity in the zone of the gasifier in which the main part of conversion takes place;
- the lack of homogeneity of the fuel component introduced into the gasifier, as one of the conditions for efficient reaction mass-transfer and mass-exchange of the reaction components;
- the inefficient utilization of the volatiles contained in the initial coal with partial loss of the thermal energy value thereof;
- the relatively high cocurrent carry-over of fuel and fly ash with the syngas discharged from the gasifier, in connection with the use of fluidized bed technology.

In relation to the preparation and use of Activated Coal-Water Fuel (ACWF) in gasification technology which is employed as part of the invention now proposed, there is a known solution "Method for the preparation of coal-water slurry for transportation by pipeline"[A. B. Kuz'min, S. V. Bystryakov, A. I. Kravchenko. METHOD FOR PREPARATION OF A COAL-WATER SLURRY FOR PIPELINE TRANSPORTATION. Inventor's Certificate SU 1247070, Nov. 21, 1984].

In this method, a slurry is prepared by dry grinding coal, then classifying the coal according to particle-size composition, followed by degassing by applying a vacuum, and subsequent addition of water and stirring the resultant coal mixture, also under vacuum. The concept of this method is comprised in the process of partial degassing of the coal, and specifically in removal of air from the surface of the coal particles for greater wetting thereof in order to create a film of water between the coal particles with the object of pipeline transportation of a highly concentrated slurry.

Features in common between this method and the invention now proposed include the use of grinding of the coal, the classification thereof in accordance with the particle-size composition, and the partial degassing of the coal before mixing with water.

When compared with the invention described in A. B. Kuz'min, S. V. Bystryakov, A. I. Kravchenko. METHOD FOR PREPARATION OF A COAL-WATER SLURRY FOR PIPELINE TRANSPORTATION. Inventor's Certificate SU 1247070, Nov. 21, 1984, the following are reasons which prevent the technical result which is provided by the invention now proposed being secured:

- the insufficiently fine classification of the coal according to particle-size composition, with the object of obtaining a fuel slurry with strictly predetermined properties from the point of view of the homogeneity of the fuel and the absence of preparation of different grades of fuel slurry from one and the same volume of raw coal, from the point of view of efficient utilization of slurried fuel as more homogeneous;
- the lack of compatibility in relation to equipment output of the grinding and degassing operations;
- the lack of smart preliminary grinding technology to ensure for each batch of raw coal the parametric accuracy of the processing thereof, in connection with the data sheet qualitative characteristics of the batch of coal being handled and in connection with the design data of the required resultant particle-size composition and the degree of degassing and dewatering;
- the partial loss of the combustible part of the volatiles in the coal grinding and vacuum treatment processes;
- the lack of the process factor of the necessary partial hydrophilicity of the coal as part of the slurry in connection with "soft" pulsed hydraulic-impact action on the boundaries of coal-water contacts during preparation of the fuel;
- the lack of enhanced activation of the slurry, as a quasi-colloidal system, which has absorbed the mechanical energy of the hydraulic-impact pulses during preparation of the fuel, this activation being manifested as rise in the temperature of the fuel being processed and in the presence of internal vibrations (as stored energy) of stable water clusters, both in free (slurry) water and also in the water in coal micropores and floccules, and also the presence of internal vibrations in particles of the solid phase of the fuel;
- the lack of special finishing treatment of the fuel in the form of spraying a finely-disperse fraction onto the surface of pre-calibrated droplets of slurry when starting to use it as fuel.

A "Method for preparation of a coal-water fuel from brown coals" [Delyagin G. N. METHOD FOR PREPARATION OF COAL-WATER FUEL FROM BROWN COALS. RU Patent 2036955, Jul. 9, 1992] is known, which employs dry grinding of the coal with simultaneous hydrophobization thereof in an inert medium at temperatures of 600-1000 degrees Celsius. Hydrophobization is achieved by removing from the pores of coal particles air and oxygen-containing components—water, carbon monoxide, carbon dioxide, etc. The resultant intermediate is then cooled and 20% thereof is further ground. The remaining part is classified and large particles are returned for additional grinding, while the coal particles after classification are subjected to fine cleaning and are then mixed with water and the fuel is homogenized with addition of composite chemical additives. The main objective 4$n$ this method is to obtain a slurry with a high concentration of solid phase while ensuring minimal viscosity thereof for pipeline transportation, on the one hand, and also for direct combustion of this slurry.

Features in common between this method and the invention now proposed include the use of grinding of the coal, the classification thereof in accordance with the particle-size composition, and the partial degassing of the coal and partial dewatering of the coal particles with increase in the ratio of free water to internal water, and also homogenization of the fuel slurry in the course of its preparation.

When compared with the invention described in Delyagin G. N. METHOD FOR PREPARATION OF COAL-WATER FUEL FROM BROWN COALS. RU Patent 2036955, Jul. 9, 1992, the following are reasons which prevent the technical result which is provided by the invention now proposed being secured:

- the insufficiently fine classification of the coal according to particle-size composition, with the object of obtaining a fuel slurry with strictly predetermined properties from the point of view of the homogeneity of the fuel and the absence of preparation of different grades of fuel slurry from one and the same volume of raw coal, from the point of view of efficient utilization of slurried fuel as more homogeneous;

the lack of smart preliminary grinding technology to ensure for each batch of raw coal the parametric accuracy of the processing thereof, in connection with the data sheet qualitative characteristics of the batch of coal being handled and in connection with the design data of the required resultant particle-size composition and the degree of degassing and dewatering;

the partial loss of the combustible part of the volatiles in the coal grinding and degassing processes;

the lack of the process factor of the necessary partial hydrophilicity of the coal in the slurry in connection with the pulsed hydraulic-impact action on the boundaries of coal-water contacts during preparation of the fuel;

the addition of composite chemical additives to the fuel slurry requires additional "raw materials" costs and may reduce the service life of equipment due to increased corrosion;

the lack of special finishing treatment of the fuel in the form of spraying a finely-disperse fraction onto the surface of pre-calibrated droplets of slurry when starting to use it as fuel.

A "Method for preparation of liquid composite fuel and a disintegrator and hydraulic-impact device for the performance thereof" [Bayev V. S. METHOD FOR PREPARATION OF LIQUID COMPOSITE FUEL AND A DISINTEGRATOR AND HYDRAULIC IMPACT DEVICE FOR THE IMPLEMENTATION THEREOF. RU Patent 2185244, Jul. 27, 2000] is known, which employs preliminary grinding of the coal in a disintegrator with two working members in the form of contra-rotating discs. The disintegrator is provided with an auger which assists grinding of raw material of any moisture content. The solid phase of the fuel is then mixed with the liquid components thereof, after which the coarsely-disperse slurry is treated in a hydraulic-impact device which provides further comminution of the solid phase of the fuel and ensures activation of the fuel, converting hydrodynamic impact energy into the energy of chemical interaction of the fuel components. The efficiency of this method of preparing slurry fuel is due to the use of original equipment—the disintegrator and the hydraulic-impact device, which convert the pre-prepared fuel components in a single pass into a composite fuel with predetermined qualities.

Features in common between this method and the invention now proposed include the use of preliminary grinding of the coal, the metering thereof into a mixing apparatus and the introduction of a metered amount of liquid components into the same mixing apparatus. Subsequent repeated treatment of the fuel in a hydraulic-impact device in a liquid medium over one pass in several sections of this hydraulic-impact device, ensuring activation of the fuel being prepared, converting hydrodynamic impact energy into the energy of chemical interaction of the fuel components. A disintegrator with a feed auger and with two contra-rotating working members—discs provided with rows of grinding members and the presence of a bypass line which is used when required with the hydraulic-impact device.

When compared with the invention described in Bayev V. S. METHOD FOR PREPARATION OF LIQUID COMPOSITE FUEL AND A DISINTEGRATOR AND HYDRAULIC IMPACT DEVICE FOR THE IMPLEMENTATION THEREOF. RU Patent 2185244, Jul. 27, 2000, the following are reasons which prevent the technical result which is provided by the invention now proposed being secured:

the insufficiently fine classification of the coal according to particle-size composition, with the object of obtaining a fuel slurry with strictly predetermined properties from the point of view of the homogeneity of the fuel and the absence of preparation of different grades of fuel slurry from one and the same volume of raw coal, from the point of view of efficient utilization of slurried fuel as more homogeneous;

the lack of a degassing operation during preliminary grinding of the coal with preservation of the combustible part of the volatiles;

the lack of smart preliminary grinding technology to ensure for each batch of raw coal the parametric accuracy of the processing thereof, in connection with the data sheet qualitative characteristics of the batch of coal being handled and in connection with the design data of the required resultant particle-size composition and the degree of degassing and dewatering;

the lack of special finishing treatment of the fuel in the form of spraying a finely-disperse fraction onto the surface of pre-calibrated droplets of slurry when starting to use it as fuel.

Also known is an invention "Method for preparation of a coal-water slurry" [Kagan Ya. M., Kondrat'yev A. S., Kornilov V. V. METHOD FOR PREPARATION OF COAL-WATER SLURRY. RU Patent 2054455, Mar. 23, 1993] which relates to slurried fuel preparation technology. This invention has been selected, as the most similar in general essential features, as the analog (prototype) in relation to the preparation of ACWF in the invention now proposed. Invention Kagan Ya. M., Kondrat'yev A. S., Kornilov V. V. METHOD FOR PREPARATION OF COAL-WATER SLURRY. RU Patent 2054455, Mar. 23, 1993 employs wet grinding of brown coal with water and the resultant aqueous mixture is heated to a temperature of 200-300 degrees Celsius with ultra-high frequency (UHF) currents in a reactor under a pressure of 1.5-10 MPa. After holding the aqueous mixture under these conditions for 1-30 minutes, it is further ground in a steam-jet mill to a particle size of 200-300 μm with the pressure relieved to 0.3-1.0 MPa and is cooled with utilization of the heat. The vapor-gas mixture is then separated from the resultant slurry to obtain the finished product by mixing it with starting water in order to heat it to 30-90 degrees Celsius, then surface-active additives are added to this slurry and the slurry is processed in a homogenizer. In this process, in order to ensure normal operation of the steam-jet mill, a coarsely-disperse classifier is employed after the primary wet grinding in order to direct particles larger than 1-3 mm to regrinding. In order to obtain a slurry suitable for combustion, the sizes of the coal particles therein are adjusted to sizes of less than 200-300 μm by means of another finely-disperse classifier, employed after the steam-jet mill. Thus, particles with sizes of more than 200-300 μm, separated in this finely-disperse classifier, are passed to regrinding. A particular feature of the process of slurry preparation using this method is the combustion in a separate combustion chamber of the gaseous products which are obtained in the course of preparation of this fuel slurry.

The basic concepts of this invention are:

the ability to adjust the particle-size composition of the solid phase of the fuel using the finishing comminution of the coal necessary for this purpose.

the finishing comminution of the coal in the steam-jet mill utilizes energy previously accumulated in the intermediate coal-water mixture in the stage of barothermal treatment thereof, used for degassing, with the object of obtaining a highly-concentrated slurry suitable for pipeline transportation.

Features in common between the prototype [Kagan Ya. M., Kondrat'yev A. S., Kornilov V. V. METHOD FOR PREPARATION OF COAL-WATER SLURRY. RU Patent 2054455, Mar. 23, 1993] and the invention now proposed include the preliminary grinding of the coal, the degassing thereof and classification according to particle-size composition, mixing the coal with water and heating the intermediate aqueous mixture with thermal energy which is utilized from contiguous processes. And also the finishing treatment of the slurry in a homogenizer, in which final grinding of the coal particles takes place (the analogous apparatus in the invention now proposed is a hydraulic-impact device). Furthermore, the utilization of coal degassing products by the combustion thereof in a separate combustion chamber is also a common essential feature of the prototype and the invention now proposed.

When compared with the prototype invention described in Kagan Ya. M., Kondrat'yev A. S., Kornilov V. V. METHOD FOR PREPARATION OF COAL-WATER SLURRY. RU Patent 2054455, Mar. 23, 1993, the following are reasons which prevent the technical result which is provided by the invention now proposed being secured:

- the insufficiently fine classification of the coal according to particle-size composition, with the object of obtaining a fuel slurry with strictly predetermined properties from the point of view of the homogeneity of the fuel and the absence of preparation of different grades of fuel slurry from one and the same volume of raw coal, from the point of view of efficient utilization of slurried fuel as more homogeneous;
- the lack of smart preliminary grinding technology to ensure for each batch of raw coal the parametric accuracy of the processing thereof, in connection with the data sheet qualitative characteristics of the batch of coal being handled and in connection with the design data of the required resultant particle-size composition and the degree of degassing and dewatering;
- the lack of special finishing treatment of the fuel in the form of spraying a finely-disperse fraction onto the surface of pre-calibrated droplets of slurry when starting to use it as fuel;
- the relatively low productivity of the process in connection with the significant barothermal treatment time of up to 30 minutes;
- the use of relatively complex and costly equipment, from the point of view of the reliability and operational safety thereof, particularly the UHF reactor with parameters of up to 10 MPa for pressure and up to 300 degrees Celsius for temperature.

The object of the invention now proposed is thus to create a highly efficient process for the production of syngas highly saturated with hydrogen for the combustion thereof in an enhanced-efficiency electrical power generation combined cycle, when using various types of coals—black and brown, and also including low-grade types of coal. An objective of the invention now proposed is also to offer the ability to include in the economic cycle of electrical power generation unusable wastes from coal extraction and coal slurries from beneficiation plants. Enhancement of electrical power generation efficiency is expressed in raising to a value of 80-85% the efficiency of conversion of the thermal energy potentially contained in coals. In this process, the carbon dioxide emission level is 0.38-0.40 t/MWh when not using systems for the capture thereof.

The stated objectives are achieved in that a method for electrical power generation by a Hybrid Combined Cycle (HCC) with Pseudo-Detonated Hydro-Gasification (PDHG) employs three internal, technologically sequential cycles, in each of which electrical power is generated. In this process, the energy of the waste heat of the first cycle is utilized by the second cycle, while the energy of the waste heat of the second is utilized correspondingly by the third. This is accomplished thanks to the use in the internal cycles of working media with anisotropic boiling points, which in general is proper to cycles of combined type. The macrostructural make-up of the structure of the HCC now proposed is close to the solution described in U.S. Pat. No. 3,971,211, Jul. 27, 1976. THERMODYNAMIC CYCLES WITH SUPERCRITICAL $CO_2$ CYCLE TOPPING.

Thus, the first internal cycle of the HCC employed is implemented on the basis of a gas turbine operating by combustion of high-quality syngas produced using special PDHG technology from special liquid ACWF, which is also obtained using original technology which is a component part of the subject of the invention. In this process, the energy of the waste heat of the Gas-Turbine Cycle (GTC) is utilized in three different channels, which overall makes this utilization highly efficient. In order to enhance the efficiency of utilization of the energy of GTC waste heat, the vortex temperature stratification effect, known from inventions U.S. Pat. No. 1,952,281, Mar. 27, 1934. METHOD AND APPARATUS FOR OBTAINING FROM A FLUID UNDER PRESSURE TWO CURRENTS OF FLUIDS AT DIFFERENT TEMPERATURES and RF Patent RU 2078253, Jul. 28, 1994. METHOD FOR CONVERTING THERMAL ENERGY OF AN EXTERNAL HEAT SOURCE INTO MECHANICAL WORK and described in detail in A. P. Merkulov. THE VORTEX EFFECT AND ITS APPLICATION IN ENGINEERING. Moscow, Mashinostroyeniye, 1969 and Martynov A. V. WHAT IS A VORTEX TUBE? Moscow, Energiya, 1976, is applied to the turbine exhaust gases. These exhaust gases are subjected to mass-temperature separation in a cascade of GTC vortex units in two or more stages and the high-temperature part of the gases obtained as a result of this separation is passed via a first waste heat energy utilization channel to the steam superheater of the first waste-heat boiler for generation of electrical power in the second Steam-Turbine Cycle (STC) of the HCC. The gases which have given up their thermal energy in this steam superheater are returned to the first waste-heat boiler for heating steam and after this the steam is condensed from the spent gases. The energy of this condensation is transferred via a second GTC waste heat energy utilization channel, using an independent heat-transfer agent, to heating of the liquid organic working medium used in the third internal cycle of the HCC. The low-temperature part of the gases obtained as a result of separation of the gas-turbine exhaust gases in the GTC vortex units is processed in a third GTC waste heat energy utilization channel, and specifically the low-temperature part of the gases is cooled in a first inter-cycle condenser, and the two-phase medium obtained at the outlet of this condenser is separated into water and gases in a separator. The cold part of the gas separated in the first stage of the cascade of vortex units is compressed to equalize the pressure thereof with the cold part of the gases of the second stage of the cascade of GTC vortex units, then the two cold parts of the gases are combined and this combined volume is condensed, as described above, in the first inter-cycle condenser. Water from the separator is used to prepare ACWF, and a part of it is passed to STC water treatment. The separated cold gases, which comprise mainly carbon dioxide, are compressed and utilized for cooling in the producer gas production process, which in a certain sense can be considered as an additional fourth channel for utilization of thermal energy discarded from the GTC.

The second and third internal cycles of the method now proposed for implementation of an HCC are formed as cycles with enhanced efficiency thanks to exclusion of a significant part of the intra-cycle energy losses due to the recuperation thereof within the cycle using the vortex temperature stratification effect in a similar manner to that carried out in invention RF Patent RU 2078253, Jul. 28, 1994. METHOD FOR CONVERTING THERMAL ENERGY OF AN EXTERNAL HEAT SOURCE INTO MECHANICAL WORK.

The second internal STC of the HCC now proposed is implemented on the basis of a steam turbine driven by the energy of GTC waste heat and part of the energy which is taken off directly from the gas turbine combustion chamber by means of a heat-exchange superheater. Thus, the conversion of this waste heat energy into STC input energy is performed by means of a feed water heater in the first inter-cycle condenser and by the transfer of heat in the steam heater and in the steam superheater of the first waste-heat boiler as described above. Here, superheating of the steam in the steam superheater is accomplished by steam from the last stage of the cascade of vortex mass-temperature separation of gas turbine exhaust gases, while additional superheating of this steam (super-superheating) is carried out in a super-superheater which takes heat from the syngas combustion products before these are fed into the gas turbine. This solution provides conversion of the thermal energy of the gas-turbine exhaust gases into mechanical energy of the steam turbine High-Pressure Cylinder (HPC) at the level of supercritical parameters, on the one hand, and on the other ensures the fall in the temperature of the working gases blown into the gas turbine necessary in order to maintain the operational service life before replacement of its blades. Here, the relatively high temperature of the combustion products of the syngas highly saturated with hydrogen, which is approximately 2000 degrees C., can be reduced to 1100-1600 degrees C., depending on the efficiency of the forced cooling of the turbine blades and on the properties of the structural materials of these blades. In connection with this, and depending on the nominal operating temperature of the blades of a specific gas turbine, specialists set the design parameters of the super-superheater by means of which heat is removed from the syngas combustion products before these are fed to the gas turbine.

Before supplying feedwater heated in the first inter-cycle condenser to the first waste-heat boiler, it is additionally heated, using an independent heat-transfer agent, by the energy of steam turbine LPC spent steam, while water under pressure is superheated in the first waste-heat boiler by the energy of producer gas taken from the gas generator. STC feedwater is evaporated in the steam generator of the first waste-heat boiler by means of the hot part of the steam obtained on separation of steam turbine HPC spent steam. The mass-temperature separation of HPC spent steam is carried out in two (or more) stages of the STC cascade of vortex units. In this process, the hot part of the steam being passed to the steam generator of the first waste-heat boiler and which has the highest temperature is taken off from the last stage of the cascade of vortex units. The mass of steam, from which part of the energy has been utilized in the steam generator of the first waste-heat boiler, is passed to the Medium-Pressure Cylinder (MPC) of the steam turbine, where the corresponding mechanical energy is generated, and from the MPC this mass of spent steam is, in its turn, passed to generate energy in the LPC. The spent steam from the LPC is cooled, with part of the resultant heat being passed, as described earlier, to heating of STC feedwater while another part of this resultant heat is utilized in the GTC for heating air and syngas before the combustion thereof in the gas turbine combustion chamber. This spent steam is then combined with the "cold" part of the steam obtained during mass-temperature separation of spent steam from the steam turbine LPC. The mass of combined steam is compressed and transferred (as STC waste energy) to the organic working medium steam generator of the second waste-heat boiler for generation of electrical power in the third internal cycle of the HCC.

The mass of steam, from which part of the energy has been utilized in the steam generator of the second waste-heat boiler, is condensed in the second inter-cycle condenser, and the water obtained is additionally cooled, utilizing the energy of the cold part of the organic working medium, obtained from the last stage of the cascade of vortex units of the Organic Turbine Cycle (OTC). The cold water thus obtained is used as a coolant in the first inter-cycle condenser, where it is heated by the energy of moisture condensation of the moisture contained in the part of the gas-turbine exhaust gases obtained during mass-temperature separation of gases, as described above.

The HCC now proposed thus provides deep integration of mass- and heat-exchange processes of direct and reverse recuperation. The STC thermal energy conversion efficiency is 43.4-49%.

In order to ensure that it is possible to use supercritical parameters of the working medium in the STC in order to achieve maximum cycle efficiency, including the operational efficiency of STC condensers, the invention now proposed uses, as an alternative, not water, but a mixture consisting of a small amount of helium and titanium tetrachloride, as the working medium. Titanium tetrachloride, which has a boiling point of 135.9 deg. C., exhibits stable properties to a temperature of 1727 deg. C., while its critical temperature is 357.9 deg. C.

The last internal cycle of the HCC, the organic turbine cycle, is constructed on the basis of a working medium which has a low boiling point. The ozone-safe Freons R23, R32, R125, R134a and R152a, mixtures of Freons, such as R407c, R507 and R508, and the low-temperature R404A mixture may be used for this purpose. An azeotropic mixture of R507c Freons can be used efficiently, also a high-density R410A mixture, which is virtually free from temperature slip and has high thermal conductivity in combination with relatively low viscosity. The use of promising perfluorocarbons is also not excluded here, should their cost become acceptable. In specific HCC designs, it is also possible to use known hydrocarbon working media, alkanes such as butane (R600 with a boiling point of −0.5 deg. C.) or the isomer thereof (isobutane R600a with a boiling point of −11.7 deg. C.) in the OTC. The use of isobutane in the OTC is justified in view of its ozone safety and its thermodynamic properties in connection with the use in the invention now proposed of supercritical parameters, which are created thanks to the mass-temperature separation of the working medium. Thus, the critical temperature of isobutane is 134.69 deg. C., while the critical pressure is 3.629 MPa, with a density of 225.5 kg/m$^3$. In connection with these parameters, and in accordance with the invention now proposed, it is desirable to use isobutane with an initial pressure of up to 5 MPa in the cycle in order to secure maximum OTC efficiency. A two-component water-ammonia mixture in Kalina cycles can be used as the organic working body in HCC. The equilibrium state between the liquid and gaseous phases for each component of this mixture commences at different temperatures. The cycle provides a high-efficiency optimized process of thermal energy transfer during the evaporation and condensation of the working medium over a fairly wide temperature range up to the dissociation temperature of the mixture, 550-600 degrees Celsius.

For implementation of the OTC in the invention now proposed, the vapor of the organic working medium is passed from the steam generator of the second waste-heat boiler to the steam heater of this boiler, in which the vapor is superheated to supercritical parameters thanks to heat-exchange with the superheated vapor of this same working medium which are obtained during mass-temperature separation of the organic medium vapor in the OTC cascade of vortex units. Having, in their turn, been produced in the cascade of vortex units, the cold parts of the organic medium vapor are utilized in the STC and in the OTC, returning the energy of these vapors to the overall HCC. Thus, one part of the cold vapor is heated by water condensed in the second inter-cycle condenser (the STC condenser), using this part of the vapor further as a coolant in the same condenser. Another, colder, part of the organic working medium vapor, obtained from the first stage of the OTC cascade of vortex units, is heated in a secondary coolant of the cooler condenser, improving operation of the latter. This part of the vapor is then compressed, equalizing its pressure with the part of the cold organic working medium vapor used as a coolant in the STC condenser and, after discharging this part of the vapor from this condenser, the two parts of the cold vapor are combined also with vapor which has been used successively in the MPC and the LPC of the organic turbine. Then, in order to raise their condensation temperature, the entire mass of the three combined parts of the organic working medium are compressed and condensed into liquid in the OTC condenser.

From the OTC condenser, the organic working medium liquid is fed into a feed vessel, from which this liquid is passed by a feed pump into the steam generator of the second waste-heat boiler, pre-heating it, by means of an independent heat-transfer agent, by the heat of condensation of part of the gas turbine exhaust gases, as described earlier.

The organic medium vapor with supercritical parameters from the steam heater of the second waste-heat boiler is used in the HPC of the organic turbine and then "this" (spent) vapor is subjected to mass-temperature separation in the OTC cascade of vortex units, as mentioned earlier. Vapor with part of the energy removed by the steam heater is passed to the MPC and then to the LPC of the organic turbine to generate mechanical energy. After this, this spent vapor is combined, as a third part, with two parts of cold organic working medium vapor heated in the STC condenser and in the secondary coolant of the cooler condenser, as has already been described above. Cooling in the OTC condenser is provided by a cooler, the compressor of which drives the organic cycle turbine. The OTC condenser is thus simultaneously the evaporator of the cooler. Here in the HCC, the main heat being discarded after the cooler compressor is utilized for heating the ACWF before conversion thereof, is used to heat the volatiles before these are fed into the gasifier, and furthermore the syngas is heated by means of this waste heat for combustion thereof in the GTC combustion chamber.

OTC thermal energy conversion efficiency is 44-49.8%.

A feature of the OTC of the HCC now proposed is the need for forced start-up of the OTC. For this purpose the electrical machine of the OTC and the control apparatus of this machine permit operation thereof not only in generator mode but also in drive mode.

In sum, the structural/functional design of the HCC now proposed provides high-efficiency conversion of thermal energy into mechanical energy. The proportion of thermal energy discharged into the environment from the HCC is determined solely by the heat carried away by the water condensed from part of the exhaust gases in the GTC and the OTC waste heat. With allowance for design decisions on regenerative utilization of waste heat between adjacent cycles, the overall efficiency of conversion of the thermal energy of syngas in the HCC is determined using the formula:

$$Q_{HCC} = \eta_{GTC} + (1-\eta_{GTC}) \times [\eta_{STC} + (1-\eta_{STC}) \times \eta_{OTC}].$$

Where:
$\eta_{GTC}$ is the GTC coefficient of conversion of thermal energy into electrical energy;
$\eta_{STC}$ is the STC coefficient of conversion of thermal energy into electrical energy;
$\eta_{OTC}$ is the OTC coefficient of conversion of thermal energy into electrical energy.

For a $\eta_{GTC}$ taken from V. V. Zykov, F. A. Serant, L. I. Pugach, G. V. Nozdrenko, Yu. V. Ovchinnikov. STEAM-AIR UNITS OF A SOLID FUEL THERMAL POWER STATION. Sbornik nauchnykh trudov "TEPLOENERGETIKA" NGTU, Issue No. 5. Novosibirsk, 2001, pp. 171-177 of approximately 37%-41.5%, the overall HCC efficiency is 80-85%.

In connection with preliminary PDHG of coal, significant features of the HCC employed include:

use of the entire heat of combustion of the coal, in view of the absence of mechanical and chemical underfiring of the coal when it is used as ACWF;

cleaning of the syngas discharged from the gasifier;

combination of the combustion chamber of the gas turbine with the gasifier with the object of radiation activation of the ACWF being gasified and to protect the gasifier walls against slag deposition;

use of the energy of compressed syngas in the combustion chamber of the gas turbine in the gasification process by heating the radiant wall of the gasifier to activate the ACWF;

use of the energy of compressed syngas in the combustion chamber of the gas turbine in the gasification process by heating volatiles remote from the coal before they are combusted;

cooling the syngas discharged from the gasifier with the use of heat obtained in the STC and in the gasification process, and also for heating air and syngas being compressed in the combustion chamber of the gas turbine;

use of OTC waste energy for heating process water in the gasifiable ACWF preparation process and in the gasification process for heating coal volatiles and ACWF fed into the gasifier, and also for heating gas-coal dust composition before the introduction thereof into the gasifier;

use of the energy of the cold part of compressed gas turbine exhaust gases obtained after mass-temperature separation of these gases for solidifying ash in the gasifier with the object of preventing slag deposition on its walls.

DISCLOSURE OF THE INVENTION

The object of the invention is high-productivity generation of good-quality syngas highly saturated with hydrogen to ensure minimal emission of carbon dioxide on combustion thereof with the aim of generating electrical power. In the invention now proposed, this object is achieved by optimization of mass transfer and convective mass exchange of carbon conversion reaction components, in combination with full decomposition of the water present in ACWF in stoichiometric ratio for the chemical reactions of syngas formation. Thus, for example, it was demonstrated in invention G. P. Sechenov, G. N. Delyagin, L. I. Larin, L. D. Leonova METHOD FOR GASIFICATION OF FINE-GRAIN COAL. Inventor's Certificate SU 371269, 1973 in relation to the gasification of coals that the conversion combustion of CWF allows a water utilization coefficient of the order of 100% to be obtained when the amount thereof is strictly specified. Here, the water present in the CWF is usefully consumed in the formation of hydrogen and carbon monoxide [Khodakov G. S., Gorlov Ye. G., Golovin G. S. SLURRIED COAL FUEL, Khimiya tvyordogo topliva Moscow, 2005, (6), 15-32], with a maximum hydrogen content in the syngas of up to 56% [Shumeyko M. V. USE OF COAL-WATER AND COAL-HEAVY FUEL OIL SLURRIES AND ULTRA-CLEAN COAL-HYDROGEN POWER TECHNOLOGIES. Ugol' (Moscow), 2007, July. Such ACWF is used in the gasification process proposed without a steam-oxygen blast and, in connection with this, such fuel is self-sufficient, since it contains within itself from the start all the reaction components needed to obtain syngas. The high syngas generation productivity is founded on basic processes for the gasification of CWF in a cocurrent stream which are characterized by the continuous nature of the processes and the absence in the design of the gasifiers of units such as gates and feeders which permit operation in batch mode at high pressures and temperatures and are difficult when operating with dry fuel [Khodakov G. S. COAL-WATER SLURRIES IN POWER ENGINEERING. Teploenergetika (Moscow), 2007, (1), 35-45]. Since CWF can be transported by special pumps, the use thereof is particularly promising in gasification processes in conditions of elevated pressures, since the difficulty of feeding dry coal into a gasifier is avoided and bulky steam power facilities are eliminated [Burdukov A. P., Popov V. I., Fedosenko V. D., Tomilov V. G. Coal-water slurries in thermal power engineering. Trudy seminara VUZOV Sibiri i DV po teplofizike i teploenergetike posvyashchyonnogo pamyati akademika S. S. Kutateladze, Novosibirsk, 6-8 Oct. 1999, pp. 111-123 and G. N. Delyagin. Experience in combustion of coal-water slurries in steam boilers (Review). TsNNII Informatsii i TE issledovaniy ugol'noy promyshlennosti. Moscow, 1966, pp. 21, 83].

The technical implementation of optimized mass transfer and mass exchange of reaction components in the method now proposed is accompanied by the accurate metering of ACWF not only in relation to the parameters of its mass over time, but also by precise calibration of each droplet thereof introduced into the gasifier, and also in relation to a vector value—the impulse of the amount of movement of each fuel droplet. Particularly precise and specific metering of ACWF for high gasification process productivity is employed proceeding from a simple phenomenological model constructed in accordance with the inventive concept using the following criteria:

overdosing leads to blockage of access to the surfaces of reaction components, as a consequence of which their mass exchange is reduced, which lowers process productivity;

inadequate dosing ensures relatively good mass transfer and mass exchange of the reaction components, but the spatial volume of the chamber for possible reactions is not utilized efficiently, which potentially reduces process productivity;

adequate access of reaction components to chemical convective mass exchange is ensured by minimal blockage of the travel path of components in the course of their mass transfer;

enhancing mass transfer and convective mass exchange of reaction components is associated with the kinetic energies of mechanical motion thereof, and from the point of view of activation of chemical mass exchange on the mechanical energy of contact between these components;

the dominant parameter of activation of chemical convective mass exchange from the mechanical energy of contact between the reaction components is the speed of travel of these components, while the values of localized masses, of sprayed fuel droplets in the present case, is a less significant parameter;

the dominant parameter of activation of convective mass exchange of reaction components from the supply of heat is high radiation transparency of gasification reaction zones when a strong source of thermal radiation is present.

With regard to the specific mechanics involved in feeding fuel into the gasifier, the specific dosing of fuel in the new gasification technology has been named Activation Dosing. A particular aspect of the gasification technology in the method now proposed, which is also associated with fuel dosing, is an engineering solution to ensure high process productivity, based on stabilization of the optimal parameters of ACWF conversion combustion, in connection with the high homogeneity of this fuel. The high homogeneity of ACWF, in accordance with the present invention, ensures completion of activation processes for all droplets of a fuel dose, and their virtually simultaneous explosive conversion combustion. In this process, using the technology of the present invention, the spread of ACWF combustion ash, which is normally observed in the fire-box interior in CWF combustion practice [Khidiyatov A. M., Osintsev V. V., Gordeyev S. V. et al. RESULTS OF CONVERTING A COAL DUST BOILER WITH A STEAM CAPACITY OF 89 kg/s TO BURNING COAL-WATER SLURRY. Teploenergetika, 1987, (1), 5-11], is entirely absent. The ACWF used, with dosable homogeneity of properties, ensures high stability of the characteristics thereof and allows the entire gasification process to be performed with strictly regulated parameters of activation action on this fuel. In view of its specific self-sufficiency in relation to gasification conversion reactions, the strictly regulated parameters of activation action on ACWF ensure high productivity of the technological process for production of syngas highly saturated with hydrogen. Since in the process of gasification of a single batch (of one and the same coal) up to 6 different grades of ACWF, prepared from this batch of coal, are used in the method now proposed. Furthermore, the object of high-productivity generation of syngas highly saturated with hydrogen is achieved in a generally applicable manner by the technology proposed in two embodiments, in relation to the coal caking and coking properties and in relation to the properties of coals in the plastic state, such as viscosity, swellability, expansion pressure, gas permeability, gas evolution dynamics and the temperature range of the plastic state. The gasification technology proposed in the invention is based on technical solutions similar to solutions and methods used for detonated combustion in aerospace engineering engines [S. M. Frolov. COMBUSTION SCIENCE AND PROBLEMS OF MODERN POWER ENGINEERING. Zhurnal Rossiykogo khimicheskogo obshchestva im. D. I. Mendeleyeva, 2008, LII, (6), 129-134], when the fuel combustion process is anomalous with intensive formation of active centers which result in spontaneous acceleration of the reaction. However, because of the significant differences in the properties of liquid coal fuel and the properties of aviation fuel, a coal fuel of high homogeneity is specially prepared and used in the invention now proposed in order to ensure that the conversion combustion thereof can be carried out in controlled pulsed modes, using the self-sufficiency property of this ACWF fuel. Controllable activation of the energy of peroxides and hydroperoxides in the volatiles of the macerals is employed both in the classic detonation process, when the basic cause of the occurrence of detonation is decomposition of active peroxides (oxygen-containing substances), resulting in explosive combustion of the fuel, and also in the invention now proposed. Unfortunately, the properties of the multicomponent volatiles of coals are usually unknown [21] but, taking into account that the interim stage of the combustion of volatiles forms a small fraction of the total combustion time of a coal particle [Burdukov A. P., Popov V. I., Fedosenko V. D., Tomilov V. G. Coal-water slurries in thermal power engineering. Trudy seminara VUZOV Sibiri i DV po teplofizike i teploenergetike posvyashchyonnogo pamyati akademika S. S. Kutateladze, Novosibirsk, Oct. 6-8, 1999, pp. 111-123], it is assumed that the combustible part of the volatiles contains relatively much of the above-mentioned active peroxides. Furthermore, peroxides and hydroperoxides are formed in the course of ACWF combustion by the reduction of unstable active compounds in accordance with the theory of chain reactions of oxidation of multi-component fuels, which proceeds together with the process of formation of the final products of oxidation. As a result of the continuously repeating reactions of decomposition and reduction of active peroxides, chains are formed with large numbers of active centers, resulting in spontaneous acceleration of the reaction in connection with the liberation of atomic oxygen, which in specific conditions initiates low-level detonation. However, because of its multicomponent nature, the ACWF combustion process differs significantly from the process of combustion of gasified liquid hydrocarbon fuel, including the detonation effect. Thus, in droplet ACWF the effect of low-level detonation, in its classical form, is manifested only for the combustible part of the volatiles. Also, explosive processes of combustion of droplets of this fuel further include effects associated with water vaporization and the fluidization of this vapor, the decomposition products of which, particularly oxygen, react with the carbon part of the fuel in conditions of efficient mass transfer and reaction mass exchange. The high local velocities of these processes, which exist over short intervals of time, comparable with the time for complete burning of CWF droplets as seen in practice, allow a judgment to be made concerning the possible commencement of the development of detonation and that the level of this detonation will be low in view of the clearly small spatially localized concentrations of fuel components enriched with oxygen, which in the general case corresponds to the classical concept of the development of detonation. The present invention further discloses a mechanism of explosive synchronous conversion combustion of a droplet dose of ACWF, accompanied by a low level of detonation with rapid "deceleration" of this. In connection with this, the invention introduces the concept of the performance of "continuous" Pseudo-Detonated Hydro-Gasification (PDHG) of ACWF in the cocurrent stream of a vertical gasifier, employing the force of gravity to drive the reaction components. Thus, by a certain analogy with the traction modules of Pulse Detonation Engines, which consist of reactor-gasifiers and resonators, wherein decomposition of fuel molecules into active components occurs in the gasifiers, preparing these for detonation combustion, and detonation occurs in the resonators [25], the gasification method now proposed employs technological zoning in the course of conversion processing of the ACWF. Thus the necessary sequence of operations are performed in each process-specific zone of the gasifier. In order to provide the required length of time for processing the reaction components into syngas, a tangential-vortex motion is applied thereto, which increases the length of the travel path of the reaction components in the gasifier. High-precision metered spraying of the fuel is performed in the gasifier fuel pylon (FP), accompanied by the application of a determined amount of motion to each droplet thereof in order to entrain the droplets in the spiral motion. Here, the metering ensures secondary homogeneity of the ACWF. Spin-up of the fuel dose then occurs in the gasifier zone known as the final fuel preparation (FPF) zone by injecting a spiralling stream of gases downwardly along the vertical axis of the gasifier. This stream is pre-formed in a special vortex chamber and it comprises part of the volatiles of the coal, obtained in the course of preparing the ACWF. When coal with a low volatiles content is used, syngas or carbon dioxide extracted from the syngas in the cleaning subsystem therefor is mixed with this stream. In addition, the above-mentioned spin-up of the fuel dose in the FPF zone is additionally performed from the walls of the gasifier by tangential injection of gas mini-jets of the same composition which spiral around their injection axes, using special active interceptors which simultaneously also perform another function—protection of the gasifier walls against possible adherence of fuel. When coals are employed which have vitrinite or liptinite macerals with a specific stage of metamorphism resulting in coal with good caking and coking properties, the invention now proposed employs spraying onto the surface of ACWF droplets of "dry" coal particles with a particle-size composition of 0 . . . 30 μm, which are obtained in the course of ACWF preparation. This spraying is performed directly into the gasifier in the final fuel preparation zone, through the above-mentioned active interceptors in gas mini-jets with volatiles separated from the coal or with a composition of added syngas or carbon dioxide. The final preparation and activation of the fuel is thus carried out in the FPF zone of the gasifier by forming a determined and stable aerodynamic structure of a two-phase/composite vortex with stable normal operating parameters. The stability of the structure of this vortex is due, on the one hand, to the self-organization property of vortexes, and on the other to the use of mechanics of forced formation thereof, which comprises the formation of fractally-twisted high-enthalpy jets. Designing the generation of high-enthalpy twisted jets into a fractally vortical structure is not considered in the present invention and may be carried out as a project by appropriate specialists, as indicated, for example, in MODELS AND METHODS IN AERODYNAMICS. Russian Academy of Sciences, National Academy of Sciences of Ukraine, Zhukovskiy Central Aerohydrodynamics Institute, Ukrainian NAS Institute of Hydromechanics. Trans. $5^{th}$ International Seminar-School. MTsNMO, Moscow, 2005, pp. 9, 40, 98, 99.

The fuel composition then travels further under gravity into the radiant thermal activation (RTA) zone, where heat is supplied primarily by radiation to the ACWF droplets and evaporation of moisture from their surface layer commences. Intense delivery of heat is provided from the radiant walls of a gasifier of special design, which are enclosed in the interior of the combustion chamber of the HCC gas turbine such that the combustion chamber encompasses within it in an annular manner the gasifier in the RTA zone and in following zones thereof—the main Pseudo-Detonated conversion (PDC) zone and the conversion after-burning (CAB) zone.

The structure of the two-phase/composite vortex is retained in the RTA zone with the object of providing the required fuel residence time in this zone. This structure is maintained by tangential injection, from interceptors built into the walls of the RTA zone of the gasifier, of hot gases spiralling around their axes and mini-jets of volatiles obtained from the coal during the preparation of ACWF. Syngas or carbon dioxide may be added to these volatiles if there is an insufficient amount thereof. In order to provide the fuel residence time in the RTA zone, this zone is designed with a sufficiently large vertical dimension in order to increase the length of the travel path of the gasification reaction components. In addition, the injection of gas mini-jets from the interceptors of the RTA zone creates a protective gas boundary layer to prevent fuel adhering to the walls of this zone. Using the technology for gasification of vitrinite and liptinite coals, after completing the evaporation of moisture from the surface layer of fuel droplets in the RTA zone, the caking of coal particles on the surface of droplets, sprayed previously in the FPF zone, commences under the influence of intense thermal radiation. The caking process is accompanied by further evaporation of the moisture of the surface layer of droplets and the migration of solid coal particles towards the droplet surfaces, with a certain, small, reduction in the size of the droplets. Porous agglomeration shells then form on the surface of droplets and water vapor is liberated through the pores of these shells from the internal regions of the drying droplets. The process of forming the agglomeration shells of droplets is then completed with intensive delivery of radiant heat, accompanied by rise in the internal pressure of the droplets due to intensification of vapor formation, the agglomeration shells start to stretch, and the size of the droplets increases with a 2- to 5-fold increase in the volumes thereof [A. A. Vintovkin, M. G. Ladygichev, Yu. M. Goldobin, G. P. Yasnikov. TECHNOLOGICAL COMBUSTION AND UTILIZATION OF FUEL. Teplotekhnik, Moscow, 2005, pp. 176-183]. That CWF may exhibit the characteristics proper to Bingham fluids, including exhibiting the ability to swell has also been cited in Gorlov Ye. G. COMPOSITE WATER-CONTAINING FUELS FROM COALS AND PETROLEUM PRODUCTS. Khimiya tvyordogo topliva (Moscow), 2004, (6), 50-61. At the same time as this, intensive evolution of a vapor-gas composition consisting of water vapor and residual coal volatiles occurs through the pores of the agglomeration shell. Furthermore, micro-jets of this composition may contain within them micro-droplets of unevaporated moisture, or of condensed moisture, which may occur in the form of pressure gradient "plays" in the boundary microlayers of jets due to the roughness of the internal surfaces of pores of the agglomeration shells of fuel droplets. For the case of ACWF droplets prepared in accordance with the regulations for grade $ACWF^{45}$, made from coal particles with 0 . . . 45 μm particle size, the vapor-gas jets of this composition may also contain a certain, small, amount of coal microparticles.

The following phase of conversion processing of ACWF in the RTA zone is activation of the surfaces of pores in the agglomeration shell of droplets due to high-velocity masstransfer of vapor-gas composition, accompanied by friction of this composition on the surface of the pores. This activation ensures that the process of conversion of carbon on the surface of agglomerate pores takes place. Thus, it has been demonstrated experimentally [A. A. Vintovkin, M. G. Ladygichev, Yu. M. Goldobin, G. P. Yasnikov. TECHNOLOGICAL COMBUSTION AND UTILIZATION OF FUEL. Teplotekhnik, Moscow, 2005, pp. 176-183] that for CWF droplets the processes of drying the slurry water and thermal decomposition of the coal proceed in parallel with the process of combustion and the reaction of heat emission at the surface of a droplet commences before drying of the droplet is completed.

It has been noted [Baranova M. P. IMPROVEMENT IN THE TECHNOLOGY OF PRODUCING COAL-WATER SLURRIES. Authors abstract of dissertation for the degree of Candidate of Technical Sciences. Krasnoyarsk State technical University. Russia, Krasnoyarsk, 2006, p. 20] that finer spraying of CWF (secondary spraying of the hydrocarbon base) occurs in practice due to micro-explosions of slurry droplets. However, despite the repeated references in various sources to micro-explosions of fuel droplets [Burdukov A. P., Popov V. I., Fedosenko V. D., Tomilov V. G. Coal-water slurries in thermal power engineering. Trudy seminara VUZOV Sibiri i DV po teplofizike i teploenergetike posvyashchyonnogo pamyati akademika S. S. Kutateladze, Novosibirsk, Oct. 6-8, 1999, pp. 111-123, Gorlov Ye. G. COMPOSITE WATER-CONTAINING FUELS FROM COALS AND PETROLEUM PRODUCTS. Khimiya tvyordogo topliva (Moscow), 2004, (6), 50-61, Baranova M. P. IMPROVEMENT IN THE TECHNOLOGY OF PRODUCING COAL-WATER SLURRIES. Authors abstract of dissertation for the degree of Candidate of Technical Sciences. Krasnoyarsk State technical University. Russia, Krasnoyarsk, 2006, p. 20, A. M. Khidiyatov, V. I. Babiy, V. V. Osintsev, V. S. Rybin, L. I. Dubovtsev, A. M. Smakov, A. Ya. Klobertants, K. A. Agapov, B. S. Poligradov. FUNDAMENTAL RESULTS OF RESEARCH INTO COAL-WATER FUEL AND PROSPECTS FOR ITS UTILIZATION. Collected scientific papers of the All-Russian Thermal Engineering institute, "Development of technologies for the preparation and combustion of fuel at electric power stations". Moscow, 1996, pp. 123-141, their authors have so far not presented a detailed logical description of the action of the mechanism of micro-explosions. Furthermore, sources [Khidiyatov A. M., Osintsev V. V., Gordeyev S. V. et al. RESULTS OF CONVERTING A COAL DUST BOILER WITH A STEAM CAPACITY OF 89 kg/s TO BURNING COAL-WATER SLURRY. Teploenergetika, 1987, (1), 5-11 and A. A. Vintovkin, M. G. Ladygichev, Yu. M. Goldobin, G. P. Yasnikov. TECHNOLOGICAL COMBUSTION AND UTILIZATION OF FUEL. Teplotekhnik, Moscow, 2005, pp. 176-183] note the high porosity of the agglomeration shells of dried CWF droplets and the regular nature of the burnup of the coke residue of a droplet after losing the volatiles, which is clearly contrary to the data of other sources which indicate the explosive nature of the combustion of CWF droplets. The effect of the caking ability of the coal on the formation of a strong surface shell of a CWF droplet, and even a shell which is not destroyed under the influence of temperature and internal pressures, has been demonstrated [G. N. Delyagin, A. I. Kulinich, V. I. Kirsanov. EXPERIMENTAL STUDY OF THE PROCESS OF BURNING DROPLETS OF COAL-WATER SLURRY MADE FROM BROWN AND GAS COALS. Combustion of disperse fuel systems. Nauka, Moscow, 1969 (IGI), pp. 55-68]. The greater the caking ability of the coal, the stronger is the agglomeration layer which forms on the CWF droplet surface [G. N. Delyagin, A. I. Kulinich, V. I. Kirsanov. EXPERIMENTAL STUDY OF THE PROCESS OF BURNING DROPLETS OF COAL-WATER SLURRY MADE FROM BROWN AND GAS COALS. Combustion of disperse fuel systems. Nauka, Moscow, 1969 (IGI), pp. 55-68]. In regard to this, similar data have been presented [Khidiyatov A. M., Osintsev V. V., Gordeyev S. V. et al. RESULTS OF CONVERTING A COAL DUST BOILER WITH A STEAM CAPACITY OF 89 kg/s TO BURNING COAL-WATER SLURRY. Teploenergetika, 1987, (1), 5-11] which indicate that the structure of CWF slag, compared to the slag from powder combustion of coal, is extremely porous, consisting of agglomerates with clear signs of under-firing. On the other hand, the "force" of CWF micro-explosions can be judged from the data of A. M. Khidiyatov, V. I. Babiy, V. V. Osintsev, V. S. Rybin, L. I. Dubovtsev, A. M. Smakov, A. Ya. Klobertants, K. A. Agapov, B. S. Poligradov. FUNDAMENTAL RESULTS OF RESEARCH INTO COAL-WATER FUEL AND PROSPECTS FOR ITS UTILIZATION. Collected scientific papers of the All-Russian Thermal Engineering institute, "Development of technologies for the preparation and combustion of fuel at electric power stations". Moscow, 1996, pp. 123-141 which indicates the breakdown of solid particles into finer particles, with individual fine particles ejected beyond the limits of the droplet. In view of this, the task of fuller disclosure of the mechanism of micro-explosions of CWF slurry droplets during the thermal activation of these for combustion is achieved in the present invention. In fact, particles of the solid phase of dried CWF droplets, particles contained in the agglomeration shell of a dried droplet, and also particles of the interior of a dried droplet "explode". In Gorlov Ye. G. COMPOSITE WATER-CONTAINING FUELS FROM COALS AND PETROLEUM PRODUCTS. Khimiya tvyordogo topliva (Moscow), 2004, (6), 50-61 it is noted that the water enclosed in the fuel shell is heated and due to the difference in the boiling point of water and the fuel shell breakdown temperature passing into the vapor state (the volume of the mass of normal vapor relates to the volume of water as 1600:1 [NEW POLYTECHNICAL DICTIONARY. Moscow, Bol'shaya Rossiyskaya Entsiklopediya, 2000]) the shell breaks down, i.e. a "micro-explosion" of each fuel droplet occurs, and this phenomenon plays a part in the secondary disintegration of the fuel, thus facilitating an increase in the rate and completeness of the combustion thereof in view of the abrupt increase in the areas of the carbon-reaction surfaces by hundreds and thousands of times. Thus, microparticles of superfine particle-size composition with sizes of $10^{-4}$-$10^{-3}$ mm are formed from the entire mass of each droplet in the course of micro-explosions of fuel-slurry droplets and the particles thereof by means of the so-called secondary disintegration of fuel. The dimensional homogeneity of droplets and the property of radiation in the infrared range to penetrate deeply into fuel droplets, providing simultaneous and intense delivery of heat into floccules and the pores of coal particles and into "free" water contained within fuel droplets are important factors determining the degree of synchronicity of "micro-explosions" of particles of the agglomeration shell and particles of the interior of a fuel droplet. In regard to the synchronicity of said "micro-explosions", it is noted in the invention now proposed that about 400 particles of ACWF solid phase may be "exploded at once" in only one CWF droplet, for example with a diameter of 0.2-0.4 mm, if the dimensions of the particles in a droplet of said diameter is in the range 40-50 μm [G. N. Delyagin. EXPERIENCE IN THE COMBUSTION OF COAL-WATER SLURRIES IN STEAM BOILERS (Review). Moscow, TsNII Informatsii i TE issledovaniy ugol'noy promyshlennosti, 1966, p. 87].

A phenomenological model of the coal conversion technology now proposed assumes the existence of two mechanisms of a micro-explosion nature for the conversion combustion of ACWF, the fundamental differences between which are based on the use of different grades of coal. Specifically, for coals of the vitrinite group and the liptinite group, the micro-explosion nature of combustion takes account of the properties of plasticity and caking ability, while for coals of the huminite, inertinite and semivitrinite groups these properties are not taken into account as they are largely absent [COAL. TERMS AND DEFINITIONS. GOST 17070-87. Moscow, Gos. komitet po standartam]. In connection with this, the gasification technology now proposed is presented in two modifications, as has already been mentioned above. Thus, the centers of micro-explosion combustion of droplet residues of specific stages of metamorphism formed in the course of ACWF processing in a gasifier are:
    for ACWF prepared from huminite, inertinite or semivitrinite coals—floccules and micro-pores of coal particles contained in the interior of droplets;
    for ACWF prepared from vitrinite and liptinite coals—primarily the agglomeration shells of droplets, and together with these floccules and micro-pores of the coal particles in the interior of droplets.

One of the subsidiary objectives achieved in the invention is the task of ensuring that the conversion "burnup" of the coke residues of a droplet dose of ACWF and the liberation of volatiles coincide. This task is achieved in that when heat is supplied to fuel droplets at a low rate (as sometimes occurs), the droplet burning process proceeds at a steady rate, without secondary disintegration of the fuel, i.e. without micro-explosions. For example, the time for complete combustion of a CWF droplet of large diameter—2.7 mm, is about 50 seconds [A. A. Vintovkin, M. G. Ladygichev, Yu. M. Goldobin, G. P. Yasnikov. TECHNOLOGICAL COMBUSTION AND UTILIZATION OF FUEL. Teplotekhnik, Moscow, 2005, pp. 176-183]. Taking account of this, the invention employs formation of fuel droplets of a relatively small diameter of 0.8-1.2 mm and heat is supplied to them primarily by radiation with a radiant energy flux of high density, in order to ensure stability of the micro-explosion nature of ACWF conversion combustion. For example, for an ACWF droplet with a diameter of 1.0 mm located at a distance of 170 mm from a radiant wall with a temperature of 2073 degrees Kelvin, the power of the thermal radiation absorbed by this droplet is 0.3 W, while its activation time for Pseudo-Detonated conversion is about 2.5 seconds in total.

The invention thus provides a high rate of the process of agglomeration of the surfaces of dried fuel droplets, which allows the internal, free moisture of the droplet to be "conserved" for a certain short time, having created externally a protective "elevation" of pressure which increases the pressure within the droplet. In addition (thanks to the agglomeration shell) increasing the pressure within the droplet facilitates (via a chain of forces such as counter-pressure) delay in break-up of the coal particles under the rising pressure of the internal moisture of micropores and floccules, which also ensures accumulation of internal energy of the total pressure of the fuel droplets. The ACWF droplets are thus prepared for micro-explosion, creating a sort of "bomb" from the agglomeration shell with the above-described, dynamically developing "filling", providing the potential for efficient mass transfer and mass exchange of reaction components during explosive conversion combustion.

The need to use fuel droplets of small size and the need for intensive delivery of heat to the CWF droplets can be judged from literature data [Babiy V. I., Barbarash V. M., Stepashkina V. A. EFFECT OF MOISTURE AND ASH CONTENT OF COAL-WATER SLURRY ON PROCESSES OF IGNITION AND BURNING OF SLURRY DROPLETS. Elektricheskiye stantsii (Moscow), 1991, (7), 24-28]. Data are presented here which show that with an initial CWF droplet size of 0.65 mm, the time for drying to the commencement of volatiles evolution was 0.7 seconds in total. It has been demonstrated [G. N. Delyagin, I. V. Davydova. COMBUSTION OF SOLID FUEL IN THE FORM OF COAL-WATER SLURRIES. TsNII Ekonomiki i NT informatsii ugol'noy promyshlennosti. Series "Coal beneficiation and briquetting technology", Moscow, 1969, p. 48] that in a cyclone firebox of the Verner power station (USA), the residence time of CWF solid phase in this firebox was only 0.01 second, thanks not only to the fact that droplets of small diameter were used, but also to the temperature in the firebox being 1650 deg. Celsius. The need to use droplets of small size in a PDHG process can also be judged from the data presented in Burdukov A. P., Popov V. I., Fedosenko V. D., Tomilov V. G. Coal-water slurries in thermal power engineering. Trudy seminara VUZOV Sibiri i DV Po teplofizike i teploenergetike posvyashchyonnogo pamyati akademika S. S. Kutateladze, Novosibirsk, Oct. 6-8, 1999, pp. 111-123. Experimental data are presented here which show that the gasification time for CWF fuel droplets increases in proportion to their size. Thus, the main part of the gasification process for CWF droplets with a diameter of 1.8 mm at a temperature of 900 deg. C. and at low pressure is performed over a time of about 30 seconds, while complete gasification of a droplet terminates at a time of 60 seconds.

Radiant delivery of heat is used preferentially in the invention in view of the fact that desorption of gases from the surface of droplets occurs during the drying of ACWF droplets through to the micro-explosion thereof. Initially water vapor, which creates a relatively cold sheath around the droplet, then carbon monoxide and a certain amount of carbon dioxide are added to the water vapor (in contrast to combustion of dry coal) [G. N. Delyagin. EXPERIENCE IN THE COMBUSTION OF COAL-WATER SLURRIES IN STEAM BOILERS (Review). Moscow, TsNII Informatsii i TE issledovaniy ugol'noy promyshlennosti, 1966, p. 87], exposing the carbon surface of the droplet, which favorably affects agglomeration and subsequent secondary disintegration. Naturally, the temperature of the gases surrounding a droplet falls at this time, however the wave properties of the radiation ensure continuity of the heat supply to the droplet. Taking into account that the temperature of the gaseous environment of an evaporating CWF droplet is not high, and taking into account its low ignition temperature, [G. N. Delyagin. EXPERIENCE IN THE COMBUSTION OF COAL-WATER SLURRIES IN STEAM BOILERS (Review). Moscow, TsNII Informatsii i TE issledovaniy ugol'noy promyshlennosti, 1966, p. 87] at a lower limit of 400 deg. C. and equal to 440-490 deg. C. [A. A. Vintovkin, M. G. Ladygichev, Yu. M. Goldobin, G. P. Yasnikov. TECHNOLOGICAL COMBUSTION AND UTILIZATION OF FUEL. Teplotekhnik, Moscow, 2005, pp. 176-183] (against an ignition temperature of air-dry coals of 500-950 deg. C.), and taking into account that an ignition temperature of only 330 deg. C. was recorded [G. N. Delyagin, A. I. Kulinich, V. I. Kirsanov. EXPERIMENTAL STUDY OF THE PROCESS OF BURNING DROPLETS OF COAL-WATER SLURRY MADE FROM BROWN AND GAS COALS. Combustion of disperse fuel systems. Nauka, Moscow, 1969 (IGI), pp. 55-68] for CWF prepared from brown coal on a droplet of the relatively large size of 1.41-1.79 mm, in accordance with the inventive concept we further disclose a mechanism for the ignition of ACWF droplets.

As mentioned above, burning of the carbon occurs simultaneously with the stage of outward discharge of moisture from a droplet through the pores of the agglomeration shell in the form of vapor jets [A. A. Vintovkin, M. G. Ladygichev, Yu. M. Goldobin, G. P. Yasnikov. TECHNOLOGICAL COMBUSTION AND UTILIZATION OF FUEL. Teplotekhnik, Moscow, 2005, pp. 176-183]. It is also noted [A. M. Khidiyatov, V. V. Osintsev, S. V. Gordeyev, N. V. Ryzhikov, P. N. Fedotov, Ye. K. Veshnyakov, A. M. Smakov, Ye. V. Toropov. CALCULATION OF FURNACE HEAT-EXCHANGE WHEN BURNING COAL-WATER SLURRIES. "Heat-exchange in steam generators": trans. All-Union Conference, June, 1988. Novosibirsk, ITF SO RAN, 1988, pp. 261-264] that the "burning" of volatiles virtually coincides with the phase of burnup of the coke residue of a CWF droplet. The question of why the relatively stable burning of carbon occurs in such conditions has not yet been answered, except for references to the activation of carbon surfaces of coal particles by removal of combustion products from their surfaces by vapor jets, which was interpreted as clearance and development of reaction areas [G. N. Delyagin. EXPERIENCE IN THE COMBUSTION OF COAL-WATER SLURRIES IN STEAM BOILERS (Review). Moscow, TsNII Informatsii i TE issledovaniy ugol'noy promyshlennosti, 1966, p. 87]. However, substantiating the inventive concept, it is proposed to further consider and newly to interpret the burning of CWF droplets in the stage where droplets are heating up with evaporation of moisture and when their volume is increasing with rise in their temperature, before the moment of discharge of volatiles and also at the start of the stage of burnup of the coke residue of droplets, after the discharge of volatiles. Thus, the new interpretation of the burning of CWF droplets takes account of the existence of a further two factors. A factor of activation and rise in temperature of the coke agglomerate, specifically on the internal surfaces of its pores due to the presence of friction of the vapor-gas jets flowing outwardly at high velocity from the interior of the droplets. The second factor is desirably taken into account in cases where the outflow velocity of said vapor-gas jets reaches, albeit for an "instant", a velocity which exceeds the speed of sound in the micro-boundary layer of the vapor-gas sheath of a droplet, including the pore channels of the agglomeration shell of a droplet.

A mechanism acting on the basis of friction for ignition or maintaining combustion in gas-droplet systems is presented in Semenov V. N. A NEW MECHANISM COMBUSTION PROPAGATION IN TWO-PHASE GAS-DROPLET SYSTEMS. Izvestiya A N, Energetika, 2004, (3), 3-11. While taking account of the concept of this mechanism in the invention, the assumption has been made that the vapor-gas jets flowing out from the interior of a CWF droplet are not solely two-phase, but also three-phase, i.e. they contain micro-particles of solid phase. In relation to this, it is proposed that liberation of heat at phase boundaries due to friction may be more intense. The mechanism associated with friction for the propagation of combustion in two-phase systems differs both from detonation and also from deflagration. A combustion wave of such type can exist solely in a medium where the moving gas experiences friction [Semenov V. N. A NEW MECHANISM COMBUSTION PROPAGATION IN TWO-PHASE GAS-DROPLET SYSTEMS. Izvestiya A N, Energetika, 2004, (3), 3-11 and Belikov V. V., Belikova G. V., Semyonov V. N. et al. EFFECT OF A DROPLET SLURRY ON THE LIMITS AND ENERGY OF DETONATION INITIATION IN GASES. Izvestiya R A N, Energetika (Moscow), 2000, (3), 157-165]. Such combustion, in the steady-state sense, can exist with a subsonic flow of vapor-gas jets when there is a source maintaining this flow, such as in our case the pressure difference between the pressure of gases within an ACWF droplet and the pressure in the gasifier. The burning velocity in accordance with this mechanism is supersonic, but not more than 2.8 Mach. Such high velocity values are entirely adequate to explain the explosive character of the combustion of CWF droplets which is observed in practice. Furthermore, the inventive concept proposes that the action of this mechanism of the combustion of droplet fuel in a gasifier is manifested more efficiently in view of the fact that the activation friction which provides ignition is relatively high in view of the existence of a static pressure in the gasifier. Taking into account also that the high temperature and static pressure in the gasifier alter upwardly the absolute pressure of the medium of the three-phase jets flowing out of the fuel droplets, it is evident that in regard to this the absolute values of the speed of sound in the medium of these jets are relatively high and this also explains the explosive effect of the combustion of CWF droplets.

The second factor which is taken into account in the invention in the explosive combustion of ACWF droplets can be interpreted as the manifestation of the mechanism of classic low-level detonation in view of the localization of the parametric conditions for the existence of detonation, in connection with the combination of the technological parameters of gasification and the composition of the fuel, the resultant effect of which determines the velocity of outflow of three-phase jets from the fuel droplets. Conditions for manifestation of the second factor which initiates the explosive combustion process are as follows:

when the jets flowing out of a fuel droplet through the pores of the agglomeration shell reach, at any particular moment, velocities greater than the speed of sound;

when the jets flowing out of a fuel droplet reach supersonic velocities, the composition of these jets including, in predetermined concentrations, a gaseous composition of volatiles and fluidized water vapor, and micro-droplets of water, while solid fuel micro-particles may also be present;

when the jets flowing out of a fuel droplet reach supersonic velocities, and these jets have a pressure and temperature allowing detonation to occur.

If these conditions are met at any moment, then a microspatial shock wave is formed in the medium of these jets and when the front of this is contacted by a two-phase or three-phase jet, detonation of the combustible part of the volatiles present in the jet occurs. The probability of the periodic operation of such a factor in the explosive combustion of ACWF droplets is increased in connection with the known, and relatively novel, phenomenon of a fall in the speed of sound in two-phase media [Fisenko V. V. Certain properties of the thermodynamics of a two-phase flow and utilization of these in the FISONIK apparatus. Promyshlennaya energetika (Moscow), 2001, (12), 36-41]. The parameters of the vapor-gas medium change abruptly on compaction in a micro-shock wave and can be determined using shock adiabatic equations [Yu Nechayev, A. Polev, Ye. Marchukov, A. Tarasov. PULSED DETONATION ENGINES. Dvigatel' (Moscow), 2003, No. 1(25), 14]. A sharp rise in the temperature of the vapor-gas jet occurs in this case as a consequence of its irreversible heating during shock compression. The corresponding values of pressure and temperature can be determined by specialists from the parameters of the outflowing vapor-gas (three-phase) mixture, depending on the Mach number, and it is not appropriate to do this in the present specification.

Thus, in accordance with the invention now proposed and in relation to the features of activation dosing of fuel described above, high-efficiency mass transfer and mass exchange of reaction components occurs in the PDC zone of the gasifier when using PDHG technology. It has been demonstrated that the participation of volatiles in PDHG is manifested not only in the liberation of thermal energy, but also to a significant extent in the mechanical mass transfer of reaction components. The significance of the "work" of the volatiles in the gasification technology now proposed is determined by the quantitative content thereof in the raw coal and, in relation to this the invention takes into account that the actual content of volatiles in coals is always somewhat greater than the (data sheet) measured values. The yield of volatiles is usually determined (by slow pyrolysis) in a Fischer retort, where the coal particles are disposed in a dense layer. In this process, the pyrolysis products unavoidably enter into secondary reactions, as a result of which part of volatiles is condensed "anew" and the measured yield of volatiles is reduced as compared to the real value. It is appropriate here to note the possibility of the more efficient utilization of the technology according to the present invention in relation to brown coals, such as the coals of the Kansk-Achinsk Field in Russia, or the low-ash and low sulfur content Latrobe Valley coals of the State of Victoria in Australia. Thus, it follows from experimental data [21] that the combustion time for CWF droplets of high-calorific low-reactive coals may be 4 times greater than the combustion time of CWF droplets prepared from brown coal.

In the PDC zone, as in the high-situated gasifier zones, maintenance of the rotary motion of the conversion reaction components is employed and the internal walls of this gasifier zone are protected against coking by means of active interceptors built into the radiant walls, as has been described above for the RTA zone. However, taking into account that the pressure in the gasifier varies in a pulsed manner in the course of PDHG and is generated in the PDC zone, the interceptors in this zone are arranged with maximum density in order to provide a reliable protective-gas boundary layer in this zone. Furthermore, the present invention utilizes Shock Protection (SP) for the gasifier walls in the RTA and PDC zones, designed to maintain the stability of the protective-gas boundary layers at moments of abrupt changes in pressure. Thus, the active interceptors of the RTA and PDC zones are supplied with protective gases under elevated pressure at the start of a phase of abrupt change in pressure, thus ensuring densification of the protective-gas boundary layers of these zones. At the end of a PDHG conversion pressure pulse, the pressure of the protective gases in the interceptors is reduced to the rated value. The phases for supplying protective gases of elevated anti-shock pressure to the interceptors are calculated at the design stage, proceeding from the propagation velocity of the pressure change wave front in the pipelines and, proceeding from the length of these pipelines, measured from the source of the elevated pressure to the interceptors, with a correction for the time for development of densification of the protective gas layers. Such SP design calculations can be carried out by suitable specialists, and it is inappropriate to describe SP in more detail in the present invention.

The conversion products and the coke residues of ACWF reaction component droplets are then moved under gravity through the gasifier from the PDC zone to the conversion after-burning (CAB) zone. In this process, the coke residues of droplets are allowed to reside in the CAB zone for the necessary time in order to complete full conversion after-burning of these residues. This necessary time is maintained by design development of the vertical size of the gasifier CAB zone and by maintaining the rotary motion of the coke residues of droplets in the gaseous medium of conversion products rotating in a relatively horizontal plane. In general, the spiral motion of the conversion intermediates in the CAB zone is held stable by means of mini-jets which spiral about their axes and are ejected from active interceptors situated on the internal walls of the gasifier CAB zone. The central axes of the CAB zone interceptors are designed to lie such that their ejected gas jets are directed in a horizontal plane and relatively tangentially in accordance with the direction of rotation of the conversion intermediates. The gas mini-jets of the CAB zone interceptors comprise the products of combustion of syngas which is combusted in the combustion chamber of the GTC gas turbine. In the present invention, the active interceptors of the CAB zone simultaneously protect the gasifier walls against possible coking. Thus, the number of interceptors, their dimensions and the density of their arrangement in the CAB zone walls of the gasifier are selected such that at the pressure existing in the gasifier a continuous boundary protective gas layer of minimal thickness is created to ensure low consumption of gas withdrawn from the combustion chamber of the gas turbine. As in the PDC and RTA zones, the delivery of heat to the conversion reaction components in the CAB zone is primarily radiant, thanks to which the internal walls of the gasifier CAB zone are designed to be encompassed externally by the combustion chamber of the gas turbine.

After completing the process of conversion burn-up of the coke residues of fuel droplets in the CAB zone, the gasification intermediates move downwardly into the gasifier cooling zone (C). The gasification intermediates are cooled in the C zone by feeding cold syngas or cold carbon dioxide to this zone as a coolant. The type of coolant is selected in dependence on the target quality of the syngas generated in accordance with the present invention. Thus, if full cycles of cleaning the generated syngas, including the removal of carbon dioxide, are employed in a specific implementation of a project in accordance with the present invention, it may be desirable to employ the embodiment with carbon dioxide as the coolant. In this case, the coolant carbon dioxide is obtained after processing the exhaust gases of the GTC gas turbine, after separating moisture from the cold part of the exhaust gases and after the compression thereof. A different coolant may be used for the embodiment of the present invention without removal of carbon dioxide from the syngas produced, wherein the cold syngas is additionally cooled via a heat-exchanger by carbon dioxide obtained after processing the exhaust gases of the GTC gas turbine, after removing moisture from the cold part of the exhaust gases and after the compression thereof. In the lower part of the gasifier C zone the temperature of the conversion intermediates and the plastic ash (slag) is reduced to the ash (slag) hardening temperature, and the conversion of ash (slag) into the solid state commences after moving the intermediates into the slag hardening (SH) zone of the gasifier. All of the ash (slag) is hardened as the conversion intermediates and the ash (slag) move into the lower part of the gasifier SH zone. Fine solid particles (fly ash) and larger and relatively heavy solid particles (slag) are formed in this process. Cooling in the gasifier SH zone is arranged in a similar manner to that in the C zone, as described above. In order to provide the necessary residence time of conversion intermediates and ash in the gasifier C and SH zones with the object of completing the processes of cooling and hardening the ash (slag), coolant is fed into these zones by tangential injection of an agent from the active interceptors built into the gasifier walls in these zones. Spiral motion of the conversion intermediates, and together with these the small particles of ash (slag), is maintained by tangential injection of the coolant in the C and SH zones. The stability of this spiral motion is also maintained by the fact that the mini-jets of coolant which are injected from the interceptors have their own stability as they are formed to spiral about their own axes due to the fact that stationary blades are built into the interceptors, thus providing the above-mentioned rotation of the mini-jets. As in the higher zones of the gasifier the injected gas (coolant) provides protection to the gasifier walls in the C and SH zones against possible slag deposition from the plastic ash (slag).

When the conversion intermediates and solid ash and slag enter the following zone of the gasifier, the gas output (GC) zone, the tangential component of the velocity of these intermediates and of the small solid particles of ash and slag is retarded. Retardation is accomplished by means of vortex dampers which comprise fixed flat blades designed to lie with their flat faces vertical (or at an angle opposite to the rotation of the conversion intermediates) at the walls of the gasifier GC zone. On further downward movement of the conversion intermediates and the solid small particles of ash and slag in the GC zone, the slag is removed by funnel-shaped surfaces which lie adjacent to the walls of the gasifier GC zone and form a deflector by means of which the slag particles are collected towards the central vertical axis of the gasifier. The slag is thus discharged into the slag port (SP) zone. The conversion intermediates, together with the fly ash, are withdrawn via an exhauster which is situated in the central (vertical) part of the gasifier GC zone, under the slag deflector, with the object of preventing comparatively large slag particles being entrained by the stream of intermediates (unpurified syngas) being withdrawn from the gasifier.

In the very lowest (SP) zone of the gasifier, slag is discharged into its upper (inlet) part through the (preferably always open) upper hermetic gate of a slag hopper and accumulates in the slag hopper. Heat, which is utilized in the ACWF preparation process, is removed from the slag by a heat-exchanger which is designed to encompass the slag hopper and employs an intermediate heat-transfer agent. As the hopper is filled with slag the upper gate is closed. Then, after a certain time, sufficient for removal of heat from the slag accumulated in the hopper, the lower hermetic gate of the slag hopper is opened and the slag is discharged from the gasifier. In the period of time when both slag gates (upper and lower) are closed, a relatively small amount of slag accumulates in the lower part of the SP zone under the slag deflector. This amount of slag is discharged into the slag hopper when the upper gate of the slag hopper is opened for normal accumulation of slag with subsequent discharge thereof from the gasifier. A description of the phases of ACWF conversion in the process zones of the gasifier is presented in compact form in Table 1.

In the present invention, the above-described processes for generating syngas intermediate are synchronized by generating and supplying to the fuel pylon of the gasifier commands for the formation and injection into the gasifier of each fuel dose, thus ensuring PDHG process continuity. Said synchronization is employed in order to ensure efficient utilization of the entire volume of the gasifier in connection with the technology described above. Synchronization is implemented on the basis of known methods for controlling vortex units, utilizing their acoustic field [Gaydabura I. P., Vaganov A. I., Todorev Yu. G. CONTROLLING ELECTRICAL ENGINEERING VORTEX APPARATUSES USING THEIR ACOUSTIC FIELD. Promyshlennaya energetika (Moscow), 1986, (7), 36-39]. In accordance with the inventive concept, the acoustic information is gathered by means of a line of acoustic probes which is designed to lie vertically and along the entire PDC zone externally of the internal walls of the gasifier. In the PDC zone, the acoustic probes register the moment of explosive conversion combustion with release of volatiles, producing acoustic noise signals of predetermined shape. The spectrum of the harmonics of the acoustic noise and the amplitudes of the various harmonics of this spectrum in the PDC zone of the gasifier depend on the specific design parameters of this zone, such as its overall dimensions, pressure, temperature, density of the medium, its phase composition, etc. In the course of commissioning work on the gasifier, the precise moment of the Pseudo-Detonation conversion combustion process pulse front from the moment of delivery of the fuel dose is determined and this moment is recorded in the controller memory on a graph of the

TABLE 1

Phases of ACWF conversion

| Phase | Description of ACWF conversion phases | Process zoning in gasifier |
|---|---|---|
| 1 | Fully-discrete dosing of fuel with a determined amount of motion of each fuel droplet. | Zone FP, fuel pylon |
| 2 | Two-phase fuel composition motion control with this motion organized into a determined spiral-vortex aerodynamic structure and construction of the droplet-gas dose into a synchro-vortex fuel-oxidizer layer. For ACWF prepared from caking coals the surface of fuel droplets is sprayed with dropout fine fractions of coal dust. | Zone FPF, final fuel preparation |
| 3 | Predominantly radiant heat supply and evaporation of moisture from the surface of droplets. Migration of solid particles to the surface of droplets. For ACWF of caking coals, start of sintering of coal particles on the surface of droplets into agglomerate. | Zone RTA, thermal radiation activation of fuel droplets and technological metamorphosis thereof accompanied by conversion of carbon |
| 4 | Predominantly radiant heat supply and evaporation of moisture from the interior of droplets with superheating of its vapor. For ACWF of caking coals, completion of formation of porous agglomeration shells of droplets. Rise in temperature of dried droplets. | |
| 5 | Predominantly radiant heat supply and further evaporation of moisture from the interior of droplets, including for ACWF of caking coals through agglomeration shell pores, rise in the internal pressure in droplets with stretching of agglomeration shells and increase in the volume of droplets. Activation of the surfaces of coal particles in agglomerate pores accompanying conversion of carbon on these surfaces. Completion of evaporation of free moisture from droplets and jump in temperature head on fuel droplet residues. | |
| 6 | Predominantly radiant heat supply. Rapid attainment of maximum temperature of droplet residues with release of volatiles and fluidization of the internal moisture of floccules and micro-pores of coal particles, accompanied by quasi-synchronous micro-explosion of droplet residues of all droplets with maximal carbon conversion dynamics due to explosive micro-disintegration of coal particles, including the explosion of agglomeration shells for ACWF of caking coals. | Zone PDC, main pseudo-detonation conversion |
| 7 | Further supply of heat and conversion after-burning of fuel components to meet process regulation and stoichiometric norms. | Zone CAB, conversion after-burning |
| 8 | Supply of coolant gas and lowering of temperature of conversion intermediates to the hardening temperature of fuel dose slag residues. | Zone C, cooling |
| 9 | Supply of coolant gas, further lowering of temperature of conversion intermediates and hardening of entire slag residue of fuel dose. | Zone SH, hardening of slag |
| 10 | Retarding the flow of conversion intermediates in respect of the tangential component of their motion, withdrawal of the gaseous phase of the intermediates from the gasifier and dumping of solid slag into the slag receiver. | Zone GC, gas withdrawal |
| 11 | Closing upper hermetic gate and opening lower hermetic gate with discharge of solid slag from the gasifier. Closing lower hermetic gate and opening upper hermetic gate to receive the next amount of slag. | Zone SP, slag port |

PDC zone acoustic noise. The travel time of a fuel dose from the moment it is fed into the gasifier to the moment when the Pseudo-Detonation process commences in it is utilized in the fuel pylon controller to deliver the following fuel dose, this ensures the continuity of the PDHG process cited in the present invention because of the precise dosing.

The space-time processes of PDHG and the actions controlling these processes in relation to the activation dosing of fuel with the application of motion to the fuel droplets and with spraying of their surfaces are shown in the diagram of the micro-cycles of the process for gasification of activated coal-water fuel with controlled Pseudo-Detonation conversion, FIG. 1. Here, the continuous lines show charts of the process of conversion processing of a single ACWF fuel dose. Dotted lines show the processes of conversion processing of subsequent fuel doses. Chart 1 shows, in the time interval $t_0$-$t_3$, change in the angular velocity of the rotor of the fuel-calibrating dispenser by means of which the fuel pylon unit of the gasifier forms in given time fuel droplets of predetermined size, the quantity of these and a specific amount of movement in the vector concept thereof being relative to the structure of the gasifier. A description of the operation and arrangement of the fuel pylon—the FP zone of the gasifier, is presented below as variant, in the section describing the drawings and diagrams of the present invention. Charts 2 and 3 show change in path in accordance with the angle of the rotor of the fuel-calibrating dispenser and formation of a fuel dose in relation to mass, respectively. Charts 4 and 5 show the speed of advancement of the fuel-conversion composition through the gasifier zones, the linear-vertical component of velocity in gasifier zones FPF, RTA, PDC, CAB, C, SH and GC, and the tangential component of velocity in gasifier zones FPF, RTA, PDC, CAB, C and SH, respectively. The relative "drop" to values close to zero in the velocities of the linear-vertical and tangential components at different times $t_{16}$ and $t_{17}$ is explained by the retarding effect of the GC zone vortex dampers, referred to previously. Chart 6 shows the process of spraying class 0 . . . 30 solid fuel particles onto the surface of fuel droplets, from time $t_1$ to time $t_5$. In the proposed invention, this spraying process is employed in cases where PDHG is applied to vitrinite or liptinite coals, as previously indicated. Chart 7 shows the integral absorption of heat by ACWF droplets which are heated primarily by radiant heat from the gasifier walls, the intensity of which results from their outer surfaces being the walls of the combustion chamber of the GTC gas turbine. This same chart shows roughly, in the RTA zone of the gasifier, the development of fluidization of the slurry water (contained in the fuel droplets) and the water contained in the floccules and micropores of solid fuel particles. For example, about 2.5 seconds are needed for activation for Pseudo-Detonation conversion of an ACWF droplet with a diameter of 1.0 mm at time $t_4$-$t_7$, as mentioned previously.

For the time interval $t_7$-$t_9$ in the PDC zone, chart 8 shows thermal-degradation, explosive fluidization of the residual slurry water of the dried fuel droplets and the water of flocculus and micropores of solid fuel particles, and also intense combustion of the combustible part of the volatiles and a pressure jump in the PDC zone. In accordance with the inventive concept, the main process of ACWF conversion is performed in this time interval, the peak intensity of which is shown at point $t_8$. Completion of the conversion process takes place in the CAB zone of the gasifier, as shown in time interval $t_9$-$t_{11}$ in chart 9. This chart illustrates the process of conversion after-burning of droplet residues of the ACWF reaction components. Chart 10 shows the action of SP. Thus in the time interval $t_6$-$t_{10}$ an elevated pressure pulse is generated in the active interceptors of the RTA and PDC zones of the gasifier for temporary densification of the protective gas boundary layer of the walls of these zones. As can be seen from charts 8 and 10, SP is actuated at a time when pressure in the PDC zone of the gasifier is changing very rapidly. In the environs of the $t_7$-$t_9$ time interval the local pressure in the PDC zone of the gasifier reaches maximum values, and at this "moment" there occurs the probability of the formation of a coke crust on the walls of the PDC zone of the gasifier due to mechanical dispersion of the reaction components of the fuel, including slag in the plastic state, which could adhere to the gasifier walls. Chart 11 shows the variable component of temperature in zones C and SH. It is evident here that the cooling of conversion intermediates, including ash (slag), commences after full completion of conversion, from time $t_{11}$, and chart 12 illustrates the transition of ash (slag) from the plastic state to the solid state, in time interval $t_{13}$-$t_{15}$. Chart 11 shows the temperature-time point "A", at time $t_{12}$, when the temperature in the center of zone C of the gasifier is reduced to ash (slag) hardening point $T_S$. The process of further cooling of the particles of plastic ash (slag) over their entire volume commences at point "A", continuing to time $t_{13}$, when the ash (slag) hardening temperature is reached over the entire volume of each particle of ash (slag) of the processed fuel dose. From time $t_{13}$ in chart 12, the growing "negative" temperature head in zone SH of the gasifier supports the process of ash (slag) hardening, which ends at time $t_{15}$.

Thus, it is clear from all the charts presented in FIG. 1 that synchronization of the processing of PDHG fuel droplets in accordance with the inventive concept is performed using feedback control with the Pseudo-Detonation conversion combustion thereof over the time interval $t_0$-$t_8$ which is measurable in practice. Such control, which supports the PDHG process, is performed at time $t_8$ by passing a command to the fuel pylons to form the next fuel dose, the dose shown in chart 1 of FIG. 1 by a dotted line. PDHG process control using the feedback described above also ensures stability of the maximum efficiency of the conversion of fuel into gas when fuel characteristics deviate from the standard values, which may occur in production plant for natural objective reasons.

When constructing a gasifier of high production capacity with the corresponding design dimensions, the absolute time value ($t_0$-$t_{17}$) of the full process period for processing a dose of ACWF into intermediate syngas may be relatively large and may reach tens of seconds. In regard to this, in order to achieve the maximum efficiency of utilization of the gasifier volume, fuel doses are introduced into the gasifier repeatedly in the $t_0$-$t_{17}$ time interval, which is shown in charts 1-3 of FIG. 1 by dotted lines.

In accordance with this, "pulsed" PDHG (chart 8 in FIG. 1) is carried out repeatedly in a single process period of processing ACWF into intermediate syngas. Depending on the dimensions of the gasifier, the frequency of pulses of main conversion combustion, which is explosive in nature, in the PDC zone of the gasifier may be in the range 0.8-2.5 Hertz. In regard to this, several tens of fuel doses may be introduced into the gasifier over this time, i.e. the time for processing one ACWF dose into intermediate syngas.

The intermediate syngas withdrawn from the gasifier, which contains entrained fly ash, is cooled, using part of its heat for superheating feedwater under pressure in the first waste-heat boiler. Known cleaning methods are then applied to this syngas. The main part of the fly ash is removed from the syngas in a high-temperature graphite multicyclone, while the residual finest particles of fly ash are removed by means of a high-temperature ceramic filter. Resins and oils, and also gasoline fractions, are then removed from the syngas using scrubbers. The heat liberated in this process is used to heat the gases which are injected into the gasifier through the interceptors of the sidewalls of the RTA and PDC zones of the gasifier. This same heat heats the air and the purified syngas before these are fed into the combustion chamber of the GTC gas turbine and heats the ACWF before this is fed into the fuel pylon of the gasifier. Further cleaning of the syngas is carried out in various variants, including removing carbon dioxide and sulfur compounds from it and using the Claus process or LO-CAT technology. Depending on the economic and ecological requirements, processes for the removal of carbon dioxide and sulfur compounds may also not be employed in a particular engineering embodiment of the present invention, particularly if coals with low sulfur content are being gasified. Removal of oxides of sulfur and nitrogen from syngas before its combustion in a GTC is employed in view of the fact that it is very much less expensive to clean the gas than to clean the combustion products thereof, since the mass of syngas is 9-12 times smaller than the mass of the combustion products. The concentration of harmful impurities to be removed is correspondingly that many times greater. The cleaning of syngas is performed at a pressure of roughly 1-1.5 MPa. Consequently, the volume of cleaned gas is roughly 100 times less than the volume of fuel combustion products requiring cleaning at atmospheric pressure [Khodakov G. S., Gorlov Ye. G., Golovin G. S. SLURRIED COAL FUEL, Khimiya tvyordogo topliva Moscow, 2005, (6), 15-32, Shumeyko M. V. USE OF COAL-WATER AND COAL-HEAVY FUEL OIL SLURRIES AND ULTRA-CLEAN COAL-HYDROGEN POWER TECHNOLOGIES. Ugol' (Moscow), 2007, July].

In order to confirm achievement of the technical result, the following have been produced in laboratory conditions maximally corresponding to the technology according to the present invention:

syngas No. 1 as a result of gasification of ACWF (BR-2 brown coal);

syngas No. 2 as a result of gasification of ACWF (AC Coal).

The composition of the syngases obtained was determined using an AKhG-002.01 chromatograph. Data on their composition are presented in Table 2.

TABLE 2

| Name of gas | Composition of gas | | | | | |
|---|---|---|---|---|---|---|
| | $CO_2$ | $C_mH_n$ | CO | $H_2$ | $CH_4$ | $N_2$ |
| Gas No. 1 | 4.0% | 0.8% | 41.6% | 50.0% | 3.3% | 0.3% |
| Gas No. 2 | 4.4% | 0.7% | 36.8% | 54.0% | 3.2% | 0.9% |

When it is necessary to produce syngas with a higher relative content of hydrogen, ACWF is used in which the water component, under pressure, is saturated with oxygen and hydrogen dissolved therein. Such syngas may also be utilized for commercial purposes, such as for the production of liquid synthetic motor fuels using the Fischer-Tropsch process.

Table 3 shows the main properties of the syngas produced.

TABLE 3

| Name of gas | Calorific value | | Density | Emission of carbon dioxide | |
|---|---|---|---|---|---|
| | MJ/m$^3$ | MJ/kg | kg/m$^3$ | kg/MJ | t/MWh |
| Gas No. 1 | 11.40 | 16.61 | 0.686 | 0.0883 | 0.3181 |
| Gas No. 2 | 11.11 | 17.29 | 0.643 | 0.0821 | 0.2957 |

Essential features of the coal gasification technology according to the present invention include:
 the use of liquid activated coal-water fuel—ACWF, which has a high degree of homogeneity;
 activation of the water-coal fuel is performed not only in the course of preparation thereof, but also directly in the gasifier, by imparting a determined amount of motion to each droplet of a fuel dose;
 the coal-water fuel is introduced into the gasifier over time as separate fuel doses;
 fuel doses are introduced into the gasifier over relatively short intervals of time, i.e. in a pulsed manner and with frequencies which overall ensure that ACWF conversion processes proceed in a continuous manner;
 fuel doses are formed and introduced into the gasifier using special precise calibration of the fuel droplets in relation to their quantity, dimensions and form;
 The main mass of each fuel dose is subjected to bulk explosive Pseudo-Detonation conversion combustion by forming fuel droplets with strictly predetermined properties, including homogeneity, which ensure explosive conversion combustion, activation of which is carried out thermally at a high rate;
 the frequency of introduction of fuel doses into the gasifier is controlled via feedback from the pulse of Pseudo-Detonation conversion combustion of the main mass of a single dose of ACWF;
 spraying fine coal particles onto the surface of fuel droplets is employed when using caking coals;
 the activation of fuel droplets at a high rate for the conversion combustion thereof in the gasifier is performed by supplying heat, primarily by radiant heating of the droplets from the walls of the gasifier, the high temperature of which results from their outer surfaces being the inner surfaces of the gas turbine combustion chamber;
 the walls of the gasifier are protected by creating a composite gas protective boundary layer;
 the composite gas protective boundary layer is formed by means of active interceptors built into the walls of the gasifier and through which gases are injected in the form of high-enthalpy jets spiraling about their axes in order to impart aerodynamic stability to the protective layer;
 with the object of providing an adequate residence time of the reaction components in the gasifier, the stability of the vortex structure of the motion of the reaction components through the process zones of the gasifier is maintained by the high-enthalpy jets injected from the sidewalls of the gasifier by means of the interceptors and by injection of a swirled jet from the stem of a vortex chamber along the central axis of the gasifier (downwardly from the top);
 the gas composition injected into the gasifier contains part of the volatiles obtained as a result of mechanical breakdown of coals during the preparation of ACWF;
 the stability of the protective gas boundary layer at the moment of explosive conversion combustion of the main mass of a fuel dose is maintained by a special process procedure of anti-shock protection, which provides temporary maximum densification of the protective boundary layer on the gasifier walls;
 plastic ash (slag) is hardened by introducing cooling gases into the gasifier;
 after completing in the gasifier processes of conversion of a fuel dose and hardening of its ash (slag), and before withdrawing the gasification intermediates from the gasifier, the vortex motion of these is damped in order to prevent entrainment of large slag particles with the gas being withdrawn from the gasifier;
 use in the ACWF preparation process of the thermal energy of ash being discharged from the gasifier.

Essential distinguishing features of the coal gasification process in the present invention as compared with the analog include:
 the use of liquid activated coal-water fuel—ACWF, which has a high degree of homogeneity;
 activation of the water-coal fuel is performed not only in the course of preparation thereof, but also directly in the gasifier, by imparting a determined amount of motion to each droplet of a fuel dose;
 the coal-water fuel is introduced into the gasifier over time as separate fuel doses;
 fuel doses are introduced into the gasifier over relatively short intervals of time, i.e. in a pulsed manner and with frequencies which overall ensure that ACWF conversion processes proceed in a continuous manner;
 fuel doses are formed and introduced into the gasifier using special precise calibration of the fuel droplets in relation to their quantity, dimensions and form;
 the main mass of each fuel dose is subjected to bulk explosive Pseudo-Detonation conversion combustion by forming fuel droplets with strictly predetermined properties, including homogeneity, which ensure explosive conversion combustion, activation of which is carried out thermally at a high rate;
 the frequency of introduction of fuel doses into the gasifier is controlled via feedback from the pulse of Pseudo-Detonation conversion combustion of the main mass of a single dose of ACWF;
 spraying fine coal particles onto the surface of fuel droplets is employed when using caking coals;
 the activation of fuel droplets at a high rate for the conversion combustion thereof in the gasifier is performed by supplying heat, primarily by radiant heating of the droplets from the walls of the gasifier, the high temperature of which results from their outer surfaces being the inner surfaces of the gas turbine combustion chamber;
 a composite gas protective boundary layer is formed by means of active interceptors built into the walls of the gasifier and through which gases are injected in the form of high-enthalpy jets spiraling about their axes in order to impart aerodynamic stability to the protective layer;
 with the object of providing an adequate residence time of the reaction components in the gasifier, the stability of the vortex structure of the motion of the reaction components through the process zones of the gasifier is maintained by the high-enthalpy jets injected from the sidewalls of the gasifier by means of the intercepts and by injection of a swirled jet from the stem of a vortex chamber along the central axis of the gasifier (downwardly from the top);

the gas composition injected into the gasifier contains part of the volatiles obtained as a result of mechanical breakdown of coals during the preparation of ACWF;

the stability of the protective gas boundary layer at the moment of explosive conversion combustion of the main mass of a fuel dose is maintained by a special process procedure of anti-shock protection, which provides temporary maximum densification of the protective boundary layer on the gasifier walls;

is ensured by manufacturing it as individual batches, each of which is prepared using coal particles with a particle-size composition of limited range. The use of coal particles which are close in size in each batch of ACWF ensures the stability of the current parameters of gasification in the course of this gasification, as described above, in regard to the factor of simultaneous completion of the thermal activation of fuel droplets. Thus, according to the present invention, several grades of ACWF are prepared from the total mass of coal to be processed, these differing from one another in the particle-size composition of the solid phase. As an example, Table 4 shows six grades of ACWF.

TABLE 4

| | Particle-size range of solid phase of six grades of ACWF, μm | | | | | | Total moisture content of ACWF, % | |
|---|---|---|---|---|---|---|---|---|
| Designation of ACWF for gas generation | 1 $ACWF^{45}$ | 2 $ACWF^{70}$ | 3 $ACWF^{110}$ | 4 $ACWF^{170}$ | 5 $ACWF^{260}$ | 6 $ACWF^{400}$ | Max. estimate | Min. estimate |
| Gas No. 1 from Victoria brown coal, Australia | 30-45 | 45-70 | 70-110 | 110-170 | 170-260 | 260-400 | 44.4 | 40.8 |
| Gas No. 2 from Queensland black coal, Australia | 30-45 | 45-70 | 70-110 | 110-170 | 170-260 | 260-400 | 52.4 | 47.2 | after completing in the gasifier processes of conversion of a fuel dose and hardening of its ash (slag), and before withdrawing the gasification intermediates from the gasifier, the vortex motion of these is damped in order to prevent entrainment of large slag particles with the syngas being withdrawn from the gasifier;

use in the ACWF preparation process of the thermal energy of ash being discharged from the gasifier.

Also a subject of the present invention is technology for the production of ACWF of predetermined quality, which in its characteristics is suitable for the above-described process for generating high-quality syngas highly saturated with hydrogen which, in its turn and in accordance with the inventive concept, ensures minimal emission of carbon dioxide when it is combusted for the purpose of generating electrical power. In the invention now proposed, the task of producing ACWF is achieved using special technology, set out as part of the invention, and directly in the gasifier, as described above.

The first attempts to prepare coal slurries were made as early as the end of the 19$^{th}$ century. However, the lack of colloid mills which allow coal to be ground to micron sizes, prevented the idea of CWF being implemented on an industrial scale [Gorlov Ye. G. COMPOSITE WATER-CONTAINING FUELS FROM COALS AND PETROLEUM PRODUCTS. Khimiya tvyordogo topliva (Moscow), 2004, (6), 50-61]. Technologies for the preparation and combustion of CWF were developed on a fairly large scale from the mid-sixties up to and including the eighties. However, the substantial fall in world oil prices led to a loss of interest in the use of CWF, despite its well-known advantages as compared with coal dust combustion. For this reason, CWF combustion power technologies have not up to the present found any significant industrial application, the more so since CWF gasification technology is regarded as exotic. The advantages of CWF gasification, with subsequent utilization of the syngas bring to the fore the task of constructing new technologies for the preparation of CWF with predetermined properties and in accordance with the requirements of PDHG technology in accordance with the present invention. The most important characteristic of the ACWF in the invention is its homogeneity, which is required in connection with the above-described PDHG technology. The homogeneity of the ACWF Virtually any grades of coals, including brown, are suitable for efficient utilization in the preparation of ACWF, with the relatively rare exception of coals which contain a large (up to 37%) amount of fusinite. Thus, it is stated in S. L. Khil'ko, Ye. V. Titov. PHYSICO-CHEMICAL ASPECTS OF THE PREPARATION OF FUEL SLURRIES. Khimiya i tekhnologiya topliv masel (Moscow), 2007, (3), 52-56 that fusinite is a sooty lithotype of humic coals with a high carbon content, as a consequence of which it is virtually not wetted by water.

In accordance with the inventive concept, ACWF is highly fit for the conversion reaction, its fitness including not only its homogeneity, as described above, but also relating to its activation. Thus the finished ACWF has an elevated internal energy of its fuel composition on account of the energy of interaction present in the excited state of the stable part of water clusters, this being the energy of interaction of clusters between themselves, and also with the carbon surfaces of coal micro-particles. The internal mechanical energy of stable clusters of the water component of the fuel exists in the form of "elastic intra-cluster" micro-pulses. The state of excitation of the stable part of water clusters and the surfaces of coal micro-particles is generated in the course of treating the fuel composition in the hydraulic-impact Activation Apparatus. Activation of the fuel composition is manifested in two directions relative to its properties.

On the one hand, as a colloid-like solution of part of the CWF in which the initial Maxwell-Boltzmann distribution of components is disrupted. Here, their excitation state is such that the energy absorbed by them is insufficient for ionization and further oxidation, while the relaxation time may be large, from a few minutes to a few hours (which is advantageous for the special CWF gasification technology). On the other hand, activation of the surfaces of coal micro-particles, including particles with dimensions lying outside the definition of colloid-like, ensures hydrophobization of these surfaces thanks to the partial degassing of the particles and thanks to the pulsed mechanics of cleaning of the carbon surfaces to remove oxides and contaminants. In connection with this, the energy of the bonds between the carbon surfaces of particles and water molecules and with stable water clusters allows stable size-calibrated droplets to be formed from such ACWF, which is required for the PDHG process.

Furthermore, the use of ACWF is also accompanied by the following specific features which are technologically inseparably associated with its conversion:

homogenization of the entire mass of fuel being prepared, in connection with the surface-active chemical interaction of its components;

discrete and precise dosing of the fuel in relation to the mass of each droplet thereof (with limiting droplet sizes of 0.5-1.0 mm in specific projects);

discrete and precise dosing of the fuel in relation to the number of droplets (in relation to the proportion by mass of fuel being subjected to PDHG therein by a single "pulse" of explosive conversion combustion);

discrete and precise dosing of the fuel in relation to time, with adaptive intervals thereof corresponding to the course of the PDHG processes;

discrete and precise dosing of fuel droplets, accompanied by the application to each fuel droplet of spatially oriented and standardized mechanical motion (a pulse is the amount of motion in the range 0.01-0.03 grams per meter per second);

the relative content of total water in the fuel composition is in the range 40-55%;

the relative filling by water of pores and floccules of the coal particles of the fuel is not less than 50% relative to their volume;

the "initial" temperature of the fuel (in the course of droplet-activation dosing thereof) is equal to 90-110 degrees Celsius.

DESCRIPTION OF ACWF PREPARATION TECHNOLOGY

The fuel preparation process is based on mechanochemical activation, in the course of which the structure of the coal changes with a large relative increase in individual macerals and mineral formations which have active surfaces. The water also undergoes a number of changes, in the course of which a chemically activated disperse medium, saturated with components of ionic and cationic form, is formed. Being a primary oxidant, the disperse medium activates the surfaces of solid-phase particles, as described above in the PDHG technology, in all phases of conversion combustion of the fuel. The apparatus for the preparation of ACWF, in scaled-up form, is used in a two-stage form which in the opinion of specialists [Korochkin G. K., Murko V. I., Svorov V. A., Gorlov Ye. G., Golovin G. S. IMPROVEMENT IN COAL-WATER SLURRY PREPARATION TECHNOLOGY. Khimiya tvyordogo topliva (Moscow), 2001 (3), 13-27] is the most efficient. The first stage employs a disintegrator-activator which processes nominally dry coal. The second stage utilizes a rotary-pulsed hydraulic-impact treatment apparatus. Such an advanced two-stage technology has also been proposed in Bayev V. S. METHOD FOR PREPARATION OF LIQUID COMPOSITE FUEL AND A DISINTEGRATOR AND HYDRAULIC IMPACT DEVICE FOR THE IMPLEMENTATION THEREOF. RU Patent 2185244, Jul. 27, 2000 and Korochkin G. K., Murko V. I., Svorov V. A., Gorlov Ye. G., Golovin G. S. IMPROVEMENT IN COAL-WATER SLURRY PREPARATION TECHNOLOGY. Khimiya tvyordogo topliva (Moscow), 2001 (3), 13-27 as one of the best. However, as indicated in Korochkin G. K., Murko V. I., Svorov V. A., Gorlov Ye. G., Golovin G. S. IMPROVEMENT IN COAL-WATER SLURRY PREPARATION TECHNOLOGY. Khimiya tvyordogo topliva (Moscow), 2001 (3), 13-27, the grinding of coal in the disintegrator-activator is accompanied by significant liberation of dust. This problem is solved by use of special dust removal plant. The use of such plant was demonstrated, for example, in Senilov G. B., Gritsenko A. V. ON THE USE OF COAL-HEAVY FUEL OIL SLURRIES IN THE JAPANESE POWER INDUSTRY. Energokhozyaystvo za rubezhom. "Elektricheskiye stantsii", No. 3, 1983. Moscow, Energoatomizdat, pp. 1-7. In accordance with the inventive concept, the ACWF preparation subsystem is provided with dust catching and trapping of the volatiles which are released during the mechanical breakdown of coals in both stages of fuel preparation. In addition to homogenization and activation of the fuel, as was demonstrated, for example, in Bayev V. S. METHOD FOR PREPARATION OF LIQUID COMPOSITE FUEL AND A DISINTEGRATOR AND HYDRAULIC IMPACT DEVICE FOR THE IMPLEMENTATION THEREOF. RU Patent 2185244, Jul. 27, 2000, A. A. Dolinskiy. USE OF THE PRINCIPLE OF DISCRETE-PULSED ENERGY INPUT TO CREATE EFFICIENT ENERGY-SAVING TECHNOLOGIES. Inzhenerno-fizicheskiy zhurnal, 1996, 69, (6), 885-896 the rotary-pulsed hydraulic-impact treatment apparatus which is utilized in the second stage of ACWF preparation carries out an additional technological function—the impregnation of moisture into the opened pores of the coal particles, which pores were formed in the first stage of fuel preparation during the grinding thereof. Furthermore, treatment of suspended fuel in the rotary-pulsed apparatus activates the surfaces of the coal particles, stimulating destructive metamorphism of the maceral part thereof, in relatively mild conditions. The mechanical activation employed makes it possible to introduce new functional groups into the composition of the coal particles, altering their chemical composition. Thus, with wet mechanical activation of suspended fuel, the result of its treatment, characterized by an extremely high level of local dynamic, compressive and temperature action on the coal, is not only additional, slight further grinding to a target dispersity, but also the appearance on its surface of new oxygen-containing groups due to chemical reactions with the water located in supercritical state in the cavitation zone [Patrakov Yu. F. Fedorova N. I., Semenova S. A., Radchenko S. M., Petrakov A. D. MECHANICAL ACTIVATION OF LOW-GRADE KUZBASS COALS BY CAVITATION. Coll. papers, part 2. VI All-Russian Conference "Combustion of solid fuel", 8-10 Nov. 2006. Institut teplofiziki im. S. S. Kutateladze SO RAN. Novosibirsk, pp. 157-160]. In this regard it is known [Kalechits I. V. MODELING LIQUEFACTION OF COAL. Academy of Sciences High Temperature Institute, Moscow, 1999, Sharypov V. I., Baryshnikov S. V., Beregovtseva N. G. et al. LOW-TEMPERATURE OXIDATION OF BROWN COAL AND ITS REACTIVITY IN THERMODISSOLUTION PROCESSES. Khimiya tvyordogo topliva (Moscow), 1996, (3), 134-141] that alteration in the ratio of various oxygen-containing groups in the composition of the maceral part of coals has a substantial effect on their reactivity in connection with which the ignition temperature of coal particles in ACWF is significantly reduced which, in its turn, facilitates efficient conversion combustion of this fuel in the course of PDHG, implemented in accordance with the inventive concept.

Coal passed for processing is ground to class 0 . . . 5 mm or 0 . . . 8 mm, depending on the equipment, in relation to the ACWF production volume required. Possible random inclusions of metal are then separated from the coal and the coal is metered by weight into a first coal accumulator in dependence on its moisture content which is measured where the coal enters the receiver. If the surface moisture in the coal is sufficiently great such that it may run off from the metered coal mass under gravity then it is collected, for example directly from the weighing vibrating filter conveyor which is used to carry out the above-mentioned metering. Here, the weighing vibrating filter conveyor is controlled so that it performs intermittent (jerking) motion, including in reverse, so that it can initiate the run-off of excess surface water from the coal by shaking it. The duration of such coarse conveyor vibratory filtration is determined in accordance with a predetermined program for each grade of coal, in dependence on the readings of the coal moisture sensor which is located at the start of the conveyor. Water collected from under the conveyor is accumulated and when necessary it is used for preparation of ACWF in further process operations. The first coal accumulator, filled with a weighed coal batch, is sealed and the pressure within it is increased by 0.001-0.002 MPa by feeding into the accumulator pre-compressed volatiles which were obtained as a result of the mechanical breakdown of coal while grinding this to 0 . . . 400 μm class and were accumulated in a receiver. The coal is ground under an excess pressure of 0.001-0.002 MPa in a smart disintegrator, passing the coal into it via the hermetic discharge gate of the first coal accumulator. In this process, the coal moves from the accumulator into the disintegrator under gravity with vibratory shaking of the coal guide ducts. In order to prevent the loss of excess pressure in the disintegrator while discharging ground coal from it, the excess pressure in the disintegrator is maintained by feeding an additional volume of volatiles into the first coal accumulator, while monitoring the pressure therein. In the course of grinding coal to 0 . . . 400 μm class, the main part of the finest particle-size component of the coal, the 0 . . . 30+ μm class, is exhausted from the upper part of the working zone of the disintegrator thanks to the above-mentioned excess pressure of volatiles and by means of a special fan. In this process, the cocurrent stream of volatiles which entrains the 0 . . . 30+ μm class from the disintegrator is made up of two parts, the first part being volatiles liberated as a result of mechanical breakdown of the coal batch being ground, and the second part volatiles which circulate in the loop through the coal accumulator and which were also liberated as a result of mechanical breakdown of the coal, but in earlier stages of the grinding of other coal batches. The coal is separated from the two-phase stream of volatiles and 0 . . . 30+ μm class coal in a multicyclone, and the volatiles are passed to a receiver, having first compressed them with the above-mentioned fan. The amount of volatiles discharged from the smart disintegrator is measured and the results of the measurements are passed to the controller of this disintegrator.

A second coal accumulator is employed in order to ensure continuous operation of the disintegrator, and a second batch of coal is charged into this while discharging a batch of coal into the disintegrator from the first coal accumulator. Correspondingly, a batch of coal is charged into the first coal accumulator while coal is being discharged from the second coal accumulator into the disintegrator.

When referring to coal of class 0 . . . 30+ μm in the present invention, it must be understood that this coal may contain, in relatively small amounts, coal particles slightly exceeding 30 μm in size which may be entrained by the cocurrent stream of volatiles when discharging these from the disintegrator. When preparing ACWF from vitrinite or liptinite coals, coal of class 0 . . . 30+ μm is classified and following this coal of class 0 . . . 30 μm is collected and passed to the gasification process to be sprayed onto the surfaces of fuel droplets. The coal of class 30 . . . 30+ μm which remains after this is passed to the process for preparation of grade ACWF$^{400}$ ACWF, where the very small amount of this, relative to the mass of class 260 . . . 400 μm coal, cannot significantly alter the properties of fuel of this grade.

In accordance with the inventive concept, operation of the smart disintegrator is based on use of the functional dependence between the yield of the amount of coal volatiles, obtained as a result of the mechanical breakdown of coal during the "fine" grinding thereof and the resultant particle-size composition of the ground coal. In order to utilize this functional dependence in the ACWF preparation process, a Special Analytical Sample (SAS) for the initial raw coal is obtained experimentally when grinding a coal batch of a specific grade of coal with controlled moisture content to obtain coal of class 0 . . . 400 μm. The measured amount of "Mechanical Breakdown Volatiles" (MBV) obtained is entered into the read-only memory of the controller which controls the smart disintegrator. This amount is referred to as the Standard Mechanical Breakdown Volatiles (SMBV) quantity. The smart disintegrator performs high-productivity grinding of coals, "referenced" to the upper limit of the output particle-size composition of the coal, of 0 . . . 400 μm class, which provides smart regulation of the rate of coal delivery into the grinding zone and also, where necessary, additional regulation of the speed of the main drive of the grinding elements of the disintegrator. Automatic variation in the speeds of the disintegrator drives is accomplished using an adaptive coal grinding algorithm, wherein said speeds are varied by controller commands in dependence on the results of measurement of the amount of MBV. Naturally, the detailed disintegrator control algorithm also takes account of the quantitative circulating component of the volatiles and, in connection with this, the disintegrator controller generates control commands to increase or decrease the speeds of the disintegrator drives.

In accordance with this concept, FIG. 2 shows a version of an outline diagram of the algorithm for controlling coal grinding processes—the machinery of the weighing vibrating filter conveyor and the smart disintegrator, and the moisture separator. The basic data employed for generating control commands, operations carried out on the data, and data streams between processes and data carriers, are shown here using data symbols, process symbols and line symbols.

In the diagram of FIG. 2, symbol 13 indicates the data base file for the various grades of coals being processed and the process regulations for the grinding thereof, stored in the disintegrator controller memory, while line symbol 14 indicates transmission of the part of this data base file relating to a specific grade of coal which is being processed in real time. Symbol 15 designates input into the controller of the data sheet characteristics of the batch of coal being processed. Symbol 16 designates the process of selecting numerical data of the process regulations relating to the moisture content of the coal, which are further utilized as current "standard" characteristics for processing in real time the grade of coal being used. Process 16 involves input 14 of the above-mentioned part of the data base file and transfer into this of the coal data-sheet characteristics data, while transmission is indicated by line symbol 17. From the results of operation 16, data on the process control moisture content of the coal being sent for grinding in the disintegrator are loaded into memory 18. This loading process is designated by symbol 19. The operation of process 20 is selection, from part of the data base file 13, of the numerical values of the control commands which are the set point of the speed of the disintegrator coal feed drives, and output of this set point to the disintegrator feed drives for implementation, designated as terminator 21. Line symbol 22 designates transmission of these data. Process 20 is performed in accordance with the results of the operations of inputs 14 and 17.

Real time data on the SMBV value are obtained in process 23, which comprises the operation of logic sampling from part of data 13 on the basis of the argument input into process 23 by operation 17. Data on the SMBV value for the grade of coal being processed is sent to processes 24 and 25, and the input thereof is designated by line symbol 26. Terminator 27 designates the actual (measured at the start of the conveyor) moisture content of the coal received for processing, at the outlet of the crusher, while line symbol 28 designates the transmission of data on this moisture content to process 29. The operation of process 29 comprises determination of the value of the deviation in the actual moisture content of the coal from the moisture content set by process regulations, transmission of this value to process 29 being designated on the algorithm diagram by line symbol 30. Line symbol 31 shows transmission of data on the deviation of the moisture content of the coal received for processing from the standard set by process regulations. These data are used in predefined process 32 for automatic determination of the operating mode of the conveyor feeding coal for grinding and conditions for vibratory filtration, ensuring reduction in the moisture content of coal discharged from this conveyor to the normative moisture content. In the event of there being excess external moisture in the coal, data are output 33 from process 32, comprising the number of "intermediate" stoppages of the vibrating filter conveyor with hard positioning, and sometimes also the number of reverses of the conveyor, which ensures that the mass of coal is shaken in the course of moving to the end of the conveyor, to the zone where the coal is discharged into an accumulator. The number of "intermediate" hard stops of the vibrating filter conveyor, or the number of reverses thereof, are determined by predefined process 32 as a function of the value of the excess surface moisture content of the coal. The output of these data to the controller for local control of the vibrating filter conveyor is designated by terminator 34. The external moisture content of a coal batch being sent for grinding in the smart disintegrator is controlled in this manner.

Process 35 for measuring the travel path of coal along the vibrating filter conveyor is initiated from the moment of renewal of data 27 and their transmission 28. Using the travel measuring sensor built into this conveyor, the operations of process 35 continuously compare the length of the path along which the coal has travelled with the length of the conveyor. Terminator symbol 36 designates the input of current data on the position of the conveyor, while line symbol 37 shows the transmission of these data to process 35. At the moment when the coal has passed along the entire conveyor (and possibly a proportion of the external moisture has been removed from it) command 38 is issued from process 35 to record the value of the actual moisture content of the coal at the end of the conveyor, i.e. before discharge of the coal into an accumulator. Symbol 39 on the algorithm diagram designates a predefined process for determining the difference between the actual moisture content of the coal being fed for grinding in the disintegrator and the moisture content which the coal should have according to process regulations (data 18). Data 40 on the actual moisture content of the coal at the end of the conveyor, transmission of which is designated by symbol 41, are also input in order to perform process 39. Decision process 42 determines whether or not it is necessary to initiate a separator which separates a possible excess of moisture from coal ground in the disintegrator. If the moisture content of the ground coal does not exceed the standard value, then decision process 42 generates data for completion of the sub-cycle described, 44 on the algorithm diagram. The transmission of data on completion of the sub-cycle is shown by line symbol 43. If the moisture content of the coal being ground appears to be higher than the standard value, then decision process 42 transmits from process 42 to process 45 data on the value of the deviation of the moisture content from the standard value which was generated previously in process 39. Transmission of these data is shown by symbols 38 and 46. The operating conditions for the separator which removes possible excesses of moisture from the coal ground by the disintegrator are determined by process 45, by means of which the operating conditions of the separator are designated and the numerical data for these conditions are output by process 47 to the controller for local control of the separator. The output of these data to the separator controller is designated by terminator symbol 48.

The operations of process 24 and command 49 determine the moment for starting counting the time for measurement of the amount of MBV liberated from a mass of coal equal to a measurement batch. The counting of this time interval is designated by symbol 50. In the present invention, a measurement batch is understood to be a relatively small mass of coal which constitutes, for example, about 10%-15% of the mass of a batch being ground, which is being charged into a coal accumulator and ground by the disintegrator continuously until full discharge of the accumulator. In practice, when implementing the present invention, the value of this measurement mass is selected so that the lower limit is such that this batch will provide a quantitative value of the MBV discharged from this batch so that this quantitative value of the MBV can be recorded by a measuring sensor stably, from the point of view of measurement error. The size of the measurement batch of coal in relation to the upper limit is selected such that it will be sufficiently small, relative to the entire grinding batch, and so that the difference remaining between them will be sufficiently large in order to ensure high-quality grinding conditions, for the entire batch of coal (charged into the coal accumulator) to class 0 . . . 400 μm. That is to say that non-optimal conditions when grinding the measurement batch must not affect significantly the result of grinding of the entire batch.

In the algorithm diagram, terminator 51 designates the output of a command to the MBV measuring sensor to start measuring the amount of MBV liberated from the measurement batch of coal. Here, the mass of the measurement batch of coal is held stable in that the coal feed rate into the grinding zone of the disintegrator, which is set by data 21, is held stable for the interval of process 50—timing the measurement of the amount of MBV liberated from the measurement batch. Here, the value of the speed of the main drives of the disintegrator (which is being held stable) is determined by numerical data 52, which are generated in process 24—the operation of numerical sampling from the database (not shown in the algorithm diagram) in accordance with the SMBV argument. In this case, said value of the speed of main drives of the disintegrator a priori ensures grinding of the coal (of the grade being processed) to a value close to class 0 . . . 400 μm. The "precise" numerical value of this speed is determined more accurately experimentally for each grade of coal and is entered beforehand into the memory of the disintegrator controller. The processes of transmission of data on the speeds of the disintegrator main drive are designated by line symbols 53 and 54. At the end of timing operation 50, a pulse signal designated by terminator 56 is issued, in response to command 55, to the MBV measuring sensor, indicating termination of the measurement of MBV liberated from the measurement batch of coal. As a result of this, the MBV measuring sensor inputs to the disintegrator controller the integral MBV value of the substances obtained, as a result of mechanical breakdown, during grinding of the measured batch of coal, the input being shown as terminator 57. Here, the accuracy of the volume of the measurement batch of coal, ground over said time interval, is ensured by stabilization of the speeds of the disintegrator feed drives. The quantitative MBV data obtained as a result of "operational-control" grinding of the measurement batch of coal are transferred to process 25, operation of which determines the deviation of the actual MBV value from the SMBV. The numerical data of this deviation are transmitted by operation 58 to process 59, which selects the optimal setting of the speed of the main drives of the disintegrator corresponding to the grinding of coal (at fixed rates of coal delivery into the grinding zone) to satisfy the criterion of the largest possible quantity of coal particles with a particle-size composition of class 0 . . . 400 μm in the entire mass of the coal of the particular grade being ground. Line symbol 60 designates transmission of MBV value data to process 25. Here, any functional dependencies (for all the grades of coal being used, previously input into memory 13 of the disintegrator controller) may be used in process 59, for example linear dependencies, proportionally linking the amount of MBV liberated with the upper limit of the main mass of the particle-size composition of the coal being ground. Data 62, which result from operation 59 and are the a posteriori setting of the speed of the main drives of the disintegrator, are sent to process 61. In accordance with the inventive concept, the operation of process 61 (which comprises the operation of switching the data "stream" in accordance with priority sampling logic) specifies a new speed setting of the main drives of the disintegrator. In accordance with this new setting, data 62 are entered in the controller RAM by data transmission process 63. Output of the "new" speed setting to the main drives of the disintegrator, the processes of which are indicated by line symbols 64, 65, 66 and terminator 67, ensures optimal grinding of the following measurement batch of coal. The current data on the set speed for the main drives of the disintegrator are stored in RAM 68. Command 69, which is generated on completing the grinding of each measurement batch of coal (at the moment of transmission of data 58) performs cyclic initiation of processes and 51, which "continuously" maintain optimality of the grinding of the entire volume of coal metered into the accumulator.

Operation of the smart disintegrator, an example of the design of the mechanisms of which is shown below, thus ensures optimization of the grinding of coals of various grades with allowance for the actual deviations in the characteristics of the coal from its data-sheet, which is necessary for the process of preparation of ACWF with a high level of homogeneity for performance of the PDHG process.

The ACWF preparation process is further comprised in that the coal which has been ground in the disintegrator and contains moisture in limited amount (after the separator), is subjected to sequential cascade classification, the number of cascades of coal classification in respect of particle-size composition corresponding to the number of ACWF being prepared as, for example, indicated in Table 4. The ACWF are prepared simultaneously in several rotary-pulsed hydraulic-impact treatment Activation Apparatuses, in which slurry previously prepared in mixers undergoes homogenization and activation. Such an apparatus is described in detail in Bayev V. S. METHOD FOR PREPARATION OF LIQUID COMPOSITE FUEL AND A DISINTEGRATOR AND HYDRAULIC IMPACT DEVICE FOR THE IMPLEMENTATION THEREOF. RU Patent 2185244, Jul. 27, 2000 and comprises a rotary-pulsed hydrodynamic mechanism which converts mechanical energy into other forms of energy:

into thermal energy heating the slurry being treated;
   into the energy of hydrodynamic impact waves, accompanied by the collapse of cavitation cavities, which ensures homogenization of the slurry being treated;
   into the energy of surface-active chemical interaction of the slurry components;
   into the mechanical energy of impregnation which is manifested in overcoming the hydraulic resistance of the pores of coal particles when filling with moisture these pores which have been "freed" as a result of degassing of the coal during the grinding thereof;
   into the internal mechanical energy of stable clusters of the water component of the slurry being treated, stored in the form of "elastic intra-cluster" micro-pulsations.

Here, the parameters of the hydrodynamic action applied to the slurry being treated are relatively mild (without marked dispersion of the solid phase of the slurry), in the specific power range 1.0-10.0 kW/cm$^2$, but with high frequencies of about 5.0-10.0 kHz, thus providing high productivity of the Activation Apparatuses.

Grade ACWF$^{400}$ fuel is prepared from coal with a particle-size composition of class 260 . . . 400 μm, produced in the first stage of cascade classification. Thus, coal of class 260 . . . 400 μm and a small amount of coal of class 30 . . . 30+ is charged through hermetic gates into a first slurry mixer. This charging is performed via a first process metering unit, by means of which the mass of the coal being charged is controlled. After filling the first slurry mixer with a batch of coal it is sealed and then the rotary stirrer is started and a metered amount of process water is fed in, using a first metering pump, from a process water feed vessel, having previously heated this with the thermal energy of slag being discharged from the gasifier. The time for active stirring of the intermediate slurry in the first slurry mixer is set as equal to the time for charging a coal batch into the second slurry mixer, thus ensuring the continuous operation of the disintegrator and the hydraulic-impact treatment Activation Apparatus. On expiry of this time, the intermediate slurry is discharged from the first slurry mixer for treatment thereof in the first Activation Apparatus. After this, the circulation processing of the slurry into ACWF$^{400}$ grade ACWF is performed in the first Activation Apparatus. The fuel slurry being processed in the first Activation Apparatus is circulated through a first process circulation vessel which comprises a gas separator which can handle the entire batch of slurry being processed. The rotary-pulsed Activation Apparatus transports the slurry being treated through the circulation loop, simultaneously fulfilling the function of a circulation pump. In the course of circulation of the slurry being processed, the gases separated from it, which comprise the volatiles liberated from the coal in the course of this processing and volatiles entering from the slurry mixer are passed into a receiver, from which they are, as described previously, utilized in the process of grinding coal in the disintegrator. The emptied first slurry mixer is then re-filled during the treatment of said batch of fuel slurry.

After processing a batch of intermediate slurry into ACWF, the intermediate ACWF is discharged from the first Activation Apparatus into a first correction vessel for a finishing operation. This operation separates off-grade ACWF from the main mass thereof. The next batch of intermediate slurry is then introduced into the first Activation Apparatus for processing, this having been prepared in a second slurry mixer during processing of the first batch of slurry. Subsequent process cycles are performed in a similar manner and the greater part of the first correction vessel is filled with intermediate ACWF. ACWF is held in the correction vessels in a "calm" state for about 30-60 minutes, depending on the grade of coal from which the fuel is prepared, after which the finished ACWF is transported by pumps into reservoir vessels, from which it is passed to the PDHG process. The process holding time for fuel in correction vessels will further be referred to as the correction time. Off-grade ACWF comprises a filtrate-mass which layers out from the fuel and is of lower density than the good-quality ACWF and is located in the upper layer of the total volume of fuel introduced into the correction vessel. On expiry of the correction time, the filtrate is decanted into an off-grade fuel collector, from which it is pumped to the process water feed vessel. The volumes of the correction vessels for each grade of ACWF are chosen to be identical and such that each of these may be filled with intermediate ACWF for the correction time. Thus, while filling the first correction vessel with fuel, previously prepared ACWF is being held in the second correction vessel for separation of filtrate. After discharging finished ACWF and filtrate from the second correction vessel, it is re-filled with newly-prepared intermediate fuel, and during this filling the mass of fuel which was prepared and transferred into the first correction vessel during correction of fuel in the second correction vessel is undergoing the process holding period in the first correction vessel. This process arrangement for the preparation of ACWF ensures that the process for preparation thereof is continuous due to the uninterrupted use of the main equipment—the Disintegrator and the hydraulic-impact treatment Activation Apparatus.

After the first stage of the classification cascade, coal of class $0 \ldots 260\,\mu m$ is sent for preparation of ACWF of the other grades indicated in Table 4. Thus, fuel of grades $ACWF^{260}$ and $ACWF^{170}$ is prepared by analogy with the process described above for the preparation of grade $ACWF^{400}$ fuel, using for this purpose a second set of equipment analogous in its composition to the set of equipment used in the course of preparation of grade $ACWF^{400}$ fuel, as described above.

The equipment assembly for preparation of ACWF referred to in the present invention is the equipment used sequentially for process purposes after the disintegrator, separator and corresponding classification device, as described above. One equipment assembly is used for the preparation of two grades of ACWF due to the fact that the total mass of coal of classes $170 \ldots 260\,\mu m$ and $110 \ldots 170\,\mu m$ is 38%-41% of the total mass of coal, which is comparable with the mass of class $260 \ldots 400\,\mu m$ coal at 45%-50%, used in $ACWF^{400}$ grade fuel. In this case, the second equipment assembly is of similar capacity to that for production of $ACWF^{400}$ fuel, where the mass of coal comprises 45%-50%, and supports processes for the preparation of fuel of the two grades $ACWF^{260}$ and $ACWF^{170}$ at different times.

Table 5 presents quantitative data on the particle-size composition which is obtained by grinding coal in the disintegrator.

It is clear from Table 5 that the total mass of ground coal by classes in the $0 \ldots 110\,\mu m$ range is only 12%-14% of the total mass of coal. Because of this, and in accordance with the inventive concept, in view of the fact that the overall mass of coal by classes in the $0 \ldots 260\,\mu m$ range, obtained after grinding the entire mass of coal is 50%-55%, and that the mass of coal of class $260 \ldots 400\,\mu m$ is 45%-50%, the equipment for preparation of ACWF is used in two versions:
  three equipment assemblies are used, two identical assemblies, the first for preparation of grade $ACWF^{400}$ ACWF and the second for preparation of ACWF of grades $ACWF^{260}$ and $ACWF^{170}$, and a third assembly for preparation of ACWF of grades which are prepared on the basis of coals with a particle-size composition in the $0 \ldots 110\,\mu m$ class range, the third equipment assembly having a production capacity 4 times less than that of the first and second assemblies;
  two identical equipment assemblies are used for preparation of ACWF of the grades indicated in Table 4, the first equipment assembly being used solely for grade $ACWF^{400}$ fuel.

Preference is given to the use of one or the other design solution in respect of the number of equipment assemblies for the preparation of ACWF depending on the requirements for the absolute values of production capacity in specific projects.

Depending on the need to produce syngas with the maximum content of hydrogen, the water component of ACWF is saturated with hydrogen and oxygen dissolved therein, for example by using an electrolyzer, by analogy with the design described in Bayev V. S., Sevast'yanov V. P. RF Patent, RU 2242502. Dec. 20, 2004. METHOD FOR PRODUCTION OF PRODUCER GAS AND A DEVICE FOR THE IMPLEMENTATION THEREOF, but under pressure.

When transporting intermediate coal slurry between ACWF preparation process equipment and feeding finished fuel to a subsystem for the conversion thereof into producer gas via pipelines, supplementary low-energy, "transport activation" of slurry and fuel is employed as an option, facilitating their dynamic stabilization for elementary transportation. This low-energy "transport activation" is performed by means of travelling electromagnetic waves which are created in individual sections of the process pipeline system. Travelling electromagnetic waves are created by designing enclosure of these sections with multi-pole electromagnetic devices, each of which comprises the stator of a multi-phase or three-phase linear "asynchronous" motor, the induction rotor of which is the medium, slurry or finished fuel, flowing through the pipeline. In order to ensure the interaction of the "rotor medium" with the electromagnetic field of the stator, the pipelines in these above-mentioned sections are made from diamagnetic materials, such as glass-fiber composites of glass fibers with an epoxy compound binder. "Transport activation" of intermediate slurry and fuel is performed due to the fact that when in motion they exhibit, to a small extent,

TABLE 5

| Characteristics of coal grinding in the disintegrator | Particle-size composition of coal after grinding in the disintegrator, μm | | | | | | |
|---|---|---|---|---|---|---|---|
| | 0-30 | 30-45 | 45-70 | 70-110 | 110-170 | 170-260 | 260-400 |
| Amount of coal components by particle-size composition after grinding in the disintegrator, % | 1 | 2 | 3-4 | 6-7 | 13-14 | 25-27 | 50-45 | paramagnetic properties due to the presence in their composition of a certain amount of ions and stable water clusters, consisting of several tens of water molecules, which possess a dipole moment [S. V. Zenin, B. V. Tyaglov. HYDROPHOBIC MODEL OF THE STRUCTURE OF WATER MOLECULE ASSOCIATES. Zhurnal fiz. khimii, 1994, 68, (4), 636-641, V. I. Slesarev. Report on research into "THE EFFECT OF "AIRES" FRACTAL-MATRIX TRANSPARENCIES ON THE CHARACTERISTICS OF THE STRUCTURE-INFORMATION PROPERTY OF WATER". Saint-Petersburg, 2002, Ramiro Moro, Roman Robinovitch, Chunlei Xia and Vitaly V. Kresin. ELECTRIC DIPOLE MOMENTS OF WATER CLUSTERS FROM A BEAM DEFLECTION. Physical Review Letters, 97, 123401 (Sep. 18, 2006), PHYSICAL ENCYCLOPEDIC DICTIONARY. Moscow, Sovetskaya entsiklopediya, 1983]. Because of this, a very large number of uniformly-directed mechanical pulse forces, uniformly distributed through the entire mass of the ACWF stream, occur with the frequencies of the electromagnetic field acting on the bulk of the ACWF.

The following are essential features of the ACWF preparation process:
   crushing of the coal with subsequent "dry" grinding thereof and deep cascade classification of the coal in relation to particle-size composition;
   removal from the coal of possible excess surface moisture before grinding the coal and removal of possible excess moisture from the coal after the grinding thereof;
   the use of smart technology for grinding the coal, ensuring that the main mass of the coal is ground to a composition of class 0 . . . 400 µm and with a grinding limit in respect of the upper limit of about 400 µm, the smart technology for grinding coal being constructed on the basis of the criterion of the value of the amount of volatiles liberated from the coal due to the mechanical breakdown thereof;
   partial removal of the volatiles from the coal (degassing) in the course of the grinding thereof and in the course of hydraulic-impact activation of the fuel during the conversion of coal slurry into good-quality ACWF, preserving the separated volatiles and utilizing them in the ACWF preparation process and in the ACWF gasification process together with the liquid phase thereof;
   mixing the ground coal with water;
   preparation from the entire volume of the coal being processed of ACWF of various grades with the properties of high homogeneity in each grade, thanks to the use in each of the fuel grades of coal of particles similar in particle-size composition;
   compatibility of the coal grinding operation and compatibility of the coal slurry activation operation with degassing operations, i.e. with partial separation of the volatiles from the coal during the grinding thereof and with partial separation of the volatiles from the coal slurry during its processing into ACWF;
   the partial hydrophilicity of the coal in the slurry due to the "soft" hydraulic-impact pulsed action on the coal-water contact boundaries in the course of preparing the fuel;
   the special ACWF finishing treatment, comprising the spraying of coal particles of a fine fraction onto the pre-calibrated droplets of fuel before the process of ignition commences.

The following are essential distinguishing features of the ACWF preparation technology now proposed as compared with the analog:
   deep cascade classification of the coal in relation to the particle-size composition after the grinding thereof;
   removal from the coal of possible excess surface moisture before grinding the coal and removal of possible excess moisture from the coal after the grinding thereof;
   the use of smart technology for grinding the coal, ensuring that the main mass of the coal is ground to a class 0 . . . 400 µm composition and with a grinding limit in respect of the upper limit of about 400 µm, the smart technology for grinding coal being constructed on the basis of the criterion of the value of the amount of volatiles liberated from the coal due to the mechanical breakdown thereof;
   partial separation of the volatiles from the coal (degassing) in the course of hydraulic-impact activation of the fuel during the conversion of a coal slurry into good-quality ACWF, preserving the separated volatiles and utilizing them in the ACWF preparation process;
   preparation from the entire volume of the coal being processed of ACWF of various grades with the properties of high homogeneity in each grade, thanks to the use in each of the fuel grades of coal of particles of similar size;
   compatibility of the coal grinding operation with degassing operations, i.e. with partial separation of the volatiles from the coal during the grinding thereof;
   the partial hydrophilicity of the coal in the slurry due to the "soft" hydraulic-impact pulsed action on the coal-water contact boundaries in the course of preparing the fuel;
   the special ACWF finishing treatment, comprising the spraying of coal particles of a fine fraction onto the pre-calibrated droplets of fuel before the process of ignition commences.

BRIEF DESCRIPTION OF THE DRAWINGS

The invention is explained by a timing chart, an algorithm diagram, process flow charts and equipment layout sketches.

PREFERRED EMBODIMENT OF THE INVENTION

Figure 3A:
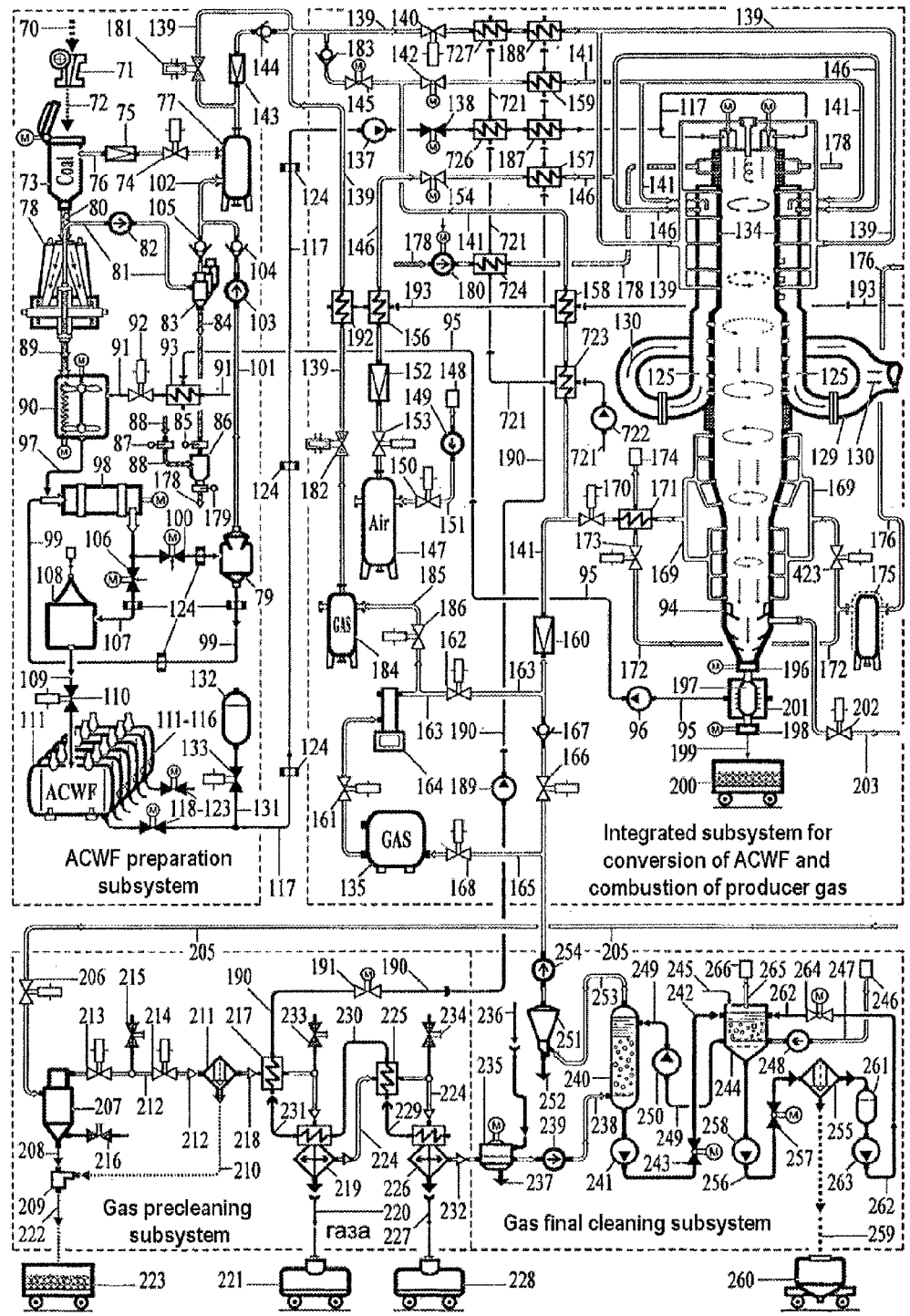
FIGS. 3A and 3B. Diagram of the technology of pseudo-detonated Hydro-Gasification of coals integrated into a hybrid combined cycle for electrical power generation.
Figure 3B:
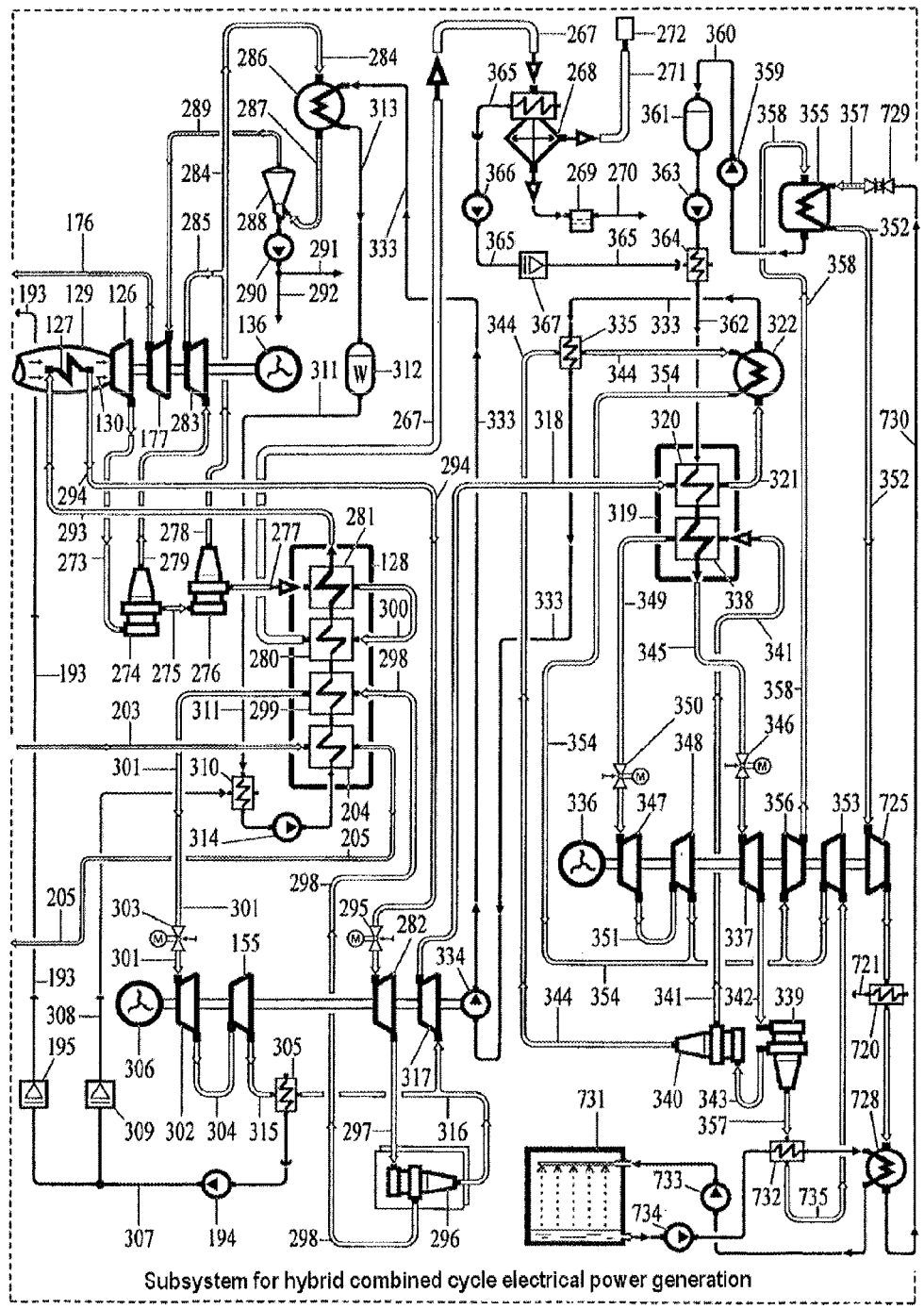

Performance of the invention for high-efficiency generation of electrical power with minimal emission of carbon dioxide, based on HCC with preliminary PDHG of coals, is illustrated by the process flow chart of FIGS. 3A and 3B. This chart shows five integrated subsystems with their inter-relationships in accordance with the concept of the present invention:

- subsystem for preparation of ACWF—shown in outline;
- integrated subsystem for conversion of ACWF and combustion of producer gas—shown in outline;
- subsystem for preliminary purification of gas—shown in outline;
- subsystem for final cleaning of gas—shown in outline;
- subsystem for HCC electrical power generation—shown with sufficient level of detail corresponding to disclosure of the inventive concept.

In the subsystem for preparation of ACWF, the diagram of FIGS. 3A and 3B shows raw coal 70 which is fed to crusher 71 for further processing thereof into liquid fuel. The coal 72 obtained from crusher 71 is charged into coal accumulator 73, having first separated part of the surface water from it on a vibrating filter conveyor. The coal accumulator is then sealed and volatiles, produced previously during the grinding of coal in smart disintegrator 78 and received from process circulation vessel 79, which comprises a gas separator, are fed into the coal accumulator via valve 74 and reducing valve 75, through line 76 from receiver 77. The coal is then passed from coal accumulator 73 via hermetic gates and a hermetic switch through line 80 into smart disintegrator 78, while an excess pressure is maintained in the coal accumulator through line 76. In the course of grinding the coal in smart disintegrator 78, the volatiles released from the coal as a result of the grinding thereof are withdrawn through line 81 and by means of exhaust fan 82, the cocurrent stream of these containing coal dust. This coal dust is separated from the volatiles in multi-cyclone 83, then particles larger than 30 μm are separated from it in a classifier and it is passed through line 84 via hermetic gate 85 into hopper 86 in which fine coal dust of class 0 . . . 30 μm is collected. Via hermetic gate 87 and line 88 this same hopper 86 receives coal dust of class 0 . . . 30 μm obtained from the last stage of the cascade of classifiers of the ACWF preparation subsystem. Coal from smart disintegrator 78 is metered through line 89, via a moisture separator, the first stage of the cascade of classifiers and hermetic gates, and passed to slurry mixer 90. In this manner, a process batch of coal of 260 . . . 400 μm class is charged into slurry mixer 90, and grade ACWF$^{400}$ fuel is then prepared from this. Process water is metered into mixer through line 91 and valve 92, having been preheated in process water preheater 93 by the thermal energy of slag being discharged from gasifier 94 by circulation of an independent heat-transfer agent through line 95, driven by circulating pump 96. Intermediate slurry is prepared by operating the mixing stirrer of slurry mixer 90, and a process batch of this is passed through line 97 via an adjustable valve into hydraulic-impact treatment Activation Apparatus 98. Circulatory processing of the slurry into ACWF is performed in Activation Apparatus 98 through line 99, adjustable valve 100 and process circulation vessel 79. In the course of processing the slurry into fuel, gases are removed from the slurry by separation in vessel 79, and through lines 101 and 102 the gases are passed by fan 103 via non-return valve 104 into receiver 77. The volatiles which were released from the coal as a result of the grinding thereof, and the volatiles which are fed into smart disintegrator 78 together with coal through line 80 are fed into this same receiver 77 through line 102 and non-return valve 105. After processing the intermediate slurry into ACWF, the intermediate fuel is withdrawn from process circulation vessel into correction vessel 108 by Activation Apparatus 98 via adjustable valve 106 and line 107, closing adjustable valve 100 in this process. After "resting" the ACWF in correction vessel 108, it is transported by means of a pump (not shown) through line 109 and valve 110 into reservoir vessel 111. Grade ACWF$^{400}$ fuel is stored in this vessel 111. ACWF of other grades is stored in reservoir vessels 112-116. ACWF is passed for gasification from reservoir vessels 111-116 through line 117 and through one of valves 118-123. Devices for "transport activation" of slurry and fuel are designated by the number 124 in the diagrams of FIGS. 3A and 3B, FIG. 4 and FIGS. 9A and 9B.

The ACWF conversion system integrated with a producer gas combustion process in the diagram of FIGS. 3A and 3B shows gasifier 94, designed as integrated with combustion chamber 125 of gas turbine 126, while combustion chamber 125, in its turn is designed as integrated with super-superheater 127 of first waste-heat boiler 128 of the STC. In accordance with this, superheater 127 is situated within diffuser 129 of combustion chamber 125, such that combustion products 130 being injected into gas turbine 126 are pre-cooled to a temperature of 1200-1600 degrees C., which is acceptable for the specific design of gas turbine 126 employed from the point of view of blade service life. Before starting gasifier 94, this is supplied (as a first version) with liquid hydrocarbon fuel, combustion of which warms up gasifier 94, through line 131 and through main operating line 117 from vessel 132 via valve 133 (for items 131-133 see FIG. 4), with ACWF feed valves 118-123 closed. Air is also fed to the gasifier for this purpose (not shown in the diagram). Furthermore, gasifier 94 is also warmed-up externally through its wall 134 by burning producer gas in combustion chamber 125. In a second version, producer gas can be combusted within gasifier 94 in order to warm it, the producer gas being "extracted" from gas-holder 135 in both versions. Gas turbine 126 is started up and electrical power generation in generator 136 is commenced, starting operation of the STC and OTC. Liquid fuel is fed through line 117 into gasifier 94 with the aid of fuel pump 137 via adjustable valve 138. After warming up gasifier 94, valve 133 is closed and one of adjustable valves 118-123 is opened to feed ACWF of any particular grade to gasifier 94. In this process, protective volatiles released from the coal and/or producer gas are first fed to gasifier 94 through line 139, opening valve 140. In order to burn producer gas in combustion chamber 125 of gas turbine 126, producer gas is fed into chamber 125 through line 141 via regulating valve 142. If the volatiles passing from receiver 77 via reduction valve 143 and non-return valve 144 are insufficient to create a protective boundary gas layer along the internal surfaces of walls 134 of gasifier 94, then this shortfall is made up with producer gas from line 141 via adjustable valve 145. Air is fed through line 146 from receiver 147, which is filled via atmospheric valve 148 by means of compressor 149, via valve 150 and line 151. Before feeding air into combustion chamber 125, its pressure is reduced in reduction valve 152, the feed is set by opening valve 153, and by means of regulating valve 154 the air is metered into combustion chamber 125, depending on the load on generator 136 and gas turbine 126. Before feeding air into combustion chamber 125 it is heated by the heat of spent steam in LPC 155 and the STC turbine, while after gasifier 94 has reached cruise conditions, the air is additionally heated by heat being utilized in the subsystem for preliminary cleaning of producer gas. Such air heating is performed in heaters 156 and 157. As with the air, before feeding producer gas to combustion chamber 125 this is also heated by the heat of spent steam in LPC 155 and the STC turbine and by heat from the subsystem for preliminary cleaning of producer gas, this heating taking place in heaters 158 and 159 respectively. In addition, before this the producer gas is warmed by heat from the steam coolant of cooler 720 by means of an independent heat-transfer agent circulated through line 721 by pump 722. This warming is carried out in preheater 723. Producer gas is fed for compression through line 141 via reduction valve 160 at different times from two different sources. Thus, while starting up gasifier 94 and before it has reached cruise conditions, producer gas for burning in combustion chamber 125 is fed from gas holder 135 via valves 161 and 162 through line 163, being "produced" in evaporator 164. When gasifier 94 is operating in cruise conditions, producer gas is fed through line 165 for burning in chamber 125 via valve 166 and non-return valve 167, and is fed to gas holder 135 via valve 168 from the final gas cleaning subsystem. In addition, cold protective gas or cold carbon dioxide, obtained from GTC exhaust gases, is fed through line 169 to gas generator 94. As indicated previously, this feed to gasifier 94 also hardens plastic ash into solid slag. In the cold gas feed option, valve 170 is opened and the gas fed to gasifier 94 is additionally cooled in cooler 171 by means of chilled carbon dioxide through line 172 via valve 173. Here, the spent carbon dioxide may be passed to a subsystem for trapping it for utilization (not shown), or evacuated to the atmosphere through exhauster 174. In the option of feeding chilled carbon dioxide to gasifier 94, valves 170 and 173 are closed, while valve 423 is opened. In both of the options described above, carbon dioxide is passed into line 172 or into line 169 from receiver 175, to which it is previously fed through line 176 by carbon dioxide turbocompressor 177, driven by gas turbine 126. Here, as a variant, a small amount of fine coal dust is fed to gasifier 94 through line 178 from hopper 86 via hermetic outlet gate 179 by means of high pressure head forced-draught fan 180. In this process, the composition of fine coal and volatiles is heated in preheater 724 by the cooled steam after cooler compressor 725 before feeding to the gasifier. During operation of gasifier 94, in order to protect its internal walls against coking during pulsed jumps in pressure during PDHG, the SP acts by briefly opening SP valves 181 and 182 which creates a rise in pressure in the boundary gas layer at the walls of gasifier 94. Here, the volatiles fed through line 139 into gasifier 94 from receiver 77 and the gas fed through line 141 are not fed as normal, via the corresponding reduction valves 143 and 160 and via non-return valves 144 and 183, but bypassing these, through the corresponding SP valves 181 and 182. The gas (without a reduction in its pressure in reduction valve 160) passes into line 139, via SP valve 182 from special SP gas receiver 184 which in its turn is filled with gas through line 185 via valve 186 from evaporator 164.

The ACWF being passed for gasification is heated in preheater 187 by heat from the subsystem for preliminary cleaning of producer gas, while the volatiles are heated by preheater 188. Using an independent heat-transfer agent moved by circulating pump 189, this heat is passed through line 190 via adjustable valve 191 to preheaters 157, 159, 187 and 188. The heat of spent steam from LPC 155 of the STC turbine, passed for heating air in preheater 156 and for heating producer gas in preheaters 158 and 192, is fed through line 193 by means of an independent heat-transfer agent moved by circulating pump 194 and through controller 195, which controls the flow of independent heat-transfer agent. By means of preheaters 726 and 727, the heat of cooled steam after cooler compressor 725 heats the ACWF and coal volatiles before these are fed to the gasifier. During operation of gasifier 94, hermetic gate 196 of slag collector 197 is held open, and when the slag collector has been filled with slag hermetic gate 196 is closed, after which hermetic gate 198 is opened, discharging the slag 199 accumulated in slag collector 197 into vehicle 200. After this, hermetic gate 198 is closed and hermetic gate 196 is opened in order to accumulate the next amount of slag in slag collector 197. During the accumulation of slag in slag collector 197, the heat of this slag is transferred by an independent heat-transfer agent into line 95 by means of heater 201. Hot unpurified producer gas is discharged from gasifier 94 via valve 202 and line 203 for partial cooling thereof in pressurized water superheater 204 in the first waste-heat boiler 128 of the STC.

After this, the still hot unpurified producer gas is passed through line 205 into a subsystem for the preliminary cleaning thereof, via valve 206 and high-temperature, optionally graphite, multicyclone 207. The main part of the fly ash 208 is separated from the gas in this multicyclone 207 and is passed via hermetic gates (not shown) into dust and ash concentrator 209. This is also supplied with "finer" fly ash 210, also via hermetic gates (not shown), which is separated off on high-temperature, e.g. ceramic, filter 211, by passing gas from multicyclone 207 into this filter. The gas is fed to filter 211 through line 212 via valves 213 and 214, the main purpose of which, together with valves 215 and 216, is to provide conditions for washing cyclone 207, filter 211 and independent heat-transfer agent preheater 217. Gas freed from dust is passed through line 218 via preheater 217 to scrubber 219, in which resins and oils 220 are separated out and passed to vehicle 221. The entire mass of fly ash 222 separated from the gas is discharged via hermetic gates (not shown) from dust and ash concentrator 209 to vehicle 223. The producer gas, partially cooled in preheater 217 and scrubber 219 and freed from fly ash, is passed through line 224 via independent heat-transfer agent preheater 225 into scrubber 226, in which lighter liquid hydrocarbons (gasoline fractions) 227 are separated from the gas and collected in vehicle 228. In this process, the movement of independent heat-transfer agent through lines 229, 230 and 231, via preheaters 217 and 225 and via scrubbers 219 and 226, is arranged in a sequence such that the independent heat-transfer agent passing through the lines of said apparatuses is heated therein with sequentially rising temperature, entering line 190 with maximum temperature while in so doing the independent heat-transfer agent cools apparatuses 217, 219, 225 and 226 in a sequence corresponding to the temperatures of condensation of the products being separated off in scrubbers 219 and 226. The producer gas cooled in the preliminary cleaning is then passed through line 232 into a subsystem for final cleaning of the gas. During routine breaks in operation of the preliminary gas cleaning subsystem, its apparatuses are washed, including scrubbers 219 and 226, and preheater 225, with valves 233 and 234 being provided for washing.

As an example of the arrangement of a subsystem for final cleaning of producer gas, FIGS. 3A and 3B shows an outline flow chart illustrating the processes for removing acidic compounds, carbon dioxide and sulfur from the gas. This subsystem has wet vortexing reactor-scrubber 235, into which water is fed through line 236 as a sorbent, while acidic water is discharged through line 237, while gas, from which carbon dioxide has been partially removed and other acidic compounds have been removed is discharged through line 238 using auxiliary fan 239. As an option, an aqueous slurry prepared on the basis of calcium hydroxide may be fed to vortexing reactor-scrubber 235.

In this case, virtually the entire volume of carbon dioxide contained in the gas can be removed, while the calcium carbonate which has been formed is discharged, also through line 237, and usefully utilized. The design of vortexing gas scrubber described in Burdukov A. P., Kuznetsov M. A., Mishchenko P. A., Popov V. I., Popov Yu. S., Smirnov N. P.

METHOD FOR WET CLEANING OF GAS AND A DEVICE FOR THE PERFORMANCE THEREOF. RF Patent RU 2236890, 2003 may, for example be used as reactor-scrubber 235. One possible option for removing hydrogen sulfide from the gas is the use of the known LO-CAT technology, employing a catalyst based on chelated iron U.S. Pat. No. 7,060,233 B1, Jun. 13, 2006. PROCESS FOR THE SIMULTANEOUS REMOVAL OF SULFUR AND MERCURY. Here, the chelated organic additives prevent precipitation of iron sulfide or iron hydroxide in the water. The process is based on redox chemistry. Thus, hydrogen is ionized to hydrosulfite in absorption column 240 and this is oxidized to sulfur by conversion of the iron ion from the trivalent to the divalent state. The divalent iron ions (in water and with sulfur) are fed to oxidizer unit 244 by pump 241 via line 242 and valve 243. Chelated iron is fed into oxidizer unit 244 through line 245, part of this being lost when sulfur is discharged from the process, and alkali is added to maintain the acid-alkali balance. In oxidizer unit 244, atmospheric oxygen is absorbed in the "solution" of the LO-CAT system, and is fed in by high-draft fan 248 through line 247 via atmospheric valve 246. In unit 244, the divalent iron is re-oxidized to the trivalent state, thus regenerating the catalyst which is returned for further use to absorption column 240 by pump 250 through line 249. Moisture residues 252 are separated off from the gas in normal gas separator 251, with gas freed from hydrogen sulfide passing to separator 251 from absorption column 240 through line 253. The clean and dry producer gas is then compressed in compressor 254, and the gas is passed through line 165 to gas holder 135 and for burning in combustion chamber 125 of gas turbine 126. According to the data of [55, 56], the efficiency of removal of hydrogen sulfide from producer gas is up to 99.9%, which is sufficiently good for operation of gas turbine 126. At the end of the gas final cleaning process, the aqueous slurry containing pure sulfur and chelated iron "solution" from oxidizing unit 244 is passed to filter press 255 for removal of sulfur, the solution being pumped through line 256 via valve 257 by pump 258. Pure sulfur 259 is discharged from filter press 255 into vehicle 260, while the filtrate from filter press 255 is collected in vessel 261, from which it is returned through line 262 by pump 263 and via valve 264 to oxidizing unit 244. The air which is bubbled through oxidizing unit 244 is discharged therefrom to atmosphere through line 265 via exhauster 266.

In the subsystem for hybrid combined cycle (HCC) generation of electrical power, FIGS. 3A and 3B shows schematic diagrams of its internal cycles and the relationships between these cycles. The design of the HCC, using inventive solutions relating to PDHG and ACWF processes in accordance with the inventive concept, provides conversion of the thermal energy contained in coals into electrical power with an efficiency of up to 80-85%.

The diagram of FIGS. 3A and 3B shows GTC solutions which ensure utilization of the thermal energy of the condensation of moisture contained in the exhaust gases of gas turbine 126. Thus, after transfer of part of the thermal energy of the exhaust gases of gas turbine 126 in first waste-heat boiler 128, these exhaust gases pass through line 267 into condensation scrubber 268. The water separated in condensation scrubber 268 with a temperature of 35-55 deg. C. is collected in condensate vessel 269 and is discharged from the subsystem through line 270 for utilization for various commercial purposes. The "fully spent" exhaust gases of gas turbine 126 are discharged from condensation scrubber 268 through line 271 via exhauster 272 to atmosphere with a temperature of 40-50 deg. C.

The overall emission of carbon dioxide contained in these gases and in the gases discharged to atmosphere through lines 172 and 271 via exhausters 174 and 272 is in total only 0.38-0.40 t/MWh of electrical power generated in the HCC subsystem.

For high-efficiency utilization of the energy of GTC waste heat, the exhaust gases of gas turbine 126 are passed through line 273 to vortex apparatus 274 of the first stage of mass-temperature separation of these exhaust gases. The hot part of these exhaust gases is passed through line 275 to vortex apparatus 276 of the second stage of mass-temperature separation of the gases. The stream of the part of the exhaust gases of gas turbine 126 which is discharged from apparatus 276 through hot line 277 thus has a higher temperature than the stream of gases exhausted in gas turbine 126 and flowing out through line 273. Also, due to the fact that the mass of the stream in line 277 exceeds the total mass of the streams of cold discharge lines 278 and 279 of vortex apparatuses 274 and 276, in connection with the above, in accordance with the inventive concept, thanks to the creation of a large temperature head and, correspondingly, the superheating of steam, the energy of the GTC waste heat is converted with high efficiency in first waste-heat boiler 128 into the energy of steam, in steam preheater 280 and in steam superheater 281. Overall, with allowance for the use of super-superheater 127, located in diffuser 129 of combustion chamber 125, this also allows HPC 282 of the GTC steam turbine to operate with supercritical parameters.

The stream of gases of cold line 279, having a lower pressure than the stream of gases of cold line 278, which stems from the principles of operation of vortex mass-temperature gas separators, is compressed in GTC compressor 283, thus equalizing the pressure of the mass of gases from line 279 with the pressure of gases of line 278. The two flows, from lines 278 and 285, are combined in line 284. The combined cold flow is then passed through line 284 into first inter-cycle condenser 286 where the moisture of the cold part of the exhaust gases of gas turbine 126 and the cold part of the gases obtained in mass-temperature separators 274 and 276 is condensed. The two-phase gas-droplet composition from first inter-cycle condenser 286 is withdrawn through line 287 to gas separator 288 in which the water is separated from the gases which comprise mainly carbon dioxide and via line 289 are passed for compression in carbon dioxide compressor 177. The compressed carbon dioxide is passed through line 176 to receiver 175 for utilization in the producer gas production process. The water separated from the gases in gas separator 288 is discharged by pump 290 through line 291 to the ACWF preparation subsystem, while part of this water is passed through line 292 for STC water treatment for making up normative losses.

In order to raise steam parameters to super-critical values, superheated steam from steam superheater 281 is passed through line 293 to super-superheater 127, and then "sharp" steam is passed through line 294 via regulating valve 295 to HPC 282 of the GTC steam turbine. Another measure in the present invention relating to use in the STC of supercritical parameters of the working body thereof (steam) is a solution which relates to increase in STC efficiency by utilizing positive feedback concerning transfer of energy from steam spent in HPC 282 to its inlet. Thus, using steam mass-temperature separator 296 (or a cascade of separators, not shown in detail), the temperature of the main mass of steam spent in HPC 282 is raised, this being passed through line 297 to steam mass-temperature separator 296. Here, the main mass of steam, with elevated temperature compared to the steam spent in HPC 282 and separated from this spent steam, is passed (implementing said positive feedback) through line 298 to steam generator 299 of first waste-heat boiler 128. Part of the energy of steam spent in HPC 282 is thus returned for "secondary" utilization thereof in this same HPC 282, thanks to elevation of the parameters of this part of the steam to values providing the appropriate temperature head in steam generator 299.

As is clear from the diagram of the HCC electrical power generation subsystem in FIGS. 3A and 3B, in first waste-heat boiler 128 steam passes from steam generator 299 to steam heater 280. Thermal energy from the hot part of the separated exhaust gases of gas turbine 126 passes, after partial utilization thereof in steam superheater 281, into heater 280 through line 300 from this steam heater 281. Steam from which part of the energy has been utilized is passed from steam generator 299 through line 301 for work in steam turbine MPC 302 via control valve 303. Steam spent in MPC 302 is passed through line 304 for further work in steam turbine LPC 155. As a result of this, from the mechanical energy generated in the STC steam turbine of the electrical power generation subsystem, electrical power is generated in generator 306, the power in generator 306 being controlled as a function of its electrical loading by means of control valves 295 and 303. Part of the heat of the steam spent in steam turbine LPC 155 is utilized in heater 305 by means of an independent heat-transfer agent. This independent heat-transfer agent flows through lines 307 and 308 and flow controller 309, to heat STC feedwater in heater 310, the feedwater passing into this heater 310 through line 311 from STC feedwater vessel 312. STC feedwater vessel 312 is topped up with water from first inter-cycle condenser 286 through line 313, in which this water is heated thanks to the cold part of the compressed exhaust gases of gas turbine 126, a part which is passed through line 284 to first inter-cycle condenser 286. Water heated in heater 310 is fed by means of feed pump 314 into first waste-heat boiler 128, into pressurized water superheater 204, in which part of the thermal energy of the unpurified producer gas which is discharged from gasifier 94 through line 203 is utilized. Steam spent in steam turbine LPC 155 is passed through line 315 to heater 305, and then in manifold line 316 this steam is combined with the cold part of the steam obtained as a result of mass-temperature separation of steam in apparatus 296, following which the combined steam is compressed in steam compressor 317, in the process raising the parameters, and the steam is passed through line 318 into second waste-heat boiler 319, to OTC steam generator 320. After utilization by second waste-heat boiler 319 of the energy of the steam spent in the STC, this steam is passed through line 321 into second inter-cycle condenser 322 for condensation. The water condensed in this condenser 322 is passed through line 333 by condensate pump 334 as coolant into first inter-cycle condenser 286, precooling it in cooler 335.

In the HCC electrical power generation subsystem, FIGS. 3A and 3B also shows the OTC flow chart. In this cycle, STC energy is converted into electrical power which is generated in generator 336 from the mechanical energy of an organic turbine. Here, as in the STC, positive feedback is employed in order to raise OTC efficiency by returning part of the energy of the organic vapor spent in organic turbine HPC 337 to this same HPC 337. This is accomplished by raising the temperature head in organic vapor heater 338 of second waste-heat boiler 319 by the energy of part of this same organic vapor spent in HPC 337. This temperature head is raised by separating the organic vapor spent in HPC 337 into cold and hot parts in two cascade apparatuses 339 and 340 for mass-temperature separation of this organic vapor. After this separation, the hot part is passed through line 341 to organic vapor heater 338 of second waste-heat boiler 319. In implementing this part of the inventive concept, the spent organic vapor from HPC 337 is passed through line 342 to the inlet of organic vapor mass-temperature separation apparatus 339. The hot part of the vapor, separated in apparatus 339, is passed from it through line 343 to the inlet of apparatus 340, in which further mass-temperature separation of the hot part of the organic vapor received from apparatus 339 is performed.

The coldest part of the organic vapor following cascade separation is passed through line 344 from apparatus 340 to cooler 335 and then, as a coolant, to second inter-cycle condenser 322 to ensure condensation of water vapor in the STC and GTC.

"Sharp" organic vapor from heater 338 of second waste-heat boiler 319 is passed through line 345 for work in organic turbine HPC 337, this feed being regulated by means of control valve 346. Further work by the organic vapor in the OTC to produce mechanical energy is performed in organic turbine MPC 347 and LPC 348. For this purpose, after utilization of part of its energy in heater 338, the organic vapor is passed to MPC 347 through 349 via regulating valve 350 and, after work in MPC 347, it is passed through line 351 to LPC 348. Organic vapor heated in second inter-cycle condenser 322 (the STC condenser) is combined in manifold line 354 with vapor spent in LPC 348 and with the cold part of the organic vapor received from the first stage of the cascade of vortex apparatus 339, 340, pre-compressed by means of equalizing compressor 353. The combined organic vapor is passed from manifold line 354 for compression in compressor 356, thus providing a high temperature for their condensation in OTC condenser 355. The combined organic vapor compressed in compressor 356 is then passed through line 358 to OTC condenser 355, and the organic liquid condensate is delivered by means of condensate pump 359 through line 360 to OTC feed vessel 361. The organic liquid is fed by OTC feed pump 363 through line 362 from OTC feed vessel 361 to OTC steam generator 320 of second waste-heat boiler 319. It is pre-heated in organic liquid heater 364 by means of an independent heat-transfer agent and the energy of condensation of the moisture of exhaust gases of gas turbine 126, energy which is separated in GTC condensation scrubber 268. A controlled feed of said independent heat-transfer agent is delivered to heater 364 through line 365 by means of circulation pump 366 and feed controller 367.

OTC condenser 355 is cooled by a cooler which comprises compressor 725 driven by the OTC turbine, steam cooler 720, condenser 728 and an assembly of heat-regulating valves 729. The evaporator of the cooler is also OTC condenser 355, to which a cold two-phase gas-liquid composition of coolant is fed through line 357. Coolant finally evaporated in evaporator 355 (in the OTC condenser) is fed in the form of vapor into compressor 725 through line 352. Condensed coolant in the liquid form from condenser 728 is fed under condensation pressure to throttling through line 730. Cooler condenser 728 is cooled from the environment, for example by means of relatively small cooling tower 731. Heat discharge into the environment is reduced not only due to the fact that the HCC utilizes three (and not two as is normal) turbine cycles, but also due to the use of additional cooling of this condenser 728 by the cold part of the OTC organic vapor. This cold part of the OTC organic vapor is obtained from vortex apparatus 339 and is passed through line 357 to supplementary cooler 732 of cold condenser 728. In this example, with cooling tower 731, water is fed into the cooling tower by pump 733, is cooled therein and is fed by pump 734 for additional cooling in cooler 732. The cold part of the OTC organic vapor which is thus warmed is passed from supplementary cooler 732 through line 735 to pressure equalizing compressor 353, returning this part of the vapor to the OTC.

The efficient utilization of the OTC and HCC as a whole is thus ensured due to the fact that, on the one hand, supercritical parameters are used in the OTC, utilizing the energy of the organic vapor recuperatively in HPC 337. On the other hand, efficient utilization of the OTC and HCC is determined by the fact that a significant part of the heat of OTC condenser 355 is utilized by means of a cooling cycle in the technological processes of gasification and ACWF preparation, and only a residue of this heat is discharged into the environment.

Figure 4:
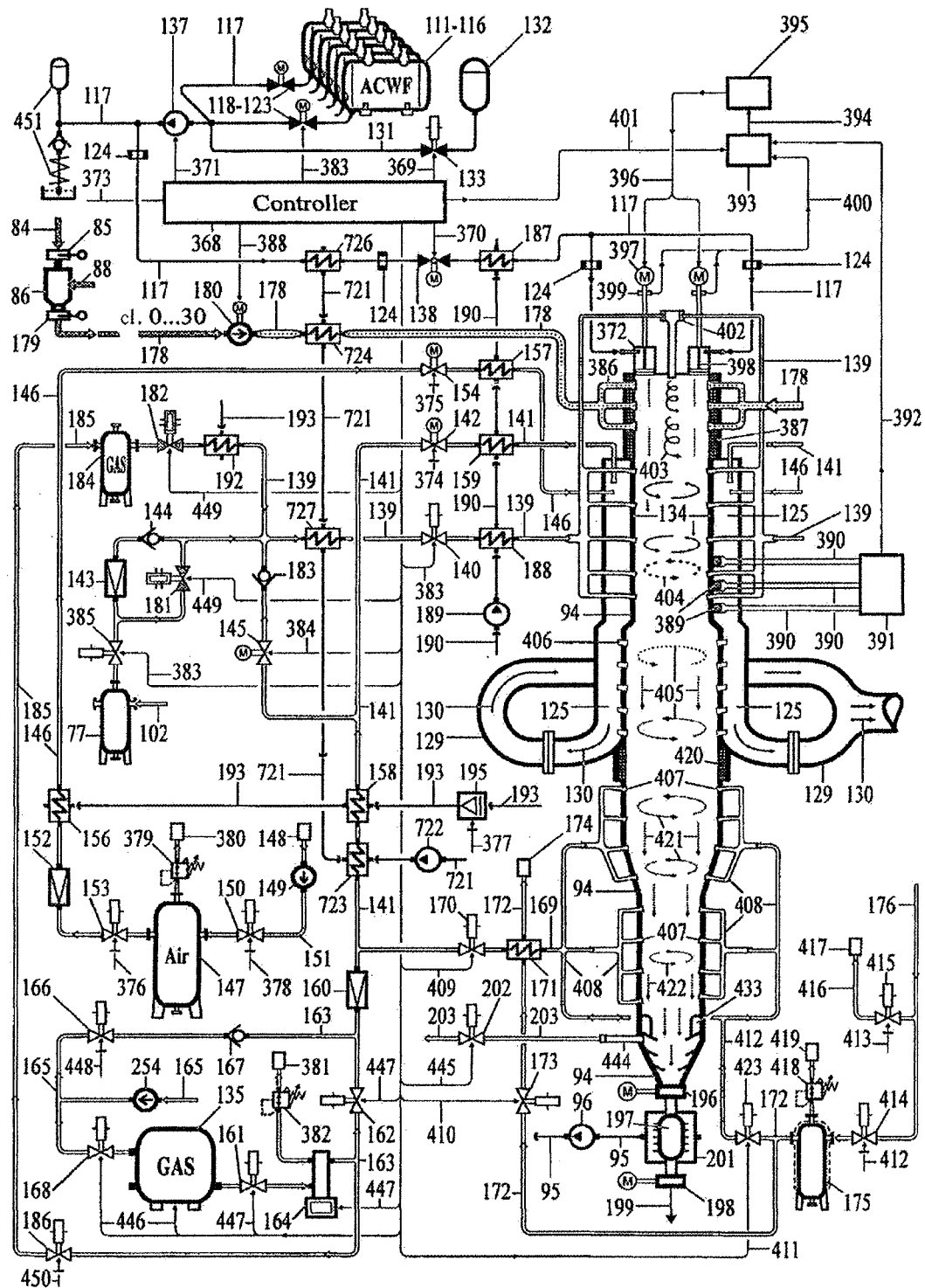
FIG. 4. Diagram of design-integrated technologies for gasification of activated coal-water fuel and combustion of producer gas.
Figure 5:
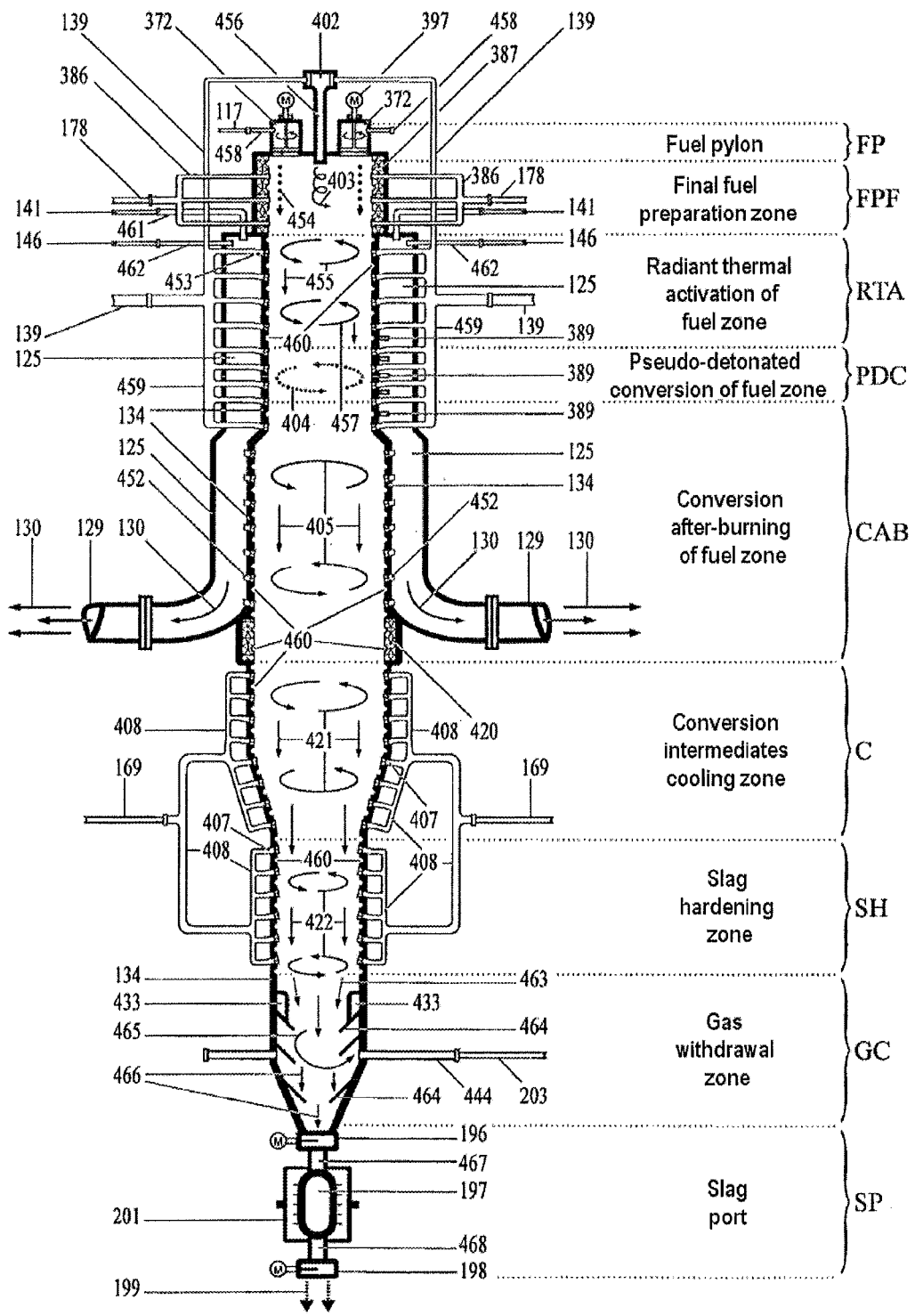
FIG. 5. Layout of vortex-ejector pulsed gasifier of activated coal-water fuel design-integrated with the combustion chamber of a gas turbine.
Figure 6:
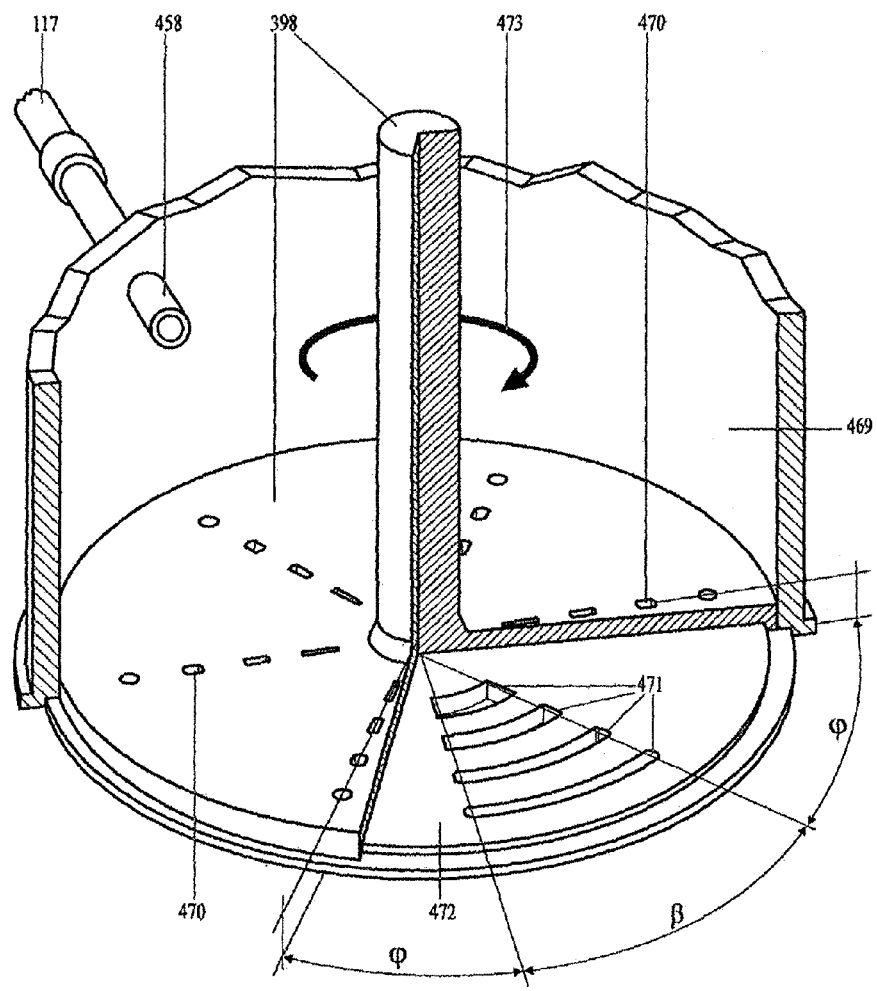
FIG. 6. General view of the design of fuel-calibrating dispensers intended for the activation introduction of coal-water fuel into a gasifier.
Figure 7:
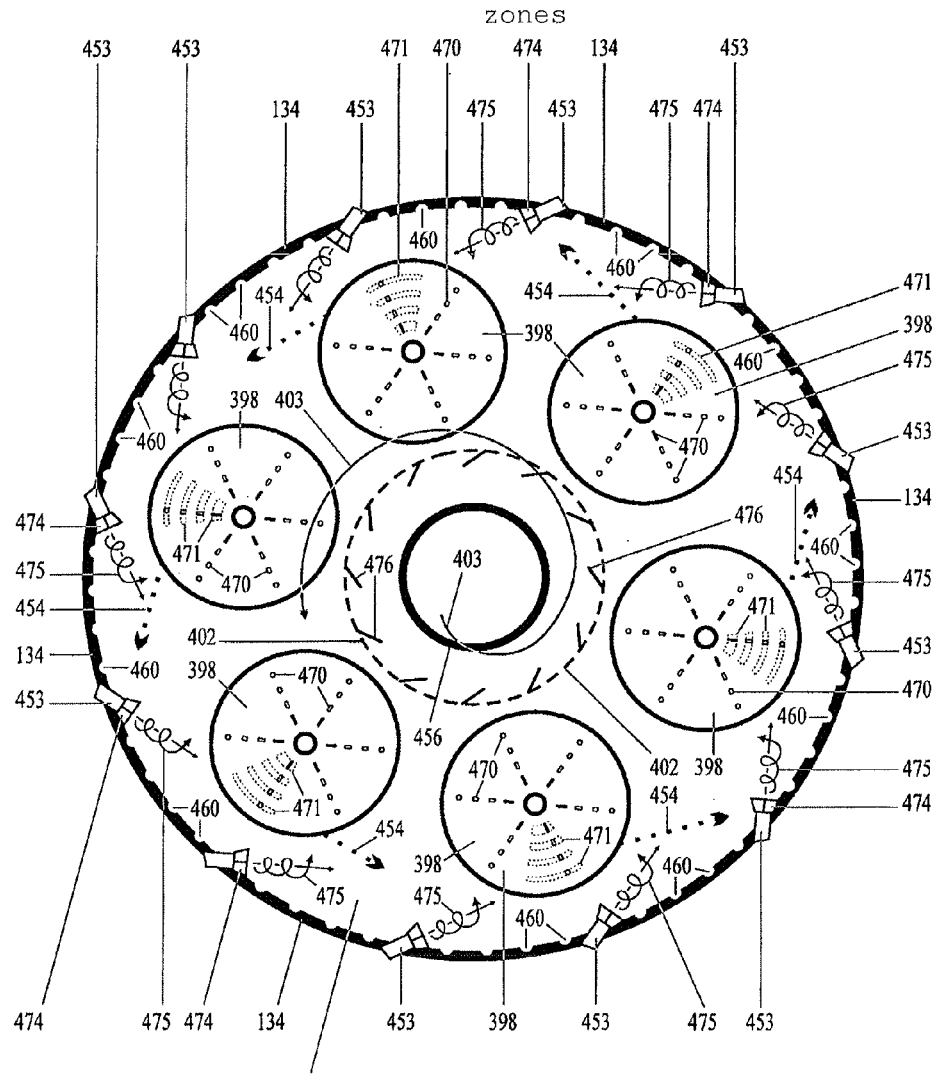
FIG. 7. Layout of fuel-calibrator dispensers and a vortex chamber in the fuel pylon of a gasifier and organization of the movement of gas-fuel streams in the gasifier, in the fuel finishing treatment zone and in the zone of radiant thermal activation of fuel.

FIG. 4 presents a diagram of integrated technologies of gasification of activated coal-water fuel and combustion of producer gas. The design of gasifier 94, shown in the diagrams of FIGS. 3A and 3B and FIG. 4, is shown in more detail in FIG. 5. FIG. 6 and FIG. 7 in their turn, show the most important design units of this gasifier 94, namely: a general view of the design of the fuel-calibration dispensers, intended for activation introduction of coal-water fuel into the gasifier and the layout of the gasifier fuel pylon and the chamber zones thereof: final fuel preparation, thermal radiation activation of, fuel and Pseudo-Detonated conversion.

FIG. 4 shows a flow chart of the ACWF gasification process, presenting this process in greater detail than the flow chart of FIGS. 3A and 3B described above. The diagram of FIG. 4 shows controller 368 and the lines thereof, via which control commands are transmitted to the elements of the flow chart.

Thus, when starting gasifier 94, controller 368 controls valve 133, valve 138 and fuel pump 137 via lines 369, 370 and 371, by means of which liquid hydrocarbon fuel is fed through line 117 into the gasifier (into its fuel-calibrating dispensers 372, FIGS. 5 and 6) to warm up gasifier 94. In order to warm up gasifier 94, electrical power generation cycles are first started by burning producer gas, stored in gas holder 135, in combustion chamber 125. In this process, controller 368 exchanges the appropriate information with the GTC controller (not shown) via line 373. The GTC controller issues commands 374-377 to control the lines feeding producer gas and air into combustion chamber 125, including the heating thereof. Air in receiver 147 is topped up from atmosphere in response to command 378 such that when this is present compressor 149 is kept operating and valve 150 is held open. In the event of an excess pressure overload in receiver 147, the excess air is discharged automatically from it by safety valve 379 via exhauster 380. Similar protection against elevated pressure is also provided in line 163, via which gasifier 94 is fed with produced gas from gas holder 135. For this purpose, the chamber of evaporator 164 is connected to exhauster 381 via automatic safety valve 382.

After heating the gasifier to a working temperature of 1200-1600 degrees C. (depending on the grade of coal used to prepare the ACWF), one of the commands for feeding fuel to gasifier 94 from any particular vessel of the "series" 111-116 is generated by means of controller 368, for example command 383 to valve 118 for supplying fuel from vessel 111, in which process valve 133 is closed by cancelling command 369. The ACWF gasification process is then started. In order to ensure that this process proceeds, commands 383 and, where necessary, 384 are generated by means of controller 368, opening valves 385, 140 and 145 for feeding protective gas to the gasifier through line 139, by means of which a stable vortex structure of the fuel droplet doses which are introduced into gasifier 94 in the final fuel preparation (FPF) zone is maintained in the reaction zones of gasifier 94. In this same FPF zone, when using fuel prepared from vitrinite or liptinite grades of coal, coal dust with a particle-size range of 0 . . . 30 μm is sprayed onto the surface of the fuel droplets by means of active interceptors 386, which are built into the thermally-insulating side walls 387 of the FPF zone of gasifier 94. For this purpose, command 388 of controller 368 starts forced-draught fan 180 and said coal dust is fed through line 178 into gasifier 94 in a cocurrent stream of coal volatiles. This stream of dust and volatiles, obtained in the course of grinding the coal, is generated from hopper 86, into which they were delivered, as was explained earlier.

The flow chart of the PDHG process in FIG. 4 shows the technological "framework" of gasifier 94, consisting of measuring and control lines and electronic and electrical units, by means of which the controlled PDHG process in accordance with the inventive concept is implemented. Thus, special acoustic sensors which register the acoustic noise in the pseudo-detonated conversion (PDC) zone of gasifier 94 are designated as item 389 in the diagram. The signals of this noise are transmitted via acoustic tubes 390 to unit 391, which comprises, an assembly of acoustic-electronic transducers and spectral analyzers. Unit 391 performs continuous processing of the acoustic information which it receives using known methods and, as a result of this processing, generates signal 392 which carries information on the moment in time of the peak value of the process of pseudo-detonated conversion PDC combustion of ACWF in the PDC zone as shown in detail in chart 8 of FIG. 1. In addition, this information signal 392 also contains data on the precise point (on a vertical in the PDC zone) of said peak value of the ACWF pseudo-detonated conversion combustion process. Generation of such information is made possible and performed due to the fact that acoustic sensors 389 are designed to lie on a vertical line along the entire length of the PDC zone. Information signal 392 is transmitted in real time to fuel pylon controller 393 of gasifier 94. Controller 393 generates command 394 for activation dosing of fuel into gasifier 94. Thus, in relation to the measured time interval $t_0$-$t_8$ of chart 8 in FIG. 1, this command 394 is transmitted at the optimal moment $t_8$ for implementation in electrical driver 395, which comprises a power transducer by means of which, via lines 396, the electrical power of servomotors 397 of fuel-calibrating dispensers 372 is modulated. Fuel pylon controller 393 processes in real time information on the position of rotary clippers 398 of fuel-calibrating dispensers 372 in order to use this in the process of modulating the electrical power for controlling servomotors 397. For this purpose, information on the current angular position of rotary clippers 398 of fuel-calibrating dispensers 372 is read by position sensors 399 and is transmitted via lines 400 to fuel pylon controller 393. In order to control fuel-calibrating dispensers 372, signal 401, which is generated by controller 368 while feeding fuel to gasifier 94 via line 117, is passed to controller 393, this signal 401 essentially being an excitation signal for performance of the gasification process.

Figure 1:
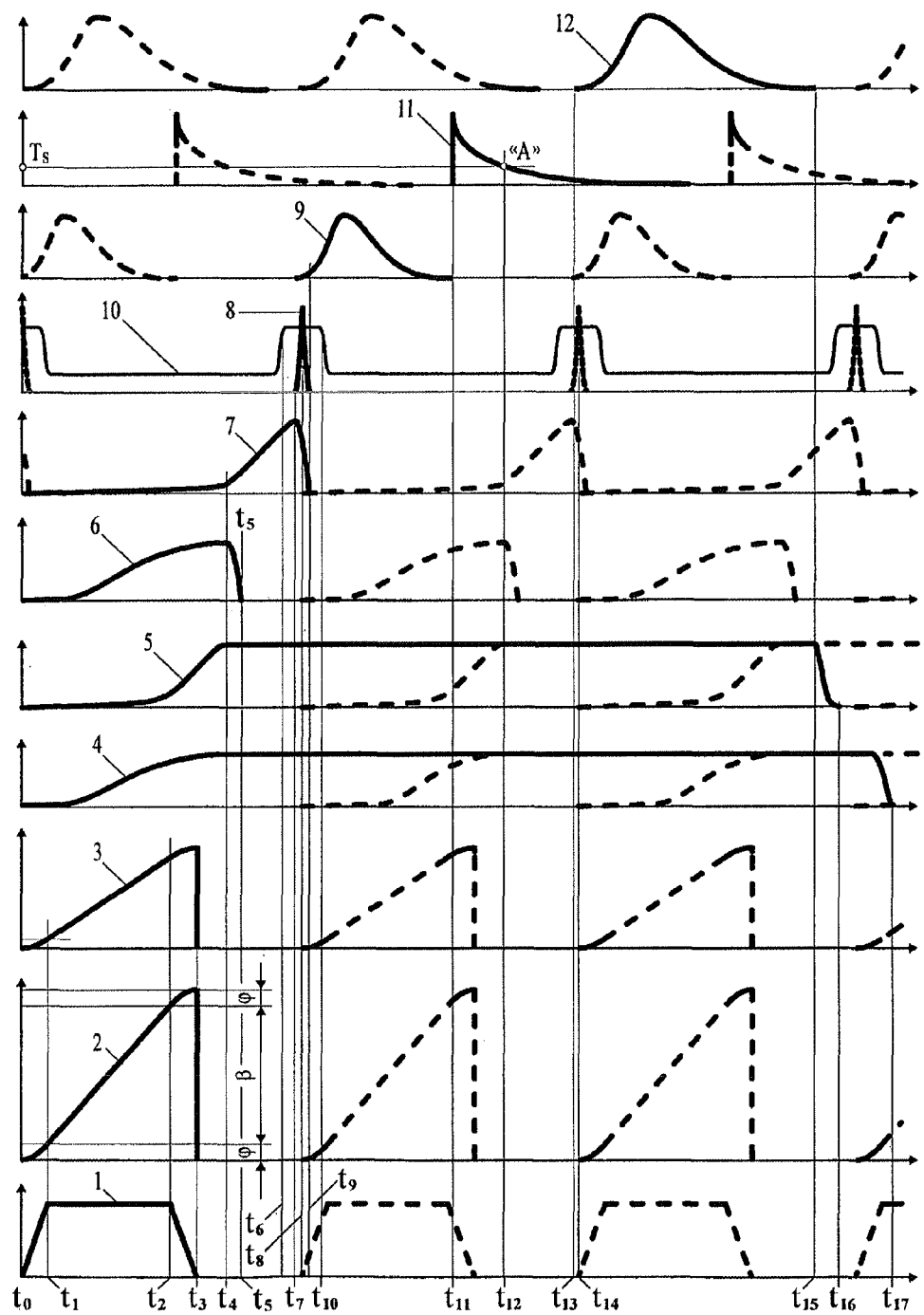
FIG. 1. Timing diagrams of micro-cyclic processes of the technology of gasification of activated coal-water fuel with controlled pseudo-detonated conversion.

In consideration of the control of fuel-calibrating dispensers 372 set out above, and also on the basis of the description of the time charts of PDHG microcyclic processes shown in FIG. 1, it is evident that the measured time interval $t_0$-$t_8$ shown in FIG. 1 is the travel time of fuel droplets from the fuel pylon to the point of Pseudo-Detonated conversion combustion in the PDC zone. It has thus been demonstrated how, employing the feedback principle, PDHG process control is implemented in order to achieve a stable maximum efficiency of the conversion of fuel into gas, even during deviations in the characteristics of the fuel from the regulation values, which may occur in production plant for natural objective reasons.

The frequency of the pulses of main conversion combustion, which are explosive in nature, in the PDC zone of the gasifier may be in the range 1.5-5.0 Hertz, and from 4 to 12 fuel doses may be introduced into the gasifier over the time for converting one dose of ACWF into intermediate syngas.

In FIG. 4, item 402 designates the vortex chamber of gasifier 94, which generates central-axial gas vortex 403, primarily of coal volatiles, in order to maintain spin-up of a fuel droplet dose in the FPF zone of gasifier 94. Gas is fed to vortex chamber 402 through line 139, as has been described above, in order to create a protective boundary gas layer on the inside surfaces of the walls 134 of gasifier 94. In FIG. 4, item 404 designates the process of Pseudo-Detonated conversion combustion of fuel in the PDC zone of gasifier 94, corresponding to chart 8 of FIG. 1.

The process of conversion after-burning of fuel components in the CAB zone of gasifier 94 is designated as item 405 in FIG. 4, which corresponds to chart 9 in FIG. 1. In this CAB zone, when the ash is still plastic and the temperature must not be lowered in order to maintain the process of completing the conversion combustion of fuel, the protective gas boundary layer on the inside surfaces of the walls of gasifier 94 is formed by means of active interceptors 406, which supply combustion products directly from combustion chamber 125 of the gas turbine. As indicated previously, in order to cool and harden the liquid ash contained in the conversion intermediates, a cooling gas is fed into zones C and SH of gasifier 94, and this gas is simultaneously protective for the inside walls of gasifier 94 in these zones. For this purpose, active interceptors 407 are located in the walls of gasifier 94 in zones C and SH, as shown in FIG. 4 and FIG. 5. These interceptors 407 feed cold producer gas, received from line 141, from cooling manifolds 408, or feed cold carbon dioxide through line 172 from receiver 175. When using producer gas as the coolant for zones C and SH of gasifier 94, commands 409 and 410 are generated by means of controller 368, and valves 170 and 173 are opened in response to the commands. Here, cold carbon dioxide passes through line 172 from receiver 175 into cooler 171 and is discharged from the subsystem through exhauster 174 to the atmosphere or to trapping (not shown). Syngas passing through valve 170 is additionally cooled in cooler 171 and is passed via line 169 into cooling manifolds 408. When using carbon dioxide as the coolant for zones C and SH of gasifier 94, command 411 is generated by means of controller 368 and valve 174 is opened in response to this, directing cold carbon dioxide through line 412 into cooling manifolds 408 of gasifier 94. In accordance with this, the controller does not generate commands 409 and 410, so that valves 170 and 173 are accordingly closed. In this process, the local automation facilities (not shown) of receiver 175 ensure the maintenance in receiver 175 of the nominal pressure of carbon dioxide, cold carbon dioxide being passed, by means of commands 412 and 413 and through valves 414 or 415, from line 176 (from the electrical power generation subsystem) either to receiver 175 or for discharge from the subsystem through line 416 and via exhauster 417 to the atmosphere or to trapping (not shown). In this process, protection against excess pressure in receiver 175 is provided on the basis of safety valve 418 and exhauster 419.

In gasifier 94, a band of thermal resistance, designated as item 420 in FIG. 4 and FIG. 5 provides a certain amount of thermal insulation for the walls of zones C and SH of gasifier 94 against the heating thereof by the walls of zone CAB, which is required in order to reduce the design dimensions of zones C and SH.

The ACWF conversion intermediates 421, shown in the process of cooling in zone C of gasifier 94, move into the SH zone thereof, where the ash forming part of these intermediates 422 is hardened. The tangential component of the velocity of motion of the ACWF conversion intermediates, in which fly ash and larger particles of slag are present in the solid form, is then suppressed in zone GC of gasifier 94 by means of vortex dampers 433. Thus, below vortex dampers 433 the slag, and together with this part of the fly ash, moves solely vertically downwards. The other part of the fly ash, entrained by the stream of intermediate syngas, and also this gas itself, are discharged from gasifier 94 via exhauster 444 through line 203 and via valve 202 into the electrical power generation subsystem (for partial utilization of the heat of this gas). Further, this gas is passed into the subsystem for preliminary cleaning of the syngas, as has been explained above. Here, in the course of the ACWF gasification process, controller 386 holds valve 202 in the open position by means of signal 445. The components implementing the process of discharge of slag from the gasifier with utilization of its heat, have been explained in adequate detail above.

The diagram of FIG. 4 shows signal 446, generated by controller 368, in response to which the local automation facilities (not shown) of gas holder 135 ensure that purified syngas is fed through line 165 via valve 168 into gas holder 135. Controller 368 also generates signal 447, which controls the regime of the local automation facilities of gas holder 135 and evaporator 164, ensuring the feed of syngas from gas holder 135 into lines 163 and 141 by means of evaporator 164. This is needed for burning syngas in combustion chamber 125 of gas turbine 126 and for cooling zones C and SH with creation of a protective boundary layer over the inside surfaces of the walls of gasifier 94 in these zones.

In steady-state operating conditions of gasifier 94, when gas holder 135 is completely filled with syngas and the amount of syngas being produced in unit time is sufficient to ensure GTC operation in cruise mode, signal 448, in response to which valve 166 is held in the open position, is generated by means of controller 386 and on the basis of the data received therein from the GTC controller via line 373. This ensures a continuous feed of pure syngas through line 165 from compressor 254, from the subsystem for final cleaning of gas, which is needed in order to maintain GTC operating conditions and for the gasification process. In the course of the PDHG process, in order to operate special valves 181 and 182 of the SP of gasifier 94, commands are generated by controller 368 for operation of the SP and are transmitted via line 449 to control these valves 181 and 182. In this regard, the SP is operated, as has been described above, in the time interval $t_6$-$t_{10}$, which is shown by chart 10 in FIG. 1.

In order to top up SP special gas receiver 184 with syngas, signal 450, in response to which valve 186 is opened, is generated by means of the local automation facilities of gas holder 135 and the local automation facilities (not shown) of receiver 184, and this special SP gas receiver 184 is topped up with compressed syngas.

Hydraulic accumulator 451 is employed in order to ensure stabilization of the working pressure in line 117 in operating conditions and during transient processes when, after warming up gasifier 94, the gasifier feed is switched from liquid hydrocarbon fuel stored in vessel 132 to ACWF, or when washing fuel lines and the fuel pylon after shutting down gasifier 94.

FIG. 5 shows the design layout of an ejector-vortex pulsed ACWF gasifier integrated with combustion chamber 125 of gas turbine 126. FIG. 5 (as also the diagram of FIG. 4) shows the most important inventive solution relating to the design integration of gasifier 94 with combustion chamber 125 of gas turbine 126. It demonstrates how combustion chamber 125 is designed to encompass externally gasifier 94 in its functional/process RTA, PDC and CAB zones, and shows active interceptors 452, built into radiant walls 134 and through which combustion products from combustion chamber 125 are injected into gasifier 94 in the CAB zone. The combustion products create a protective gas boundary layer along the inside surface of walls 134 of zone CAB, protecting these walls 134 against plastic ash and maintaining in this zone the high temperature needed in order to complete conversion after-burning of the fuel. The active interceptors designated as item 453 are also built into radiant walls 134 and volatiles produced in the course of grinding the coal and/or producer gas are injected into gasifier 94 in the RTA and PDC zones in order to create a protective gas boundary layer along the inside surfaces of walls 134 of the RTA zone and the PDC zone. In this process, the gases being injected through active interceptors 453 are partially combusted, which is favorable for maintaining the high temperature needed in the RTA and PDC zones. ACWF fuel droplet doses 454 are introduced into the FPF zone of gasifier 94 by means of fuel-calibrating dispensers 372, which are driven by servomotors 397, and in this FPF zone coal dust with a particle size range of 0 . . . 30 μm are optionally sprayed onto fuel droplets from active interceptors 386, connected to line 178. In this process, the determined aerodynamic structure of two-phase/composite vortex 455 is formed in the FPF zone due to the fact that the jets injected from interceptors 386 are designed to be oriented in a direction close to tangents to the cylindrical walls of gasifier 94 in the FPF zone thereof, and also due to central-axial gas vortex 403, which is introduced into the FPF zone from stem 456 of vortex chamber 402. In FIG. 5, the structure of two-phase/composite vortex 455 is shown as extended into the RTA zone of gasifier 94. Item 457 is a structured, as mentioned above, fuel droplet dose undergoing thermal radiation activation in the RTA zone of gasifier 94, while item 404 designates the process of Pseudo-Detonated conversion combustion of the fuel. The layout of gasifier 94 in FIG. 5 shows fuel feeders 458, through which the ACWF is introduced into fuel-calibrating dispensers 372, while the fuel feeders are connected to line 117. Item 459 designates the feed manifold of active interceptors 453, which is connected to line 139. Passive interceptors, which are arranged densely on "free" surfaces in all zones of gasifier 94 except for zones GC and SP, are shown as item 460. These passive interceptors 460 comprise pits or linear depressions (in the form of grooves) which are designed to be arranged vertically on the inside surfaces of walls 134 of gasifier 94. Passive interceptors 460 provide an increase in turbulence in the protective gas boundary layers along the inside surfaces of walls 134 in order to reduce friction between the surface of these walls and the reaction components travelling through the gasifier. Items 461 and 462 designate gas burner units of combustion chamber 125, which are connected to producer gas feed line 141 and to air feed line 146 respectively. Special acoustic sensors, which are employed for PDHG process feedback control are shown as item 389. FIG. 5 shows diffuser 129 of combustion chamber 125, while the combustion products passed into gas turbine 126 from this combustion chamber 125 are shown as item 130.

FIG. 5 shows thermally insulating sidewalls 387 of gasifier 94 and its band of thermal insulation 420, which provides a thermal barrier between the walls of zones CAB and C of gasifier 94. The process of conversion after-burning of ACWF in zone CAB is designated as item 405, while item 421 in zone C is the process of cooling the conversion intermediates. Hardening of ash in zone SH is shown as item 422. Item 407 indicates the active interceptors by means of which cooling gases are injected into zones C and SH of gasifier 94, these gases also creating a protective gas boundary layer along the inside surfaces of the walls in these zones. These interceptors are fed from cooling manifolds 408 which, in their turn, are connected to line 169. Conversion intermediates 463, which have been cooled to a temperature slightly lower than the ash hardening temperature and pass into zone GC of gasifier 94, lose the tangential component of their motion in this GC zone, thanks to the action of vortex dampers 433 and, being moved towards the vertical central axis of gasifier 94 due to their deflection towards the central axis of the gasifier by deflector 464, these conversion intermediates 463 are withdrawn from gasifier 94 through exhauster 444 and through the slag port (SP) zone. In this process, intermediate producer gas 465 and the fly ash present in the stream of this gas 465 are withdrawn through exhauster 444 into line 203, while "heavy" particles of solid, but hot, slag 466 fall into slag collector 197 through hermetic gate 196. The design elements of the GC zone of gasifier 94 are based on the condition of optimizing the aerodynamics of the movement of the two-phase stream of conversion intermediates 463, which is ensured by a degree of vertical blockage of the GC zone equal to 0.35-0.55. The heat of the hot solid slag 466 is utilized by means of heater 201, the resultant thermal energy being used in the ACWF preparation process.

Cold slag 199 is withdrawn from gasifier 94 through slag ducts 467 and 468 of gasifier 94 and through hermetic gate 198.

FIG. 6 shows a. general view of the design of fuel-calibrating dispensers, which are designed for the activation feed of coal-water fuel into the gasifier. The design of the mechanism of a fuel-calibrating dispenser 372 consists of hermetic body 469, into which ACWF is fed under pressure through line 117 by means of fuel feeder 458. ACWF fuel droplet doses 454 are formed when through channels 470 in rotary clipper 398 coincide with through channels 471 of the base 472 of fuel-calibrating dispenser 372. Said coincidence of through channels 470 and 472 is provided by rotation 473 of rotary clipper 398 relative to base 472. In this process, ACWF droplets of identical dimensions are formed thanks to the special profiles (shown in FIG. 6) of the through channels 471 of base 472, since the coincidence time of through channels 470 and through channels 471 is identical, and only the angle β (shown in FIG. 6) and the rotational speed 473 of rotary clipper 398 is determined. The rotational speed of rotary clipper 398 and its angular position are regulated by means of a servomechanism (not shown) controlled by servomotor 397, and thanks to the data of position sensor 399 on the angular position of rotary clipper 398. Servomotor 397 and position sensor 399 are shown in FIG. 4 and FIG. 7. In connection with this control of rotary clipper 398 speed and angular position, charts 1 and 2 in FIG. 1 show the corresponding data, in which the above-mentioned coincidence time of through channels 470 and through channels 471 corresponds to the interval $t_1$-$t_2$. In this process, with a constant rotational speed 473 of rotary clipper 398, the latter rotates through an angle 3 (shown in FIG. 1 and FIG. 6). The time intervals $t_0$-$t_1$ and $t_2$-$t_3$, during which the servomechanism accelerates and brakes rotary clipper 398 by means of servomotor 397, are determined by the angles T of movement of rotary clipper 398, as shown in FIG. 1 and FIG. 6. In accordance with the above, the formation of a dose of ACWF droplets of identical dimensions in one and the same time $t_0$-$t_3$ is shown by chart 3 in FIG. 1. In this process, each droplet acquires a determined amount of motion, facilitating entrainment of the droplets in the spiral motion, which is organized by the technological actions in the FPF and RTA zones of gasifier 94, as described above. Acquisition of an amount of motion by the droplets is ensured due to the increasing mass of each droplet forming during the time when a through channel 470 of rotary clipper 398 travels within the limits of angle β, while the increasing mass of a droplet is "dragged" by through channel 470 along the profile of through channel 471, which ensures that the mass of a forming droplet accumulates kinetic energy.

The rotary clippers 398 and bases 472 of the fuel-calibrating dispensers 372 may be made, with forced quenching, from heat-resistant and hard materials such as Hastelloy, Refractalloy, Sinoksal, Elbor or Hadfield steel. The design of fuel-calibrating dispersers 372 may utilize gas bearings or sliding bearings based on Sinoksal for rotary clipper 398—base 472 pairs and rotary clipper 398 body 469 pairs in order to ensure the durability of clippers 398 and bases 472 in relation to the abrasive action of ACWF thereon.

FIG. 7 shows the layout of fuel-calibrating dispensers and the vortex chamber in the fuel pylon of a gasifier and organization of the motion of the gas-fuel streams in the gasifier in the final fuel preparation zone and in the radiant thermal activation of fuel zone. This layout shows how bases 472 of fuel-calibrating dispensers 372 are designed to be oriented relative to walls 134. It is shown in particular that bases 472 are designed to be set at such angles relative to the vertical axes of the fuel-calibrating dispensers 372 that their through channels 471 are oriented along the shortest possible radial line from the central axis of basses 472 to wall 134 of gasifier 94. Thus, when ACWF droplets are ejected from fuel-calibrating dispensers 372, the velocity vector of the amount of motion of the droplets is always directed in directions close to tangents to a circle inscribed in wall 134, as is shown by item 454 in FIG. 7, which designates ACWF droplets being injected into the FPF zone of gasifier 94. In FIG. 7, item 474 designates the stationary blades of active interceptors 453, by means of which gas jets 475 are swirled, the gases being injected into gasifier 94 by means of these interceptors 453. As indicated above, such swirling of gas jets 475 around their axes is necessary in order to create a denser protective gas boundary layer along the inside surfaces of walls 134 of gasifier 94. Item 476 indicates the stationary blades of vortex chamber 402, by means of which the gases injected through line 139 into this vortex chamber 402 are swirled, resulting in the discharge of central-axis gas vortex 403 from stem 456 into the FPF zone of gasifier 94, this facilitating formation of a determined aerodynamic structure of two-phase/composite vortex 455, which is shown in FIG. 5.

Figure 8:
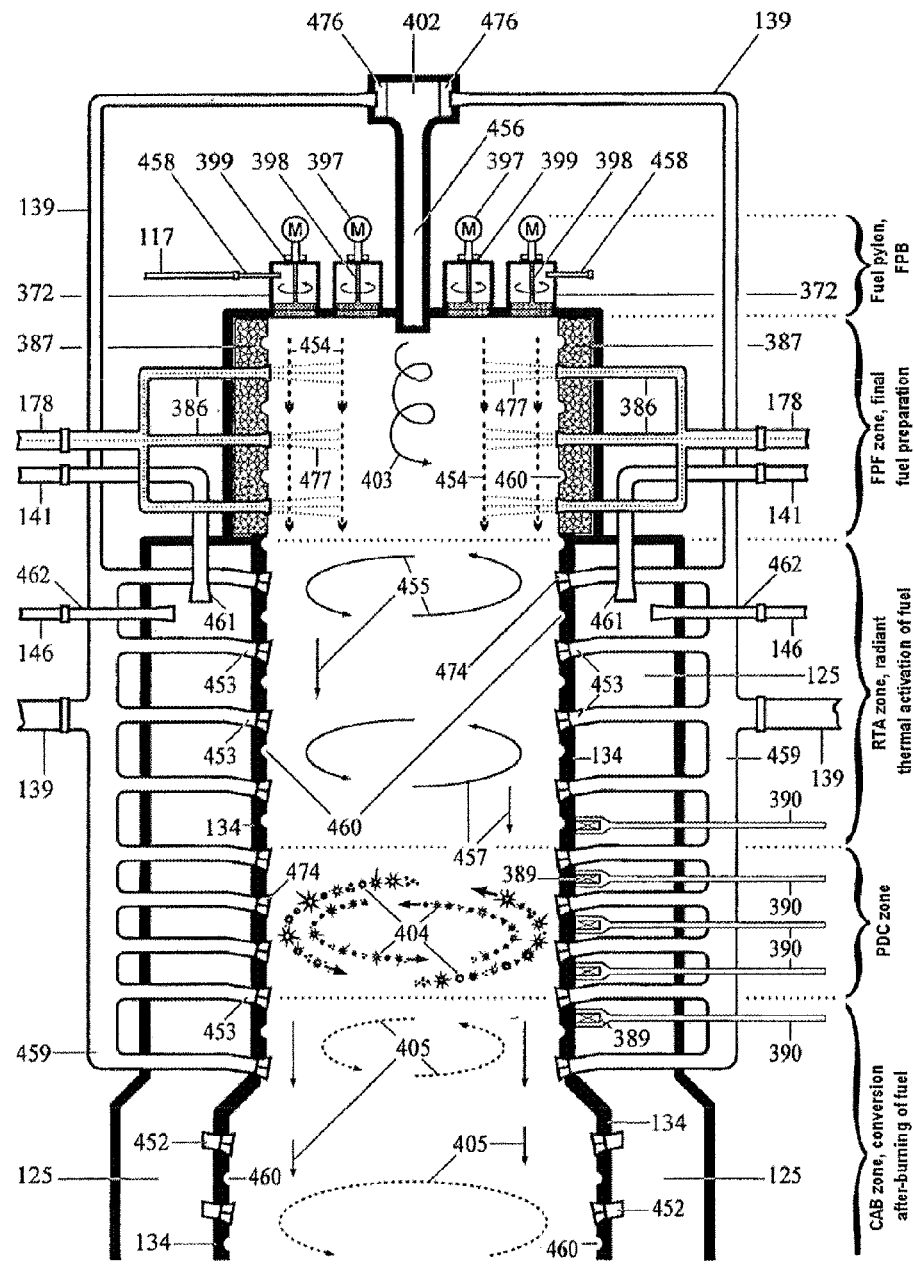
FIG. 8. Layout of a gasifier fuel pylon and its chamber zones for finishing treatment of fuel, radiant thermal activation and pseudo-detonated conversion.

FIG. 8 shows the layout of the gasifier fuel pylon and its chamber zones for final fuel preparation, radiant thermal activation and Pseudo-Detonated conversion. The mutual disposition of the already-described elements of the FP, FPF, RTA and PDC zones of gasifier 94 are here shown in greater detail, and also a variant is shown of the use of fuel-calibrating dispensers 372 arranged in two rows on concentric circles, the centers of which are "arranged" on the central vertical axis of gasifier 94, which is possible for the construction of high-capacity gasifiers. Two-phase/composite jets injected into the FPF zone of gasifier 94 from active interceptors 386, and consisting of volatiles and/or producer gas and coal dust with a particle-size composition of class 0 . . . 30 μm, as has been described above, are shown as item 477.

Figure 2:
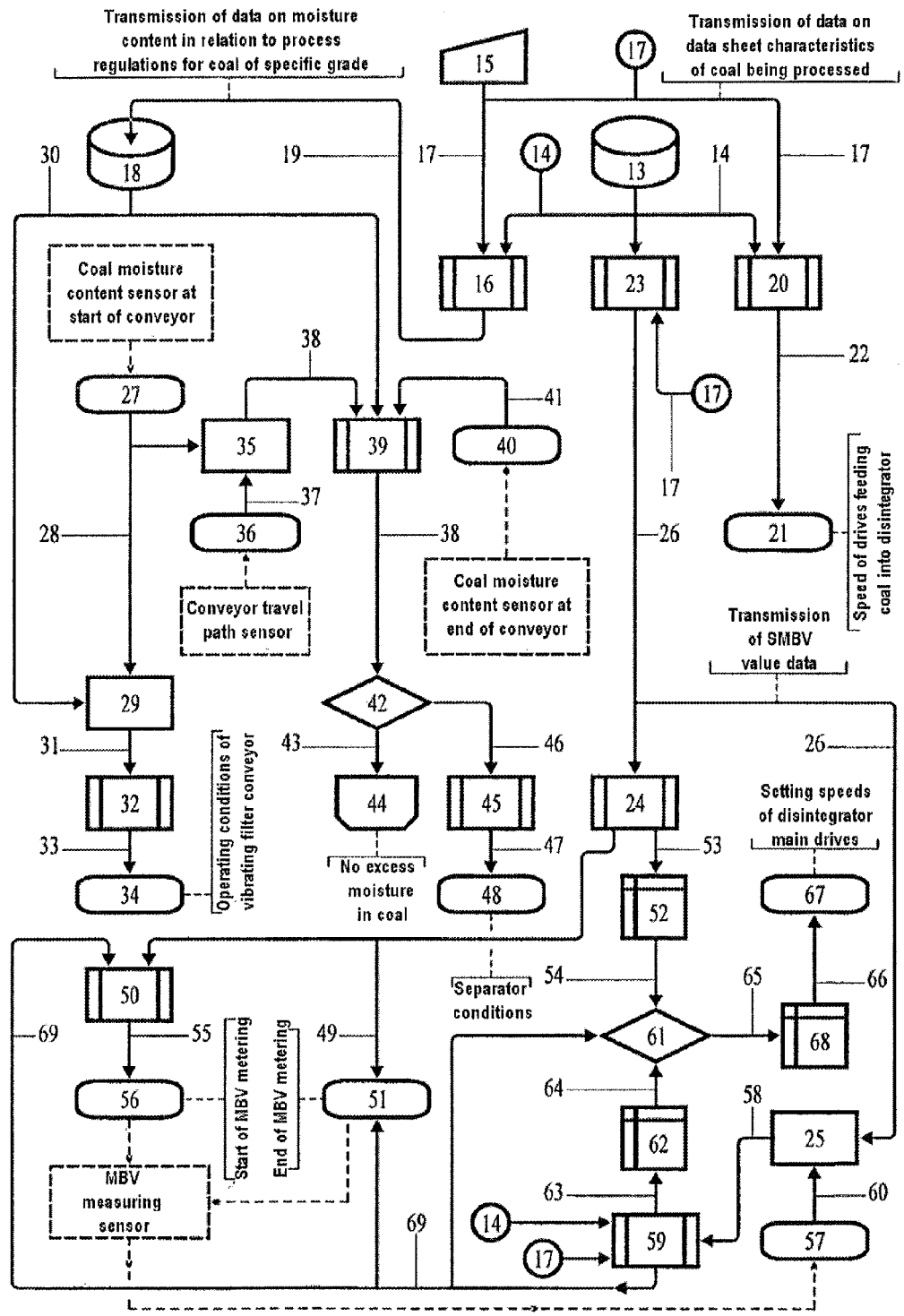
FIG. 2. Diagram of an algorithm for controlling coal grinding processes—vibrating filter conveyor and smart disintegrator mechanisms and moisture-removing separator.
Figure 9A:
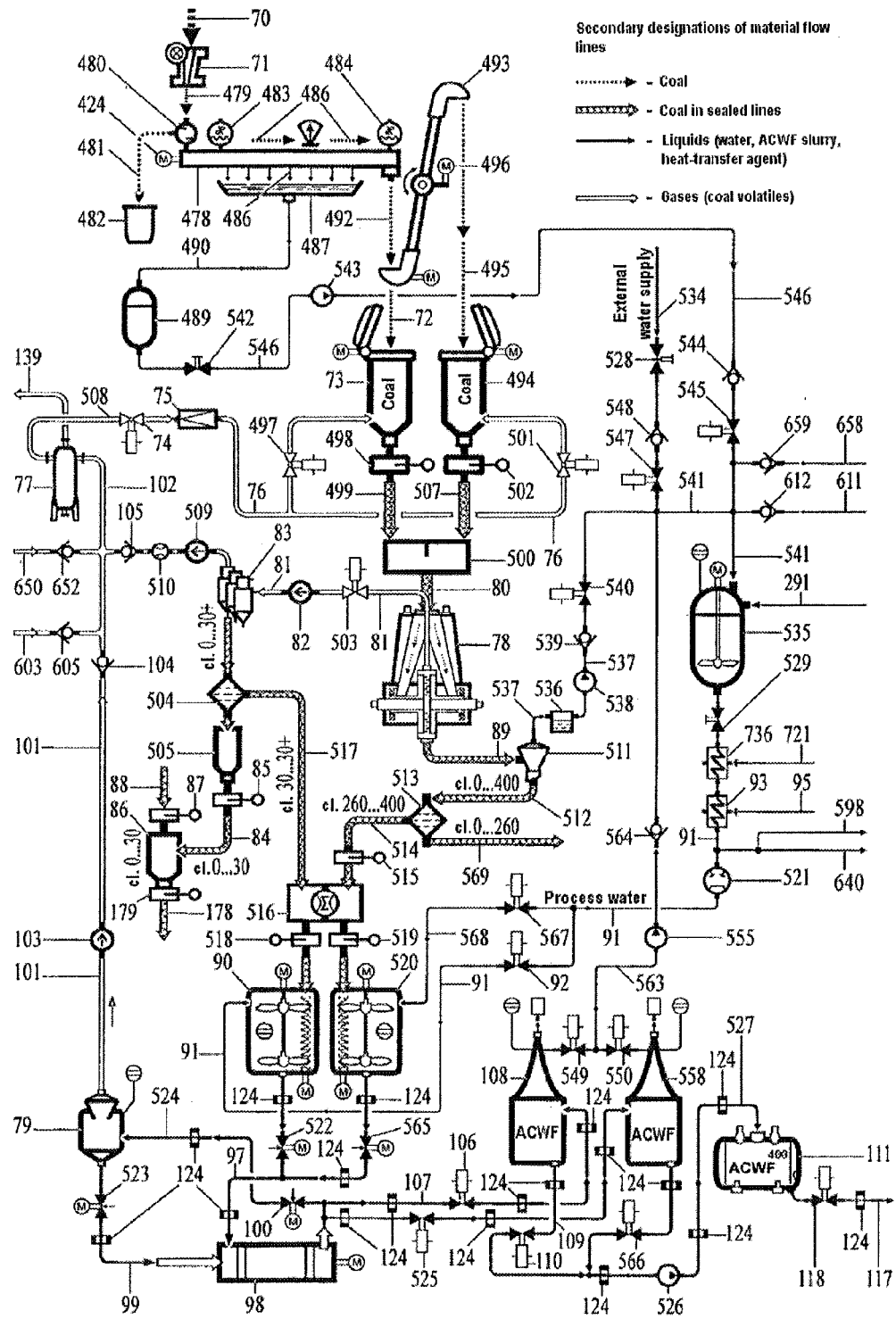
FIGS. 9A and 9B. Diagram of the technology of a subsystem for preparation of Activated Coal-Water Fuel.
Figure 9B:
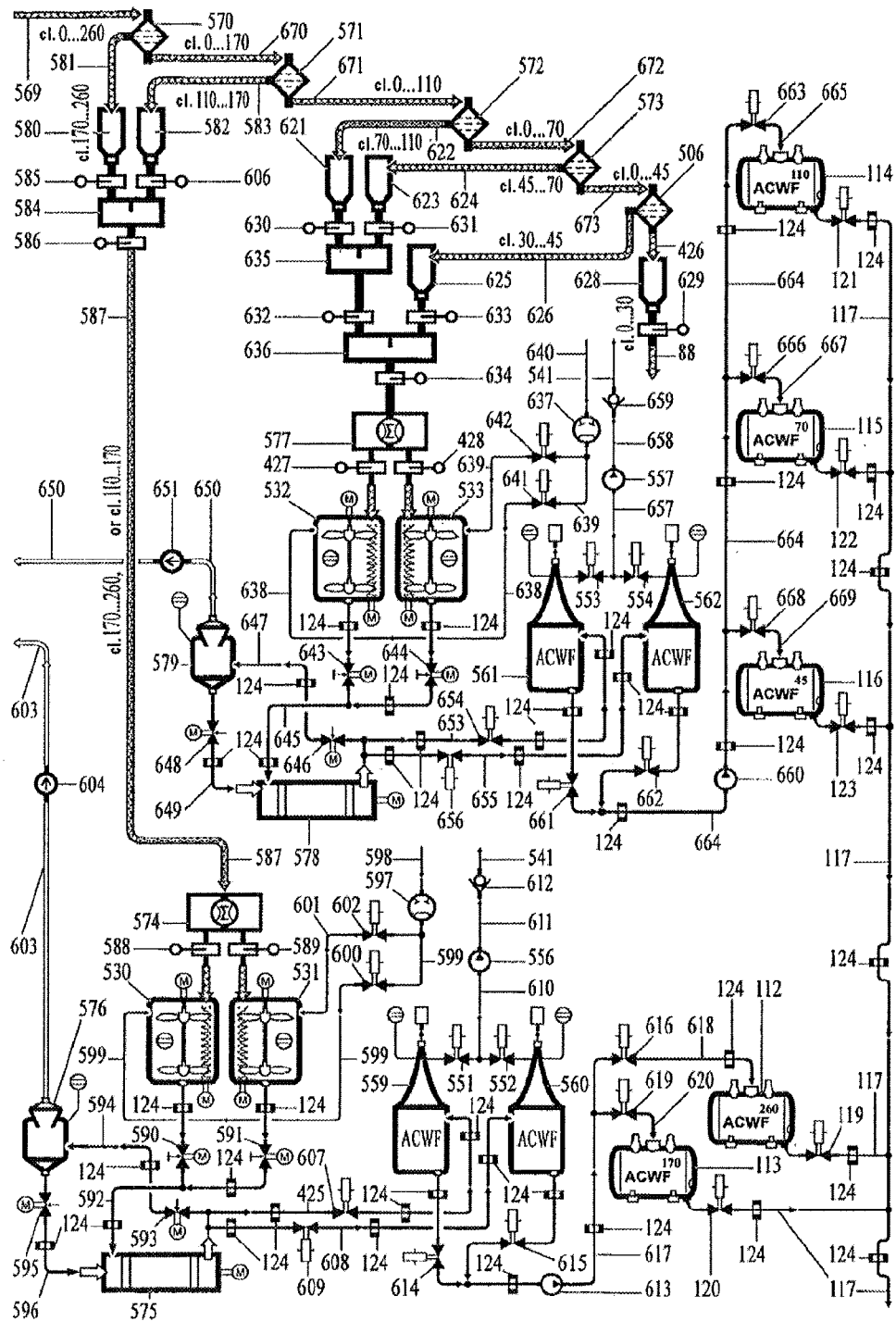

FIGS. 9A and 9B present a flow chart of the subsystem for preparation of ACWF of predetermined quality and properties which meet the requirements of the PDHG process. According to the ACWF preparation technology now proposed and in accordance with the inventive concept, FIGS. 9A and 9B show the preparation of six grades of fuel, each of which has high homogeneity. The present invention distinguishes fuel homogeneity as primary, in relation to the content therein of coal particles with restriction in relation to particle-size composition within specified ranges, and fuel homogeneity as secondary in relation to the determinacy of its metering parameters when being fed into gasifier 94. The diagrams of FIGS. 9A and 9B show the ACWF preparation process with primary homogeneity properties thereof. Here, the raw coal being fed into crusher 71 for further processing into liquid fuel is shown as item 70. Coal 72 received from crusher 71 with a particle-size composition of class 0 . . . 8 mm is charged into coal accumulator 73, having first separated off part of the surface moisture on weighing vibrating filter conveyor 478. Any random metal inclusions 481 are removed from the coal (shown as item 479) obtained at the outlet of crusher 71 by electromagnetic metal separator 480 and sent to metal collector 482. The initial moisture content of coal 479 is measured by means of coal moisture content meters 483 and 484, mounted at the beginning and end of weighing vibrating filter conveyor 478 and the results of this measurement are used to generate operating conditions for weighing vibrating filter conveyor 478, using the above-described special algorithm shown in FIG. 2. In accordance with this algorithm, if coal 479 contains excess surface moisture, then intermittent (jerking) movement is applied to weighing vibrating filtering conveyor 478, optionally with reverses, using drive motor 424. As a result of this, coal 485, situated on weighing vibrating filter conveyor 478, is shaken and excess surface moisture 486 is collected by water collector 487, from which it runs into coal external moisture vessel 489 through line 490. If excess surface moisture of coal 479 is not registered by moisture meter 483, then coal 479 and 485 is moved by conveyor 478 for metering, in which process it is weighed. Coal 492 is discharged from weighing vibrating filter conveyor 478 into two-position bucket elevator 493, by means of which coal 492 is passed into first coal accumulator 73 (delivered coal 72) or coal 492 is passed into second coal accumulator 494 (delivered coal 495). Here, the feed of coal 492 to coal accumulator 73 or 494 is accomplished by moving two-position bucket elevator 493 into one position or the other by means of positioning drive motor 496. After filling first coal accumulator 73 with a batch of coal, it is sealed and volatiles are fed into first coal accumulator 73 from receiver 77 through line 76 via valve 74, reducing valve 75 and valve 497, raising the pressure therein to 0.001-0.002 MPa. The volatiles are obtained in the course of grinding coal in smart disintegrator 78 and they are received from process circulation vessel 79 which comprises a gas separator. The coal is then passed from accumulator 73 via hermetic gate 498 through line 499 and hermetic switch 500 through line 80 into smart disintegrator 78, an excess pressure of 0.001-0.002 MPa being maintained in first coal accumulator 73 via line 76 and valve 497. In this process, valve 501 and hermetic gate 502 are held closed and, at the same time, second coal accumulator 494 is filled with a batch of coal. In the course of grinding the coal in smart disintegrator 78, the volatiles which are liberated from the coal as a result of the grinding thereof are withdrawn through line 81 and, by means of exhaust fan 82, via valve 503, the cocurrent stream of volatiles containing coal dust. This coal dust is separated from the volatiles in multicyclone 83 and is sent to classifier 504, in which particles larger than 30 μm are separated from it, while the finer dust is collected in hopper 505. by using the arrangement of hermetic gates 85, 87 and 179, the coal dust is passed from hopper 505 through line 84 into hopper 86, wherein fine coal dust of class 0 . . . 30 μm is collected. Coal dust of class 0 . . . 30 μm, obtained from classifier 506—the final stage of the cascade of classifiers of the ACWF preparation subsystem, is passed into this same hopper 86 via hermetic gate 87 through line 88. After completing the process of grinding the batch of coal which has been passed to smart disintegrator 78 from first coal accumulator 73 valve 497 and hermetic gate 498 are closed. Second coal accumulator 494, filled with a batch of coal, is sealed and, after raising the excess pressure therein to 0.001-0.002 MPa via line 76 and valve 501, hermetic gate 502 is opened and the coal is passed to grinding from second coal accumulator 494 through line 507, having switched hermetic switch 500 over to this line. In this process, brief closure of valve 74 is employed in the transitional conditions of excess pressure control in coal accumulators 73 and 494 in order to prevent possible losses of volatiles in line 76 from receiver 77 through line 508.

After separating the coal dust therefrom in multicyclone 83, the volatiles liberated from the coal as a result of its grinding in smart disintegrator 78 are passed through line 102 to receiver 77 via non-return valve 105. Here, the rated operating conditions of multicyclone 83 are provided by fans 82 and 509, while the amount of volatiles liberated from the coal as a result of its mechanical breakdown (MBV) is measured by flowmeter 510. Utilizing the MBV value data, the controller (not shown) which controls smart disintegrator 78 is used to control weighing vibrating filter conveyor 478, to control coal metering and to control directly the grinding of the coal, as has been described above and is shown in the algorithm presented in FIG. 2.

From smart disintegrator 78 ground coal is passed through line 89, via moisture separator 511, through line 512 to classifier 513, after which coal with a particle size composition of class 260 ... 400 μm is metered through line 514 and hermetic gate 515, to accumulate a coal batch in dispenser 516. Here, moisture separator 511 can be omitted when using raw coals with relatively low moisture content. Also in this process, coal with a particle size composition of class 30 ... 30+, which is produced in classifier 504, is fed through line 517 to dispenser 516. A process coal batch is fed from dispenser 516 through hermetic gate 518 or 519 into one of the slurry mixers 90 or 520 and fuel of grade ACWF$^{400}$ is then prepared from this process batch of coal. Thus, process water, pre-heated in process water heater 93 by the thermal energy of slag being discharged from gasifier 94, is fed into mixer 90 through line 91 and via valve 92 by means of metering pump 521. The process water is heated by circulating through line 95 an independent agent driven by circulating pump 96 (shown in FIGS. 3A and 3B and FIG. 4). In addition, this water is heated by the steam coolant of OTC cooler 720 in heater 736 by circulating an independent heat-transfer agent in line 721.

Intermediate slurry is prepared by operating the stirrer of slurry mixer 90, and a process batch of this is passed via adjustable valve 522 through line 97 to hydraulic-impact treatment Activation Apparatus 98. Activation Apparatus 98, which has the property of a pump, transfers the intermediate slurry via adjustable valve 100 from slurry mixer 90 into process circulation vessel 79. When all the slurry has been transferred from circulation mixer 90 to process circulation vessel 79, valve 522 is closed and valve 523 is opened. Circulatory processing of the slurry into ACWF is performed in Activation Apparatus 98 via adjustable valve 100 through line 524 and process circulation vessel 79 and through line 99. This processing commences after all of the process batch of intermediate slurry has been discharged from slurry mixer 90 via valve 522 into the "Activation Apparatus 98, valve 100, line 524, process circulation vessel 79, valve 523, line 99" circulation loop. Valves 106 and 525 are held closed while processing a process batch of intermediate slurry into ACWF. While processing the slurry into fuel, gases are separated from the slurry in vessel 79 and these gases are transferred to receiver 77 by fan 103 through lines 101 and 102 via non-return valve 104. After processing the intermediate slurry into ACWF, the intermediate fuel is discharged from process circulation vessel 79 to correction vessel 108 via valve 106 and line 107 by means of Activation Apparatus 98, which has the properties of a pump, closing adjustable valve 100 in this process. After holding the ACWF for correction in a "calm" state for 30-60 minutes in correction vessel 108, it is transported by pump 526 through line 109 via valve 110 and line 527 into accumulator vessel 111. Grade ACWF$^{400}$ is stored in this vessel 111. This fuel is passed from accumulator vessel 111 for gasification via line 117 and valve 118.

Before starting the ACWF preparation subsystem, slide valve 528 and valve 529 are opened to supply feedwater to slurry mixers 90, 520 and 530-533. For this purpose, buffer vessel 535 is filled with water to 50-75% of its volume from external water supply line 534 so that in the course of ACWF preparation water from water receiver 536 of water separator 511 can be discharged into this vessel 535. This water is fed through line 537 by pump 538, via non-return valve 539 and with valve 540 open, into line 541 which is connected to buffer vessel 535. In the course of operation of the ACWF preparation subsystem, water (if present) is decanted into this same buffer vessel 535 from coal eternal moisture vessel 489. For this purpose, if water is present in vessel 489 and is accumulating, valve 542 is opened and this water is passed by pump 543 via non-return valve 544 and valve 545 through lines 546 and 541 into buffer vessel 535. Here, valve 545 is controlled by the controller (not shown) of buffer vessel 535. Valve 547, via which buffer vessel 535 is topped up with water from external water supply line 534 via non-return valve 548, is also controlled by the controller of buffer vessel 535. This same controller controls valves 549-554 and pumps 555-557, by means of which off-grade CWF (fuel filtrate) is, after ACWF correction in correction vessels 108 and 558-562, passed for processing into ACWF, namely into buffer vessel 535. Thus, valve 549 is opened after the ACWF correction time has expired, and before discharging the ACWF from correction vessel 108 to accumulator vessel 111. The surface layer of liquid (the fuel filtrate) which has layered out from the main volume of the ACWF in correction vessel 108, is discharged by pump 555 to fuel filtrate manifold 563 via non-return valve 564 through line 541 into buffer vessel 535.

During the circulation processing into ACWF of the intermediate slurry prepared in slurry mixer 90, as was described above, this mixer 90 is filled with the following batch of coal, while at the same time intermediate slurry is prepared in adjacent slurry mixer 520. Then, after slurry mixer has again been filled with a process batch of fuel components, the preparation of intermediate slurry therein commences, while at the same time commencing the discharge of intermediate slurry from adjacent slurry mixer 520 via valve 565 and line 97 into hydraulic-impact treatment Activation Apparatus 98 for processing this intermediate slurry into the next batch of grade of ACWF$^{400}$ ACWF. In this process, valve 522 and valves 106, 525 and 523 are held closed, while valve 100 is open. Then after discharging the entire volume of intermediate slurry from slurry mixer 520 to circulatory processing, valve 565 is closed and this circulatory processing is carried out, as has already been described, in the "Activation Apparatus 98, valve 100, line 524, process circulation vessel 79, valve 523, line 99" loop. After processing the batch of intermediate slurry into ACWF, the fuel is then discharged from process circulation vessel 79 into second correction vessel 558 by Activation Apparatus 98, which has the properties of a pump. For this purpose, valve 100 is closed while valve 525 is opened, and valves 522, 565 and 106 are held closed (valve 523 is open). Further, in accordance with the ACWF preparation process cycles, intermediate slurry is discharged from first slurry mixer 90 for processing in hydraulic-impact treatment Activation Apparatus 98, while the next batch of intermediate slurry is prepared in second slurry mixer 520, then first slurry mixer 90 is filled with fuel components. After holding the ACWF in correction vessel 558, valve 550 is opened and the fuel filtrate is discharged from the upper part of second correction vessel 558 by pump 555 into buffer vessel 535. After this, the finished ACWF is transferred by pump 526 from correction vessel 558 through line 527 via valve 566 into reservoir vessel 111.

Process water is metered into second slurry mixer 520 from buffer vessel 535 by metering pump 521, which meters process water through line 91, via valve 567 and through line 568, preheating this water in process water preheater 93.

Part of the coal, consisting of 0 . . . 260 μm particles, is passed through line 569 from classifier 513 to equipment designed to prepare ACWF of the grades indicated in Table 4, the composition of which includes coal of 0 . . . 260 μm particle size. For this purpose, coal of such particle-size composition is subjected to multi-stage classification in the cascade of classifiers 570-573 and 506. In relation to the preparation of ACWF from coal of 0 . . . 260 μm particle-size composition, the diagrams of FIGS. 9A and 9B show a further two assemblies of equipment, identical in functional composition, which are designed to prepare ACWF. The integrated operation of an assembly of apparatuses of similar composition has been presented above in describing the process of preparation of grade ACWF$^{400}$ ACWF. Thus, for preparation of ACWF of grades ACWF$^{260}$ and ACWF$^{400}$ in accordance with the inventive concept, a second assembly of basic process equipment is employed, consisting of dispenser 574, slurry mixers 530 and 531, hydraulic-impact treatment Activation Apparatus 575, process circulation vessel 576 and correction vessels 559 and 560. A third assembly of basic process equipment, consisting of dispenser 577, slurry mixers 532 and 533, hydraulic-impact treatment Activation Apparatus 578, process circulation vessel 579 and correction vessels 561 and 562 is used to prepare ACWF of grades ACWF$^{110}$, ACWF$^{70}$ and ACWF$^{45}$. These assemblies of basic process equipment operate in a similar manner to that described in relation to the apparatus dispenser 516, slurry mixers 90 and 520, hydraulic-impact treatment Activation Apparatus 98, process circulation vessel 576 and correction vessels 108 and 558.

To prepare ACWF of grades ACWF$^{260}$ and ACWF$^{170}$, coal of class 170 . . . 260 μm particle-size composition is accumulated in hopper 580, supplied through line 581 from classifier 570, while coal of class 110 . . . 170 μm particle-size composition is accumulated in hopper 582, supplied through line 583 from classifier 571. To prepare ACWF of grade ACWF$^{260}$, hermetic switch 584 is set in hermetic gate 585 position and coal from hopper 580 is passed to dispenser 574 via hermetic gate 585, hermetic switch 584 and hermetic gate 586 through line 587. A batch of coal of class 170 . . . 260 μm particle-size composition which has been accumulated is transferred from dispenser 574 via hermetic gate 588 to slurry mixer 530, or via hermetic gate 589 to slurry mixer 531. Intermediate slurry is prepared alternately in slurry mixers 530 and 531, and via the corresponding valves 590 and 591 is passed through line 592 for processing into ACWF by process circulation through the loop "Activation apparatus 575, valve 593, line 594, process circulation vessel 576, valve 595, line 596". For preparation of intermediate slurry, process water is metered into slurry mixer 530 by metering pump 597 from buffer vessel 535 through lines 598 and 599 via valve 600, and into slurry mixer 531 through lines 598 and 601 via valve 602. In the course of processing the intermediate slurry into ACWF, gases are separated from the slurry in process circulation vessel 576 and these gases are transferred to receiver 77 by fan 604 through lines 603 and 102 and via non-return valve 605.

To prepare ACWF of grade ACWF$^{170}$, hermetic switch 584 is set in hermetic gate 606 position and coal from hopper 582 is passed to dispenser 574 via hermetic gate 606, hermetic switch 584 and hermetic gate 586 through line 587. A batch of coal of class 110 . . . 170 μm particle-size composition which has been accumulated is transferred from dispenser 574 to one of slurry mixers 530 or 531.

The prepared intermediate fuel of grade ACWF$^{260}$ or ACWF$^{170}$ is passed to the corresponding correction vessels 559 and 560 through line 425 or 608 via valve 607 or 609.

Fuel filtrate from correction vessels 559 and 560 is "decanted" via the corresponding valves 551 and 552 into fuel filtrate manifold 610 by pump 556 through lines 611 and 541, and via non-return valve 612 the fuel filtrate is discharged into buffer vessel 535.

The finished ACWF of ACWF$^{260}$ grade is pumped by pump 613 from correction vessels 559 and 560 via valves 614, 615 and 616 through lines 617 and 618 into reservoir vessel 112. The finished ACWF of ACWF$^{170}$ grade is pumped by pump 613 from correction vessels 559 and 560 via valves 614, 615 and 619 through lines 617 and 620 into reservoir vessel 113.

To prepare ACWF of grade ACWF$^{110}$, coal of particle-size composition class 70 . . . 110 μm is accumulated in hopper 621, supplied through line 622 from classifier 572. To prepare ACWF of grades ACWF$^{70}$ and ACWF$^{45}$, coal of particle-size composition class 45 . . . 70 μm is accumulated in hopper 623, supplied through line 624 from classifier 573, while coal of particle-size composition class 30 . . . 45 μm is accumulated in hopper 625, supplied through line 626 from classifier 506. Fine coal dust with particle sizes of 0 . . . 30 μm, which has passed through classifier 506 is passed through line 426 to hopper 628, and is then passed through hermetic gate 629 through line 88 and via hermetic gate 87 into hopper 86 for use thereof in the producer gas production process.

To prepare ACWF of one of the grades ACWF110, ACWF70 or ACWF45, coal with a particle-size composition in accordance with the data of Table 4 is taken from one of the hoppers 621, 623 or 625. Thus, employing hermetic gates 427, 428 and 630-634 and hermetic switches 635 and 636, coal of the required particle-size composition is passed to dispenser 577 of the third assembly of basic process equipment. Slurry mixers 532 and 533 are charged with batches of the fuel components via switches 635 and 636, and also by metering pump 637 through lines 638-640 via valves 641 and 642. The finished intermediate slurry is discharged from slurry mixers 532 and 533 via valves 643 and 644 through line 645 for processing into ACWF. This processing is performed by process circulation in the loop "Activation apparatus 578, valve 646, line 647, process circulation vessel 579, valve 648, line 649". When processing the intermediate slurry into ACWF, gases are separated from the slurry in process circulation vessel 579 and these gases are transferred by fan 651 through lines 650 and 102 and via non-return valve 652 to receiver 77, from which they are passed through line 139 to the producer gas production process.

Prepared intermediate ACWF of grade ACWF$^{110}$, ACWF$^{70}$ or ACWF$^{45}$ is passed to the corresponding correction vessels 561, 562 through line 653 via valve 654, or through line 655 via valve 656. The fuel filtrate from correction vessels 561, 562 is "decanted" via the corresponding valves 553, 554 into fuel filtrate manifold 657 and the fuel filtrate is discharged by pump 557 to buffer vessel 535 through lines 658 and 541 via non-return valve 659. Finished ACWF of grade $ACWF^{110}$ is pumped by pump 660 from correction vessels 561, 562 via valves 661, 662 and 663 through lines 664 and 665 into reservoir vessel 114. Finished ACWF of grade $ACWF^{70}$ is pumped by pump 660 from correction vessels 561, 562 through lines 664 and 667 via valves 661, 662 and 666 into reservoir vessel 115. Finished ACWF of grade $ACWF^{45}$ is pumped by pump 660 from correction vessels 561, 562 through lines 664 and 669 via valves 661, 662 and 668 into reservoir vessel 116.

In the flow charts of FIGS. 9A and 9B, the multiple items 124 indicate electromagnetic devices for the transport activation of intermediate slurry and fuel and finished ACWF, which are installed on the corresponding pipelines of the process subsystem.

The flow charts of FIGS. 9A and 9B show a cascade of classifiers 513, 570-573 and 506, in which coal classified in relation to the particle-size composition is passed from each stage of this cascade to the corresponding assemblies of basic process equipment of the ACWF preparation subsystem for preparation of ACWF of the various grades indicated in Table 4. The chart of FIG. 9 shows lines 569 and 670-673, which interconnect classifiers 513, 570-573 and 506 into the above-mentioned cascade. Coal which has not passed through one or another classifier is passed through these lines successively to the subsequent classifiers of this cascade.

Figure 10:
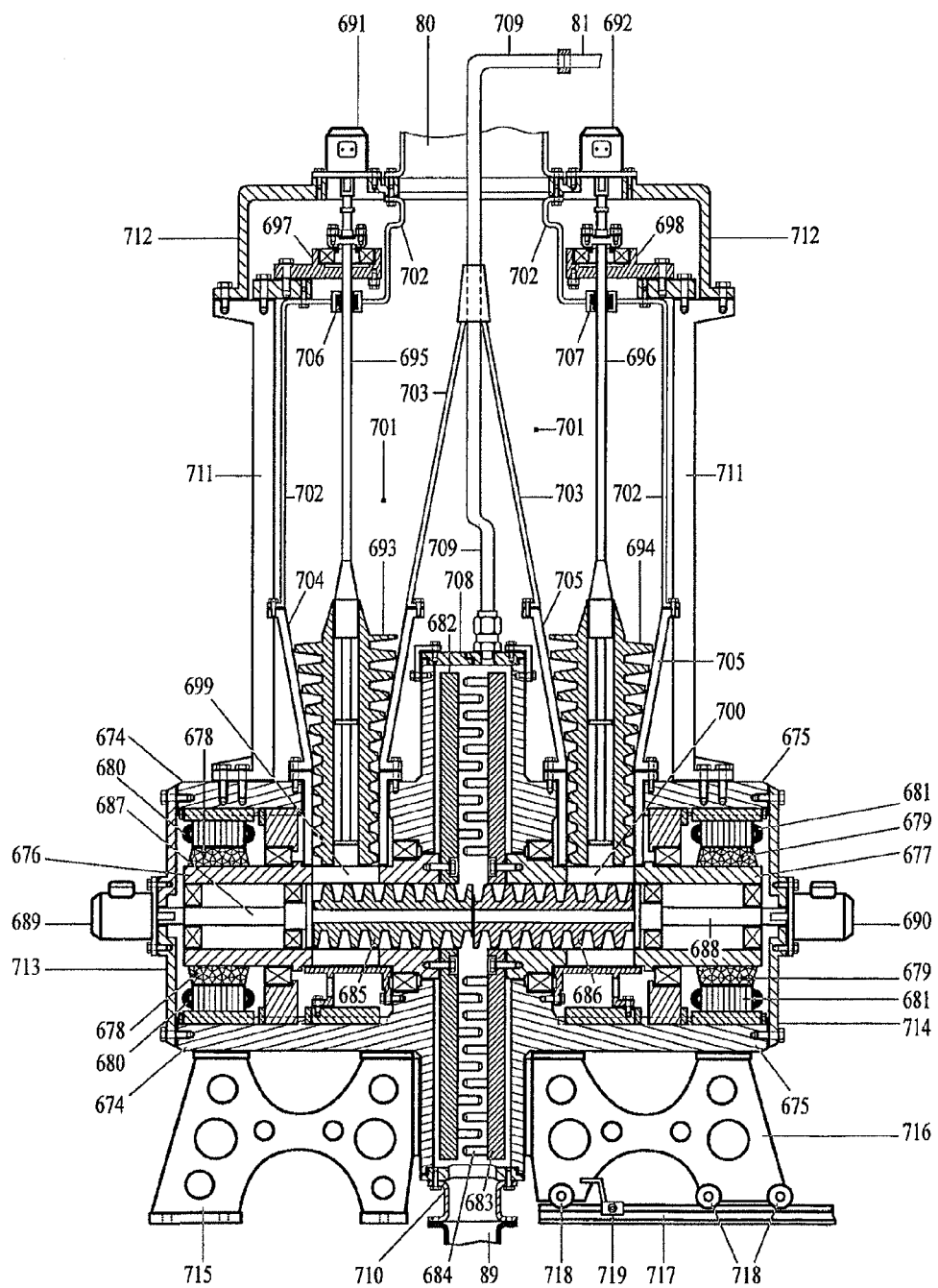
FIG. 10. Embodiment of the design layout of the mechanism of a smart disintegrator for coals.

FIG. 10 shows an alternative design layout of the mechanism of smart coal disintegrator 78. Hollow main drive shafts 676 and 677, which are oppositely rotated by rotary permanent magnets 678 and 679 of the electric motors of the main drives, are located in housings 674 and 675 of disintegrator 78. The electric motors of the main drives are integrated into disintegrator 78. Thus, in FIG. 10 the stators of the electric motors of the main drives, secured in housings 674 and 675 of disintegrator 78, are indicated as items 680 and 681. Working discs 682 and 683 are secured coaxially to the ends of the hollow shafts 676 and 677 of the main drives. Replaceable (with wear) grinding members 684, between which and by means of which the coal is ground, are secured to the working discs 682 and 683. Coal is fed into the grinding zone (towards member 684) by augers 685 and 686 which by means of shafts 687 and 688 are driven in rotation by internal coal feed electric motors 689 and 690. Synchronous motion of internal coal feed electric motors 689 and 690 with external coal feed electric motors 691 and 692 is provided by means of electrical power transducers and feed drive speed sensors (not shown). External coal feed augers, which are driven via shafts 695 and 696 by external coal feed electric motors 691 and 692, are indicated as items 693 and 694. Augers 693 and 694 are supported by means of their shafts 695 and 696 on bearing units 697 and 698. The dimensions of augers 685 and 686 are matched with the dimensions of augers 693 and 694 such that, and in relation to their rotational speeds, the amount of coal supplied in unit time by augers 693 and 694 is equal to the amount of coal supplied by augers 685 and 686 into the grinding zone. Here, coal is transferred from augers 693 and 694 to augers 685 and 686 via apertures 699 and 700 in hollow shafts 676 and 677. Coal being fed for grinding through line 80 is fed into stationary coal layer zone 701, forming in this zone a certain layer which is located above external feed augers 693 and 694. Stationary coal layer zone 701 is isolated from the ambient environment by means of sealing walls 702, guide surface 703, guide cones 704 and 705, and the seals 706 and 707 of shafts 695 and 696. Additional bearing units (not shown) may be installed in the zones of seals 706 and 707 in order to locate shafts 695 and 696 axially and radially. Guide surface 703 ensures formation of a stationary coal layer in zone 701 such that the coal accumulates above external feed augers 693 and 694, which ensures that the coal is freely captured by these augers.

The volatiles which are produced as a result of mechanical breakdown of the coal during the grinding thereof are withdrawn through detachable rim 708 which connects housings 674 and 675 into a single unit by means of gas pipe 709 for withdrawal of volatiles from disintegrator 78. Volatiles withdrawal gas pipe 709 is connected to line 81 for passing these volatiles into receiver 77, as has been described above. Exhaust coal manifold 710, which is connected to line 89 for feeding coal to ACWF preparation, is shown in the lower part of housings 674 and 675.

The design layout of the mechanism of disintegrator 78 in FIG. 10 shows, secured to housings 674 and 675, load-bearing supports 711, on which bearing units 697 and 698 are mounted and which carries roof 712, to which external coal feed electric motors 691 and 692 and the upper parts of sealing walls 702 are secured. Line 80, through which coal is fed into disintegrator 78, is connected to roof 712. Panels designated as items 713 and 714, on which internal coal feed electric motors 689 and 690 are mounted, are secured to housings 674 and 675. The fixed base of disintegrator 78, on which housing 674 is mounted, is designated as item 715, while item 716 is the movable base of disintegrator 78, on which housing 675 is mounted. For servicing disintegrator 78, for example when replacing worn members 684, and for repair work, housing 675, together with all the units and parts mounted on it, can be moved aside by moving mobile base 716 with wheels 718 running on rails 717. Mobile base 716 and, correspondingly housing 675, can be located in the working or repair position by means of unit 719.

INDUSTRIAL APPLICABILITY

The method now filed of Pseudo-Detonated Hydro-Gasification of a coal slurry as part of a combined cycle can be employed at any coal or gas power station. The capability is provided of utilizing low-grade coals, including wastes of coal extraction enterprises and beneficiation works—coal slurries. The syngas produced can also be utilized for the production of thermal energy for heating purposes and in endothermal industrial processes. Furthermore the high-quality syngas produced, which is highly saturated with hydrogen, can be used in transport, in the hydrogen power industry which is currently developing and in the chemical industry, for example in Fischer-Tropsch processes in the production of synthetic motor fuels.

The majority of the equipment units which relate to technologies for the preparation of Water-Gas Fuel and combined cycle generation of electrical power have been tested and are in use in the industry of a number of countries.

The invention claimed is:
1. A method for the gasification of coals, comprising:
utilizing gravity to move reaction components in a gasifier of vertical type;
creating a protective boundary layer to block coking of the gasifier walls using a protective gas to harden liquid slag;
feeding the protective gas into the gasifier in rotatory motion through orifices located in the walls of the gasifier while a part of the combustible components of the protective gas is oxidized, wherein liquid activated coal-water fuel of high homogeneity, with droplets of identi- cal dimensions and with coal particles in these droplets of close particle-size composition, is fed into the gasifier;

introducing the fuel droplets intermittently as separate fuel doses with a predetermined amount of motion being imparted thereto, the vector component of which motion allows rotary motion to be imparted to each fuel dose of droplets and forms a stable two-phase gas-liquid vortex structure;

maintaining the initial motion of the fuel dose of droplets by injection downwards from the top through the center of the spiral structure of the gas vortex being formed and by injection of gas mini-jets at the periphery of this vortex structure being formed from the side walls of the gasifier at a tangent to it, the injected gases consisting of volatiles liberated as a result of the mechanical breakdown of the coal during the grinding thereof, with the addition of syngas where there is an insufficiency of the former;

thermal activation of the droplets of fuel doses for conversion combustion of an explosive nature is carried out primarily by radiation from the side walls of the gasifier, which are also the walls of the combustion chamber of a gas turbine, while synchronization of the explosive nature of conversion combustion is performed by successive injections of fuel doses into the gasifier with process periods corresponding to the measured periods of time from injection of a fuel dose to the explosive combustion thereof, wherein measurement of the actual periods of time from injection of a fuel dose to the explosive combustion thereof is performed by generating acoustic information on this explosive combustion by acoustic sensors, wherein, with the object of protecting the inside surfaces of the gasifier walls at the moment of explosive conversion combustion, shock protection is employed in this combustion zone by increasing briefly the density of a protective gas boundary layer;

performing after-burning of the fuel components as they travel through the gasifier primarily by radiation from the side walls of the gasifier, which are also the walls of the combustion chamber of the gas turbine, wherein the protective gas boundary layer on the inside surfaces of the gasifier walls is formed by syngas combustion products which are injected tangentially from the side walls of the gasifier in the form of micro-vortexes through active interceptors connected to the combustion chamber of the gas turbine; and the intermediate products of conversion, which have vertical and tangential components of motion and contain hardened fly ash and heavier particles of slag, are retarded in respect of rotatory motion, and in the course of the discharge thereof from the gasifier thermal energy of the slag is withdrawn into the technological process of preparation of activated coal-water fuel for gasification.

2. The method for gasification of coals as claimed in claim 1, wherein when using coals of vitrinite or liptinite grades, fine coal dust is sprayed onto the surface of the fuel droplets immediately after the injection thereof into the gasifier, agglomeration shells having strength and plasticity properties thereafter forming on the fuel droplets from the dust together with coal particles which migrate to the surface of droplets in the course of drying, under the influence of the radiation.

3. The method for gasification of coals as claimed in claim 1, wherein carbon dioxide is injected cold into the gasifier in order to harden the ash and to create a protective boundary layer on the inside surfaces of the gasifier walls in cooling and plastic ash hardening zones.

4. The method for gasification of coals as claimed in claim 1, wherein in order to produce syngas with the maximum content of hydrogen, activated coal-water fuel is employed wherein the water content is saturated with hydrogen and oxygen dissolved therein under pressure.

5. A method for preparation of activated coal-water fuel for the production of syngas, comprising:

grinding coal, degassing it and classifying it in accordance with particle-size composition;

mixing the coal with water and heating the intermediate aqueous mixture with thermal energy being utilized from contiguous processes including finishing treatment of the slurry by pulsed hydraulic-impact action and utilization of the products of coal degassing by combustion thereof in a separate combustion chamber;

wherein the grinding of coal to the required degree is controlled adaptively in accordance with the criterion of the actual amount of volatiles liberated from the coal as a result of a mechanical breakdown thereof;

employing the results of this the entire mass of coal to prepare activated coal-water fuel of various grades with a high degree of homogeneity, these differing from one another in the particle-size composition of the coal particles included therein; and partially degassing the coal not only during the grinding thereof but also in the process of hydraulic-impact activation of the fuel and in the course of processing the intermediate slurry into activated coal-water fuel;

wherein final mechanical activation of the fuel is performed by communicating a predetermined amount of motion to each droplet of fuel in the course of spraying the fuel as droplets.

6. The method for preparation of activated coal-water fuel for the production of syngas as claimed in claim 5, wherein when using coals of vitrinite or liptinite grades, fine coal dust is sprayed onto the surface of the fuel droplets before the process of ignition thereof commences.

7. The method for preparation of activated coal-water fuel for the production of syngas as claimed in claim 5, wherein the coal-water fuel is additionally activated by saturating the water component of the fuel with hydrogen and oxygen dissolved therein under pressure.

8. The method for preparation of activated coal-water fuel for the production of syngas as claimed in claim 5, wherein when transporting intermediate slurry between fuel preparation process equipment and when feeding finished activated coal-water fuel, electromagnetic transport activation devices are installed on the corresponding pipelines of the process subsystem.

* * * * *